United States Patent [19]

Mihara et al.

[11] Patent Number: 4,906,079
[45] Date of Patent: Mar. 6, 1990

[54] ZOOM LENS SYSTEM

[75] Inventors: Shinichi Mihara; Norihiko Aoki; Tsutomu Inanobe; Takeshi Hashimoto, all of Tokyo, Japan

[73] Assignee: Olympus Optical Co., Ltd., Tokyo, Japan

[21] Appl. No.: 196,067

[22] Filed: May 19, 1988

[30] Foreign Application Priority Data

| May 20, 1987 | [JP] | Japan | 62-121400 |
| Oct. 2, 1987 | [JP] | Japan | 62-247981 |
| Oct. 9, 1987 | [JP] | Japan | 62-253866 |
| Mar. 1, 1988 | [JP] | Japan | 63-45815 |
| Apr. 1, 1988 | [JP] | Japan | 63-78052 |

[51] Int. Cl.$^4$ .......................... G02B 15/14
[52] U.S. Cl. .......................... 350/427
[58] Field of Search .......................... 350/427

[56] References Cited

U.S. PATENT DOCUMENTS 4,525,036  6/1985  Fujibayashi et al.
4,776,679  10/1988  Kitagishi et al. .................. 350/427

FOREIGN PATENT DOCUMENTS 48-79653  10/1973  Japan.
60-184220  9/1985  Japan.
61-169809  7/1986  Japan.
61-172110  8/1986  Japan.
61-176906  8/1986  Japan.

Primary Examiner—Bruce Y. Arnold
Assistant Examiner—Rebecca D. Gass
Attorney, Agent, or Firm—Cushman, Darby & Cushman

[57] ABSTRACT

A light-weight zoom lens system manufacturable at a low cost comprising, in the order from the object side, a first lens unit having positive refractive power, a second lens unit having negative refractive power, a third lens unit having positive refractive power and a fourth lens unit having positive refractive power, and adapted in such a manner that said first lens unit and said fourth lens unit are fixed at the zooming time, whereas said second lens unit and said third lens unit are shifted along the optical axis while varying the airspace reserved therebetween. Said second lens unit comprises one or two lens elements and said third lens unit comprises a single lens element, whereby said zoom lens system comprises a small number of lens elements.

13 Claims, 57 Drawing Sheets

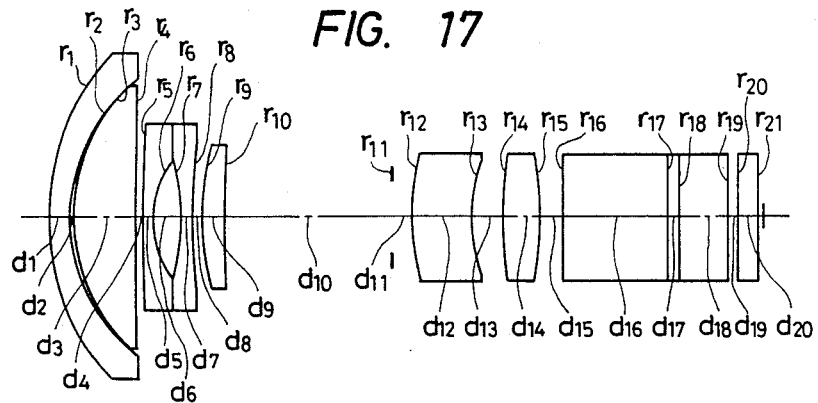
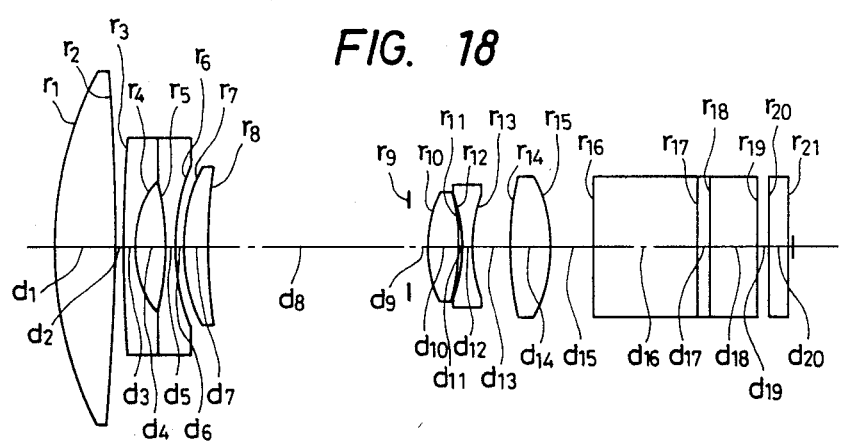
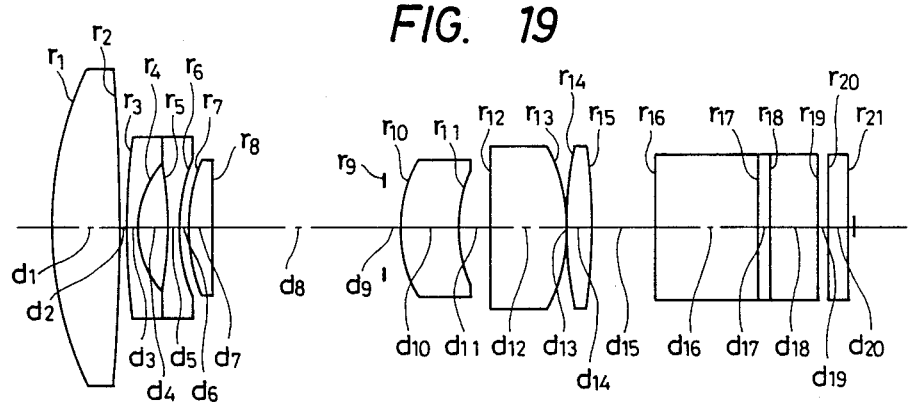

ZOOM LENS SYSTEM

BACKGROUND OF THE INVENTION (a) Field of the Invention:

The present invention relates to a photographing zoom lens system and more specifically to a very compact zoom lens system comprising a small number of lens elements and suited for use in photographing cameras equipped with electronic pickup tubes and solid-state image sensors as photographing devices.

(b) Description of the Prior Art:

The lens system designed for use in photographing cameras are mostly zoom lens systems.

Most of these zoom lens systems have aperture ratios of F/2.8 or higher and zoom ratios of 3 or higher. Speaking of the fundamental composition, these zoom lens systems generally comprise, in the order from the object side, a first lens unit having positive refractive power, fixed for varying focal lengths and movable for focusing the zoom lens system, a second lens unit having negative refractive power, movable for varying focal lengths and fixed for focusing the zoom lens systems, a third lens unit having negative refractive power, moved for compensating the deviation of the image positions caused by varying focal lengths and fixed for focusing the zoom lens systems, and a fourth lens unit consisting of a positive subunit having a function to make nearly afocal the light remarkably diverged in the third lens unit and always kept fixed.

In a zoom lens system of the type described above, it is general that the first lens unit comprises three lens elements, the second lens unit comprises three lens elements, the third lens unit comprises a single lens element and the fourth lens unit comprises six to eight lens elements. The reason for selecting such a lens composition is that either of the first and second lens units requires three lens elements to correct chromatic aberration, and the fourth lens unit requires at least six lens elements to correct spherical aberration in addition to chromatic aberration. For example, the zoom lens system invented by the inventor of the present invention and disclosed by Japanese Published Unexamined patent application No. 184220/60 is designed for a zoom ratio of 3 and an aperture ratio of F/2.0, and comprises thirteen lens elements in total.

Conventionally, the zoom lens systems for photographing cameras using the solid-state image sensors, etc. are more excellent in aperture ratios and zoom ratios than the zoom lens systems for still cameras using 35 mm films of rica size when both the types of zoom lens systems are designed for the same field angle. However, this excellence is traced to the fact that short focal lengths are sufficient for the electronic photographing devices having small image planes. In other words, the performance of the above-mentioned zoom lens system is obtained by prolonging total lengths of the zoom lens systems and using a large number of lens elements in the lens systems. Therefore, such a design is against the demands for the electronic photographing cameras (Video movie cameras and still video cameras), i.e., compactness and low manufacturing cost.

SUMMARY OF THE INVENTION

A primary object of the present invention is to provide a compact zoom lens system having a field angle of 48° to 54° at the wide position, a vari-focal ratio of approximately 3, an aperture ratio of F/1.4 to F/2.8, a short total length, a small diameter of the front lens element, a small number of lens elements, low manufacturing cost and favorable imaging performance.

In order to accomplish the above-mentioned object, the zoom lens system according to the present invention comprises, in the order from the object side, a first lens unit having positive refractive power, a second lens unit having negative refractive power, a third lens unit having positive refractive power and a fourth lens unit having positive refractive power, is designed as a lens system wherein said first lens unit and said fourth lens unit are kept fixed for zooming the lens system, whereas said second lens unit and said third lens unit a shifted along the optical axis while varying the airspace reserved therebetween for varying focal length of the lens system and for compensating deviation of the imaging position caused accordingly, and is characterized in that said second lens unit and said third lens unit are shifted so as to satisfy the following conditions (1) and (2):

$$0.2 < |\beta_{2S}| < 0.7 \tag{1}$$

$$0.9 < |\beta_{23S}| < 3.0 \tag{2}$$

wherein the reference symbols $\beta_{2S}$ and $\beta_{23S}$ represent magnification of the second lens unit, and total magnification of the second and third lens units respectively when the zoom lens system as a whole has a focal length of $f_s = \sqrt{f_W \cdot f_T}$ (the reference symbol $f_W$ designates focal length of the zoom lens system at the wide position and the reference symbol $f_T$ denotes focal length of the zoom lens system at the tele position).

By adopting the zooming mode described above, the zoom lens system according to the present invention allows to compose the second lens unit only of two lens elements i.e., a negative lens element having a strongly concave surface on the image side and a negative lens element having a concave surface on the object side, and compose the third lens unit only of a single positive lens element. Since the second lens unit comprises two negative lens elements and the third lens unit comprises a single positive lens element, the zoom lens system according to the present invention comprises a smaller number of lens elements and has a simpler composition than the conventional zoom lens system.

Now, descriptions will be made on why the number of lens elements can be reduced by designing the zoom lens system having the above-described composition so as to satisfy the conditions (1) and (2).

In the conventional zoom lens system, the second lens unit comprises a negative lens element, a negative lens element and a positive lens element arranged in the order from the object side. This arrangement is adopted to suppress variations of the chromatic aberrations (longitudinal chromatic aberration and lateral chromatic aberration) produced by zooming. In this case, the variations of the chromatic aberrations are suppressed by using a medium having a low dispersing power for the negative lens elements, and a medium having a high dispersing power for the positive lens element. Further, the conventional zoom lens system is designed in such a manner that focal length thereof is varied by shifting the second lens unit as a whole, and the image plane is kept at a definite position by shifting a third negative or positive lens unit comprising one or two lens element together with the second lens unit.

The zoom lens system according to the present invention is designed in such a manner that the second lens unit of the conventional zoom lens system is divided into groups, i.e., two negative lens elements and a positive lens element, and the airspace $D_2$ formed between the two groups is slightly varied so as to keep the image position constant when the second lens unit is shifted for varying focal length of the zoom lens system. This design makes it possible to omit the third lens unit of the conventional zoom lens system. Speaking in short, the second lens unit of the conventional zoom lens system is divided into two, which are used as the second lens unit and the third lens unit respectively, and the conventional third lens unit is omitted in the zoom lens system according to the present invention.

In the zoom lens system according to the present invention described above, however, the chromatic aberrations will be remarkably varied if the airspaces $D_2$ is remarkably varied for zooming. Therefore, it is preferable to reserve a possible minimum difference between a maximum value and a minimum value of $D_2$. For this purpose, it is preferable to shift the third lens unit in the same direction as the second lens unit. In order to shift the third lens unit in the same direction as the second lens unit while keeping the imaging plane at a definite position, it is necessary for the second lens unit to have a magnification $\beta_2$ below x1 as follows:

$$|\beta_2| < 1$$

In case of a zoom lens system having a high varifocal ratio on the order of 6, however, aberrations can hardly be corrected when the second lens unit has magnification always satisfying the above-mentioned condition. Accordingly, the magnification $\beta_{2S}$ of the second lens unit should satisfy the afore-mentioned condition (1) at least in the state where the zoom lens system as a whole has the focal $f_S = \sqrt{f_W \cdot f_T}$. If the upper limit of this condition is exceeded, the airspace $D_2$ reserved between the second lens unit and the third lens will vary remarkably and undesirably produce remarkable variations of the chromatic aberrations for changing focal length of the zoom lens system. If the lower limit of this condition is exceeded, in contrast, the third lens unit will be shifted for a long distance relative to the second lens unit, thereby making it difficult to narrow the airspace $D_2$ at the wide position and use the space effectively.

As for the total magnification $\beta_{23S}$ of the second lens unit and the third lens unit of the zoom lens system according to the present invention which correspond to the second lens unit of the conventional zoom lens system comprising four lens units, it is necessary to satisfy the afore-mentioned condition (2).

When the second lens unit and the third lens unit have a total magnification $\beta_{23S} = X1$ at focal length $f_S = \sqrt{f_W \cdot f_T}$ of the zoom lens system, variation of $D_2$ is the minimum in the entire zooming range and the variations of the chromatic aberrations are kept little. In other words, $D_2$ has values nearly equal at the wide position and tele position. Further, the fourth lens unit can have an adequate focal length which is advantageous for correcting aberrations.

If the lower limit of the condition (2) is exceeded, the fourth lens unit is apt to have a long focal length. If this focal length is shortened, spherical aberration and coma will easily be produced. In addition, variation of $D_2$ will be remarkable. If the upper limit of the condition (2) is exceeded, the fourth lens unit will have a short focal length, thereby making it difficult to reserve the required back focal length.

The zoom lens system according to the present invention, so designed as to satisfy the afore-mentioned condition (1) and (2), allows to reduce the number of lens elements composing the second lens unit without aggravating the chromatic aberrations and other types of aberrations.

The zoom lens system having the above-described composition is suited especially as a zoom lens system having a zoom ratio $f_W/f_T$ on the order of 3 for the reason described below.

For the zoom lens system having a zoom ratio on the order of 3, it is easy to correct aberrations by narrowing the ranges defined by the conditions (1) and (2) respectively while satisfying $|\beta_2| < 1$. In this case, it is sufficient for accomplishing the object of the present invention to compose the zoom lens system by arranging, in the order from the object side, a first lens unit having positive refractive power, a second lens unit having negative refractive power, a third lens unit having positive refractive power and a fourth lens unit having positive refractive power, to keep the first lens unit and the fourth lens unit fixed during zooming, and to perform variation of focal length together with compensation of variation of imaging plane by shifting the second lens unit and the third lens unit in the same direction along the optical axis while varying the airspace reserved between the second lens unit and the third lens unit. This design makes it possible to obtain a simple composition of the zoom lens system comprising, like the zoom lens system, the second lens unit consisting only of two negative lens elements and the third lens unit consisting only of a single positive lens element, and correct the chromatic aberrations and other types of aberrations. That is to say, the design makes it possible to obtain a zoom lens system having a short total length, a small diameter of the front lens element and favorable optical performance without aggravating aberrations, and facilitates to reduce the number of lens elements composing the other lens units.

Furthermore, the zoom lens system according to the present invention is designed so as to set the airspace reserved between the second lens unit and the third lens unit at a maximum at an intermediate focal length during zooming, and capable of setting the airspace reserved between the second lens unit and the third lens unit at a minimum at the tele position at which a minimum airspace is desired to minimize the space occupied by the zoom lens system. Simultaneously, since the zoom lens system according to the present invention is capable of preventing the shift direction of the third lens unit from being reversed while focal length is varied to set the lens system from the wide position to the tele position, the airspace reserved between the third lens unit and the fixed lens unit (the fourth lens unit) can be set at a minimum at the tele position. Since the zoom lens system according to the present invention comprises no useless space as described above, the lens system is capable of locating the entrance pupil relatively close to the first surface of the lens system with no restriction, allows to minimize diameter of the front lens element and can be focused on an object located at a shorted distance.

Furthermore, the zoom lens system according to the present invention, which does not use the third lens unit having negative refractive power unlike the conventional example (the third lens unit of the zoom lens system according to the present invention has positive refractive power), is capable of preventing the rays from being diverged by the third lens unit and provides a merit to omit some of the positive lens elements arranged on the object side in the fourth lens unit of the conventional zoom lens system.

Moreover, in order to obtain a zoom lens system having performance kept stable even during zooming, it is preferable to compose the second lens unit by arranging, in the order from the object side, a negative lens element having a strongly concave surface on the image side and a negative lens element having a strongly concave surface on the object side, and to compose the third lens unit of a positive lens element.

The reason for composing the second lens unit of the conventional zoom lens system of three lens element as described above is to prevent the chromatic aberrations from being varied by varying focal length of the zoom lens system. Even in the zoom lens system according to the present invention wherein the second lens unit and the third lens unit are shifted while varying the airspace reserved therebetween, the chromatic aberrations are apt to be aggravated. In other words, when these two lens units are shifted in remarkably different ways, the chromatic aberrations and other types of aberrations are apt to be aggravated while varying focal length of the zoom lens system. In order to prevent such aggravation, it is desirable for the zoom system to satisfy the following condition (3):

$$0.5 < \Delta x_2/\Delta x_2 < 1.5 \quad (3)$$

wherein the reference symbols $\Delta X_2$ and $\Delta X_3$ represent shift distances of the second lens unit and the third lens unit respectively when focal length of the zoom lens system is varied by $\Delta f$.

If the upper limit or lower limit of the condition (3) is exceeded, shift of the second lens unit will be remarkably different from that of the third lens unit and the aberrations will be varied undesirably remarkably by varying focal length of the zoom lens system. From the viewpoint to keep a definite imaging plane during variation of focal length of the zoom lens system, it is preferable to set the range from the shortest focal length to the focal length $f_S$ corresponding to a geometrical mean of the focal lengths at both the end positions so as to satisfy the following condition (4), and to set the range from the focal length $f_S$ to the longest focal length so as to satisfy the following condition (5):

$$0.9 < \Delta x_3/\Delta x_2 < 1.5 \quad (4)$$

$$0.5 < \Delta x_3/\Delta x_2 < 1.1 \quad (5)$$

If these conditions are not satisfied, the chromatic aberrations and other types of aberrations will easily be varied by varying focal length of the zoom lens system, and it will be impossible to keep the imaging plane at a definite position.

As is understood from the foregoing descriptions, the present invention has made it possible to reduce the numbers of the lens elements composing the second lens unit and the third lens unit respectively, and obtain favorable image quality over the entire zooming range by restricting shifts of these lens units.

Now, descriptions will be made on the first lens unit.

In case of a zoom lens system having a field angle on the order of 48° to 54° at a wide position and a zoom ratio of 3, it is necessary to compose the first lens unit of three lens elements, and the first lens unit can be composed by arranging, in the order from the object side, a negative meniscus lens element having a convex surface on the object side and a positive lens element. In this case, the positive lens element is apt to have strong power, thereby making it rather hard to reserve adequate thickness for the lens periphery. When the first lens unit is composed of a negative lens element and a positive lens element, however, an adequate thickness can be reserved for the periphery of the positive lens element since it is possible to shorten the distance on the optical axis (the distance as measured from the surface located on the extreme object side to the surface located on the extreme image side) and bring the entrance pupil of the same lens system close to the first surface of the lens system, thereby minimizing diameter of the front lens accordingly.

In contrast, the negative lens element arranged in the first lens unit is apt to have weak power, thereby making it difficult to correct the chromatic aberrations, contrary to the purpose of use of this lens element. In order to correct the chromatic aberrations, it is desirable to satisfy the following condition:

$$\nu_{I-2} - \nu_{I-1} > 20$$

wherein the reference symbols $\nu_{I-1}$ and $\nu_{I-2}$ represent Abbe's numbers of the negative lens element and the positive lens element respectively arranged in the first lens unit.

Further, in order to reserve adequate thickness for the periphery of the above-mentioned positive lens element, refractive index $n_{I-2}$ of the positive lens element should desirably satisfy the following conditions:

$$n_{I-2} > 1.6$$

Furthermore, in order to correct the chromatic aberrations and reserve adequate thickness for the lens periphery, it is desirable that the ratio of focal lengths $f_I$ of the first lens unit as a whole relative to focal length $f_{I-1}$ of the negative lens element arranged in the first lens unit should satisfy the following conditions:

$$0.25 < f_I/|f_{I-1}| < 0.7$$

If 0.25 defined as the lower limit of the above-mentioned condition is exceeded, the chromatic aberrations will hardly be acceptable. If 0.7 defined as the upper limit of the above-mentioned condition is exceeded, in contrast, the above-mentioned positive lens element will be apt to have strong power, thereby making it difficult to reserve adequate thickness for the periphery thereof. If power of this lens element is weakened, the zoom lens system will be apt to have a long total length and a large diameter of the front lens element.

The first lens unit functions, when being shifted toward the object side, to bring the zoom lens system in focus on an object located at a shorter distance. When the first lens unit is shifted toward the object side for focusing the zoom lens system on an object located at a shorter distance, however, the entrance pupil of the lens system is brought farther from the first surface of the lens system and the offaxial ray is apt to be vignetted. Further, since aberrations such as spherical aberration and astigmatism are varied by the shift of the first lens unit, it is necessary to minimize the aberrations.

As for the variations of the aberrations caused by the shift of the first lens unit, problems are posed by the variations of spherical aberration and astigmatism on the side of the tele position. In a zoom lens system having a zoom ratio of 3, such as the zoom lens system according to the present invention wherein the outermost paraxial ray passes through the relatively central portion of the first lens unit at the tele position, variation of the spherical aberration is relatively little. However, the offaxial ray passes through the relatively peripherical portion of the first lens unit. Further, the first lens unit of the zoom lens system according to the present invention comprises only two lens elements and has power a little weaker than that of the first lens unit comprising three lens elements, thereby requiring a longer shift distance for focusing the zoom lens system accordingly. For this reason, angle of incidence of the offaxial ray incident on the image side surface having relatively strong curvature of the negative meniscus lens element is varied remarkably, thereby constituting a cause to vary astigmatism.

At the tele position where the zoom lens system is focused on an object located at the infinite distance, angle of incidence $I_2$ of the outermost principal ray incident on the image side surface of the negative meniscus lens element is expressed by the following formula:

$$I_2 \approx \sin^{-1}\left\{\frac{(\overline{EP_T} - d_1)\tan\omega_T}{r_2}\right\} - \omega_T$$

wherein the reference symbol $\omega_T$ represents the maximum half angle of field when the zoom lens system is focused on an object at infinite distance, the reference symbol $\overline{EP_T}$ designates the distance as measured from the entrance pupil to the first surface of the lens system when the zoom lens system is focused on an object located at the infinite distance, the reference symbol $d_1$ denotes thickness of the negative meniscus lens element arranged in the first lens unit, and the reference symbol $r_2$ represents radius of curvature on the image side surface of the above-mentioned negative meniscus lens element.

Height of incidence of the principal ray $(\overline{EP_T}-d_1)\tan\omega_T$ increases nearly proportionally to the shift distance of the front lens element. Accordingly, angle of incidence $I_2$ is varied more remarkably as it has a larger value before the shift of the front lens element. It is therefore desirable to satisfy the relations (i) through (iii) mentioned below. In addition, $I_2$ should desirably have a small value when $r_2$ has a small value.

$|I_2| < 35°$ (i)

$0.3 < r_2/\sqrt{f_W \cdot f_T} < 2.0$ (ii)

$0.35 < \Sigma D_1/\sqrt{f_W \cdot f_T} < 0.8$ (iii)

If $I_2$ exceeds 35° defined as the upper limit of the condition (i), astigmatism will be apt to exhibit remarkable variation at the focusing time.

If the lower limit (0.3) of the condition (ii) is exceeded, astigmatism will be apt to exhibit remarkable variation at the focusing time as in the case where the condition (i) is not satisfied. If the upper limit (2.0) of the condition (ii) is exceeded, in contrast, aberrations such as spherical aberration will easily be undercorrected even when the zoom lens system is focused on an object located at the infinite distance.

The condition (iii) defines length $\Sigma D_1$ of the first lens unit on the optical axis. The length of the first lens unit on the optical axis is closely related to the distance as measured from the front surface of the lens system to the entrance pupil $\overline{EP_T}$. Therefore, when $\Sigma D_1$ is long, $\overline{EP_T}$ is apt to be prolonged and the front lens element is apt to have a large diameter. When $\overline{EP_T}$ is too short, however, $r_2$ is apt to have a small value and $|I_2|$ is apt to have a large value. Accordingly, it is preferable to select a small value for $|I_2|$, even if $\overline{EP_T}$ has rather a large value, so as to minimize variations of the aberrations at the focusing time. If the upper limit (0.8) of the condition (iii) is exceeded by selecting a large value for $\Sigma D_1$, the front lens element is apt to have a large diameter. If the lower limit (0.35) of the condition (iii) is exceeded, in contrast, it will be difficult to reserve adequate thickness for the periphery of the positive lens element arranged in the first lens unit.

Taking the above-described points into consideration, the present invention has succeeded in obtaining the zoom lens system by composing the first through third lens units only of five lens elements, i.e. remarkably reducing the number of the 8 to 9 lens elements used in the conventional zoom lens system. That is to say, one of the objects of the present invention has been accomplished by adopting the above-described novel composition for the zoom lens system.

It is possible to obtain a more compact zoom lens system having more favorably corrected aberrations and comprising a smaller number of lens units by designing the zoom lens system according to the present invention so as to satisfy the following conditions (6) through (9):

$0.5 < |f_{II\,III}|/\sqrt{f_W \cdot f_T} < 1.2$ (6)

$0.8 < f_{III}/|f_{II\,III}| < 6.0$ (7)

$15 < \nu_{II} - \nu_{III},\ \nu_{II} = (\nu_{II\text{-}1} + \nu_{II\text{-}2})/2$ (8)

$-1.0 < \sqrt{f_W \cdot f_T}/f_{I\,II\,III} < -0.2$ (9)

wherein the reference symbol $f_W$ represents focal length of the zoom lens system as a whole at the wide position, the reference symbol $f_T$ designate focal length of the zoom lens system as a whole at the tele position, the reference symbol $f_{II\,III}$ denotes total focal length of the second lens unit and the third lens unit at the tele position, the reference symbol $f_{III}$ represents focal length of the third lens unit, the reference symbol $f_{I\,II\,III}$ designates total focal length of the first through third lens units at the wide position, the reference symbol $\nu_{II\text{-}1}$ denotes Abbe's number of the negative lens element arranged on the object side in the second lens unit, the reference symbol $\nu_{II\text{-}2}$ represents Abbe's number of the negative lens element arranged on the image side in the second lens unit, and the reference symbol $\nu_{III}$ designates Abbe's number of the third lens unit.

The condition (6) defines total focal length of the second lens unit and the third lens unit. In the zoom lens system according to the present invention, vari-focal ratio is determined substantially by the total refractive power of the second lens unit and the third lens unit. If the upper limit (1.2) of the condition (6) is exceeded, it is impossible to enhance zoom ratio, the zoom lens system is apt to have a long total length or the first lens unit is apt to have a large diameter. If the total focal length is short enough to exceed the lower limit (0.5) of the condition (6), it will be advantageous to shorten the total length of the zoom lens system and minimize diameter of the front lens element, but the aberrations (spherical aberration, coma and astigmatism) will not be stable at the focal length variation time.

The condition (7) specifies focal length of the third lens unit as well as ratio between focal lengths of the second and third lens units. The condition (7) is defined since the positive lens element arranged in the third lens unit must have power of a certain degree for preventing the chromatic aberrations from being varied at the focal length variation time and compensating shift of the imaging plane. If the upper limit (6.0) of the condition (7) is exceeded, it will be difficult to suppress the variations of the chromatic aberrations during the focal length variation and the shift of the imaging plane. If the lower limit (0.8) of the condition (7) is exceeded, in contrast, the second lens unit and third lens unit adopted as the vari-focal lens units will have a weak total power, thereby making it difficult to satisfy the condition (6), and the second lens unit will have too strong power, thereby allowing the spherical aberration, coma and astigmatism to be varied easily during the focal length variation.

The condition (8) specifies difference between a mean value of the Abbe's numbers of the second lens unit and Abbe's number of the third lens unit. This condition is required to minimize the variations of the chromatic aberrations during the focal length variation, and the difference between the Abbe's numbers should desirably be as large as possible within the range of practically available glass materials. If the lower limit (15) of the condition (8) is exceeded, the chromatic aberrations will be varied during the focal length variation and the lateral chromatic aberration will be undercorrected over the entire vari-focal range.

The condition (9) defines total focal length of the first through third lens units at the wide position. In the conventional zoom lens system, the ray emerging from the so-called erector (the subunit arranged on the object side in the fourth lens unit) is nearly afocal and incident nearly afocally on the fixed lens unit (the subunit arranged on the image side in the fourth lens unit) used as the so-called relay system.

In the zoom lens system according to the present invention, however, the ray emerging from the so-called vari-focal system composed of the first through third lens units is weakly diverging. Accordingly, the ray incident on the fourth lens unit is weakly diverging in the zoom lens system according to the present invention. Since the zoom lens system according to the present invention is used for the purpose common to the zoom lens system invented by the inventor of this invention and disclosed by Japanese Published Unexamined patent application No. 184220/60, it is demanded to obtain a zoom lens system having so-called long back focal length. The composition of the zoom lens system according to the present invention is desirable also for satisfying this demand. When a diverging ray is incident on the fixed lens unit as described above, it is possible to prolong back focal length of the zoom lens system without prolonging back focal length of the fixed lens unit itself, and reserve the long back focal length without aggravating the aberrations by selecting an irregular power distribution for the fixed lens unit or increasing the number of lens unit composing the fixed lens unit.

If the upper limit ($-0.2$) of the condition (9) is exceeded, the ray emerging from the vari-focal system will not be diverging, thereby making it difficult to reserve the long back focal length. If the lower limit ($-1.0$) of the condition (9) is exceeded, the above-mentioned ray will be excessively diverging, thereby enlarging diameter of the fixed lens unit and specifying a narrow allowance for the airspace in which a stop is to be arranged.

It is preferable for the zoom lens system according to the present invention to satisfy, in addition to the aforementioned condition (6) through (9), the following conditions for correcting the aberrations more favorably and other reasons:

$$0.4 < r_{III\text{-}1}/r_{II\text{-}4} < 1.5 \tag{10}$$

$$-0.2 < (D_{2W} - D_{2T})/\sqrt{f_W \cdot f_T} < 0.3 \tag{11}$$

wherein the reference symbol $r_{III\text{-}1}$ represents a radius of curvature on the extreme object side surface of the third lens unit, the reference symbol $r_{II\text{-}4}$ designates radius of curvature on the extreme image side surface of the second lens unit, the reference symbol $D_{2W}$ denotes the airspace reserved between the second lens unit and the third lens unit at the wide position, and the reference symbol $D_{2T}$ represents the airspace reserved between the second lens unit and the third lens unit at the tele position.

The condition (10) defines ratio between radius of curvature on the extreme image side surface of the second lens unit and radius of curvature on the extreme object side surface of the third lens unit. Though the airspace reserved between these surfaces is not varied originally, the above-mentioned airspace is varied at the vari-focal time in the zoom lens system according to the present invention, whereby the aberrations are apt to be varied by the airspace at the vari-focal time. The zoom lens system according to the present invention is designed in such a manner that the above-mentioned variations of the aberrations or the actions of both the surfaces on the aberrations are cancelled by each other by selecting radii of curvature on both the surfaces so as to have values closer to each other.

If the upper limit (1.5) of the condition (10) is exceeded, the spherical aberration will be undercorrected in the vicinity of the intermediate focal length of the zoom lens system. If the lower limit (0.4) of the condition (10) is exceeded, a tendency to overcorrect the spherical aberration will be produced.

The condition (11) specifies the airspace on the optical axis between the second lens unit and the third lens unit. The zoom lens system according to the present invention is characterized in that the second lens unit and the third lens unit are shifted in the same direction while slightly varying the airspace reserved therebetween for varying focal length of the zoom lens system. Therefore, the zoom lens system according to the present invention makes it unnecessary to correct the chromatic aberrations produced in the second lens unit used as the so-called variator by the second lens unit itself, and allows to compose said lens unit of a small number of lens elements. This merit is obtained by correcting the chromatic aberration by the combination of the second lens unit and the third lens unit. When the motions of the second lens unit and the third lens unit are different excessively from each other, however, the variations of the aberrations are apt to be remarkable at the vari-focal time. For this reason, it is preferable to keep the difference of the airspace between the wide position and tele position at a possible minimum. If the upper limit (0.3) or the lower limit ($-0.2$) of the condition (11) is exceeded, the chromatic aberrations are apt to be varied at the vari-focal time.

Furthermore, it is desirable for the zoom lens system according to the present invention to satisfy the following condition (iv):

$$0 < \sqrt{f_W \cdot f_T} / r_{II-1} < 0.55 \qquad (iv)$$

The condition (iv) specifies radius of curvature ($r_{II-1}$) on the extreme object side surface of the second lens unit. If the upper limit of the condition (iv) is exceeded, $\overline{EP}_T$ is apt to have a large value. If the lower limit of the condition (iv) is exceeded, in contrast, the aberrations are apt to be varied at the vari-focal time, and the first lens unit is apt to mechanically interfere with the second lens unit. If the airspace between the first lens unit and the second lens unit is widened in order to prevent such interference, $\overline{EP}_T$ will have a large value.

In the conventional zoom lens system, the fixed lens unit arranged after the compensator comprises 6 to 8 lens elements, especially 7 lens element in most cases.

In the zoom lens system according to the present invention designed for an aperture ratio on the order of F/2.8, the fourth lens unit comprises 3 to 4 lens elements. In a case where the zoom lens system according to the present invention is designed for an aperture ratio on the order of F/2.0 or F/1.4, the fourth lens unit comprises 4 lens elements or 4 to 6 lens elements.

From the viewpoints that the zoom lens system should comprise a smaller number of lens elements and that the fourth lens unit is arranged as an imaging system, it is preferable to design the fourth lens unit as a triplet. Further, in order to correct the aberrations favorably, it is desirable to use a plural number of lens elements for composing some or all of the first positive lens component, the negative lens component and the second positive lens component of the triplet, or adopt aspherical surface in the fourth lens unit.

When the number of lens elements composing the fixed lens unit is reduced to a threshold, especially come is apt to be aggravated. This is because the offaxial upper rays are subjected to the strong converging action at the peripheral portion of the fixed lens unit (the fourth lens unit) and the longitudinal aberration thereof has a large negative value.

Further, correction of the spherical aberration and coma becomes more difficult as aperture ratio is higher.

For the reasons described above, it is preferable for the zoom lens system having an aperture ration on the order of F/2.8 to design the fourth lens unit as a triplet and adopt an aspherical surface on the second positive lens component arranged in the triplet or compose the second positive lens component of two lens elements. This is because rays at each image height are overlapped least with one another in the second positive lens component and, the spherical aberration and coma can be corrected easily and separately.

In case of the zoom lens system according to the present invention designed for an aperture ratio on the order of F/2.0 or F/1.4, it is possible to correct the spherical aberration and coma favorably by composing the first positive lens component, the negative lens component and the second positive lens component of one or two lens elements, one to three lens elements, and two or three lens elements respectively in the fourth lens unit. In order to correct the aberrations more favorably, it is preferable to adopt aspherical surface on the positive lens component, especially the second positive lens component or add, on the image side of the second positive lens component, a negative lens element having a strongly concave surface on the object side for the purpose of correcting the aberrations, thereby enhancing the imaging performance of the zoom lens system.

When an aspherical surface is adopted in the zoom lens system according to the present invention, it is undesirable to use the method to correct aberrations remarkably produced by a certain lens element by the aspherical surface formed on another lens element since influence due to lens eccentricity becomes remarkable. Therefore, it is desirable to minimize aberrations by using an aspherical surface on a lens element which would otherwise produce remarkable aberrations. Accordingly, the negative remarkable longitudinal aberration of the upper ray can be reduced by adopting an aspherical surface having portions whose refractive power becomes weaker than that of the portions in the vicinity of the optical axis as they are closer to the periphery on the second lens component producing remarkable coma. Further, when the zoom lens system has a large aperture ratio, it is necessary to correct the spherical aberration. For correcting this aberration, it is sufficient to adopt, on the first positive lens component, an aspherical surface similar to that described above, i.e., having portions whose refractive power becomes weaker as they are closer to the periphery.

The above-mentioned aspherical surfaces to be adopted in the zoom lens system according to the present invention are expressed by the following formula:

$$x = \frac{y^2/r}{1 + \sqrt{1 - P(y/r)^2}} + \sum_{i=1}^{n} A_{2i} y^{2i}$$

In the above-mentioned formula wherein x axis is taken in the direction of the optical axis and y axis is taken in the direction perpendicular to the optical axis, the reference symbol r represents radius of curvature on the optical axis and the reference symbols $A_{2i}$ and P designates coefficient of aspherical surface.

As is already described above, the zoom lens system according to the present invention can be composed of 9 to 11 lens elements when all the lens surfaces are spherical. The zoom lens system can be composed of 8 lens elements when aspherical surface(s) is adopted.

The number of lens elements can further be reduced by using graded refractive index type of lens element.

The reduction of the number of lens elements composing the zoom lens system is effective to reduce manufacturing cost and design compacter zoom lens system. Especially in case of the zoom lens system comprising the four lens units, the first lens unit is apt to have a large diameter, thereby enlarging the zoom lens system and increasing weight thereof. Therefore, it is very effective for designing a compacter zoom lens system and reducing weight thereof to minimize diameter of the first lens unit by using a graded refractive index type of lens element and adopt graded refractive index type of lens elements in the other lens units.

In the zoom lens system comprising the four lens units such as the zoom lens system according to the present invention, the first lens unit must have a diameter far larger than those of the other lens units in order to obtain a sufficient aperture ratio at the tele position and sufficient quantity of marginal ray in the vicinity of the maximum field angle. For this reason, it is necessary to design the first lens unit so as to have as small a diameter as possible and reduce the number of lens elements to a possible minimum in order to design a compacter zoom lens system having lighter weight.

However, the chromatic aberrations cannot be corrected by a single lens element made of a homogeneous medium and it is necessary to use at least two lens elements made of homogeneous media. Speaking concretely, it is necessary to use a positive lens element made of a material having low dispersing power and a negative lens element made of a material having high dispersing power to compose the lens unit having positive refractive power. However, when a negative lens element is arranged in the lens unit having positive refractive power, the positive lens element must have higher refractive power, thereby reducing radius of curvature thereof. In order to reserve the required diameter and adequate peripherical thickness, the positive lens element must have larger thickness, thereby making it difficult to design a more compact zoom lens system having lighter weight. Especially the negative lens element to be used in the first lens unit becomes a concave meniscus lens element which can hardly be manufactured, and if this lens element can be omitted, it will be possible to manufacture at a low cost a compact zoom lens system having light weight and stable performance. For the reason described above, however, it is impossible to omit the negative lens element in the optical system composed only of the lens element made of homogeneous media.

In order to design a more compact zoom lens system having lighter weight without aggravating the aberrations, especially the chromatic aberrations it is conceivable to use a graded refractive index type of lens element. This graded refractive index lens element is of the so-called radial type having refractive index distribution in the radial direction which is expressed by the following formula:

$$n(r) = n_0 + n_1 r^2 + n_2 r^4 + \ldots$$

wherein the reference symbol r represents distance as measured from the lens center in the radial direction, the reference symbol n(r) designates refractive index of a portion located at radius r from the lens center, the reference symbol $n_0$ denote refractive index of the lens center and the reference symbols $n_1$, $n_2$, ... represent constants. The graded refractive index lens element is made of a medium which has a refractive power dependent on the constant $n_1$ of the above-mentioned formula expressing refractive index distribution, and functions as a medium having a negative refractive power when $n_1$ has the positive sign or as a medium having positive refractive power when $n_1$ has the negative sign. Discussing within the application range of the paraxial theory, when a graded refractive index lens element is used as the positive lens element and a refractive index distribution having the negative sign of $n_1$ is selected, it is possible to impart a definite refractive power to the positive lens element having a large radius of curvature and minimize aberrations to be produced. Further, it is possible to reserve the required diameter and peripherical thickness for a thin lens elements, and design a zoom lens system having light weight. Further, when the negative lens element is designed as a graded refractive index lens element having a refractive index distribution for which the constant $n_1$ has the positive sign, it is possible to enlarge radius of curvature on the surface of the lens element, minimize aberrations to be produced and narrow the airspace to the neighboring lens element, thereby enabling to design a more compact zoom lens system.

On the basis of the foregoing descriptions, it is preferable to satisfy the following condition (12) when the positive lens element of the first lens unit is designed as a graded refractive index lens element in the zoom lens system according to the present invention:

$$-4.5 < f_W^2 \times n_1(1) < 0 \tag{12}$$

wherein the reference symbol $f_W$ represents focal length of the zoom lens system as a whole and the reference symbol n(1) designates the constant $n_1$ of the graded refractive index lens element used as the positive lens element in the first lens unit.

If the upper limit of the condition (12) is exceeded, the medium of the refractive index lens element used as the positive lens element in the first lens unit functions as a negative refractive power radius of curvature is minimized on the surface of this lens element, aberrations are produced remarkably and, in addition, the lens element must have a larger thickness to reserve the required lens diameter and peripherical thickness, thereby making it impossible to design the first lens unit and the zoom lens system accordingly so as to have compact sizes and light weights. If the lower limit (−4.5) of the condition (12) is exceeded, the refractive index lens element has too strong a refractive power, thereby making it difficult to correct the spherical aberration, coma and astigmatism especially at the tele position.

When the condition (12) is satisfied, the positive lens element in the first lens unit which is designed as the graded refractive index lens element can have a radius of curvature on the surface thereof larger than that of a lens element made of a homogeneous medium having the same refractive power. Further, the heights of the offaxial ray passing through the first lens unit and the marginal ray at the tele position are higher than those of the rays passing through the other lens units. Accordingly, the larger radius of curvature on the first lens unit reduces aberrations to be produced, and permits favorably correcting especially offaxial aberration and spherical aberration at the tele position. Further, since the lens surface has the larger radius of curvature, it is possible to reserve the required diameter and peripherical thickness of the first lens unit even when it is thinner. In addition, when the first lens unit is thinner, the entrance pupil is brought closer to the first surface of the lens system, thereby making it possible to minimize diameter of the first lens unit.

The highest effect obtained by adopting the graded refractive index lens element in the zoom lens system according to the present invention is to enable to correct the chromatic aberrations with a single graded refractive index lens element itself.

When a single graded refractive index lens element is adopted, the paraxial aberration therein is expressed as follows:

$$(\phi_S/\nu_0) + (\phi_M/\nu_1)$$

wherein the reference symbol $\phi_S$ represents refractive power on the lens surface, the reference symbol $\phi_M$ designates refractive index of the medium, the reference symbol $\nu_0$ denotes Abbe's number determined by the refractive index at the lens center and the reference symbol $\nu_1$ represents Abbe's number determined by the constant of refractive index distribution.

When a graded refractive index lens element made of a medium having positive refractive power is used as the positive lens element, for example, it is possible to zero the value of the above-mentioned $\phi_S/\nu_0)+(\phi_M/\nu_1)$ by selecting the negative sign for the Abbe's number determined by the constant $n_1$ of refractive index distribution and an adequate value for the Abbe's number. In other words, when the positive lens element has the same refractive index distribution at a short wavelength and a long wavelength, light is refracted at a larger angle at the short wavelength and the chromatic aberrations are produced accordingly. When a graded refractive index lens element made of a medium having positive refractive power is used as the positive lens element, however, the chromatic aberrations can be corrected by selecting such a refractive index distribution as to set variation ratio of refractive index at the short wavelength lower than that at the long wavelength, i.e., to set $\nu_1$ negative.

When a graded refractive index lens element is used as the positive lens element in the first lens unit, it is therefore preferable to satisfy the following condition (13):

$$0.01 < \{n_g(0) - n_d(0)\}/\{(n_g(r) - n_d(r)\} < 1 \quad (13)$$

wherein the reference symbols $n_g(0)$ and $n_d(0)$ represent refractive indices for the g-line and d-line respectively of the graded refractive index lens element used as the positive lens element in the first lens unit, and the reference symbols $n_g(r)$ and $n_d(r)$ designate refractive indices for the g-line and d-line respectively of the outermost periphery at the effective diameter of the above-mentioned graded refractive index lens element.

If the upper limit of the condition (13) is exceeded, $\nu_1$ will have a positive value, thereby making it impossible to correct the chromatic aberrations by the lens element only. If the lower limit of the condition (13) is exceeded, in contrast, $\nu_1$ will have too small a value and the chromatic aberrations will be overcorrected.

When the condition (13) is satisfied, it is possible to correct the chromatic aberrations by the graded refractive index lens element only. As a result, it is possible to compose the first lens unit only of a positive lens element designed as the graded refractive index lens element. By omitting the negative meniscus lens element arranged in the first lens unit mainly for correcting the chromatic aberrations, it is possible to facilitate manufacturing, assembly, adjustment of the first lens unit, and obtain a compact zoom lens system having light weight and stable performance.

Next, the fourth lens unit generally requires 6 to 8 lens elements for correcting the chromatic aberrations and spherical aberration. The zoom lens system according to the present invention, wherein the third lens unit is designed as a positive lens component, is capable of preventing the ray from being diverged by the third lens unit and correct aberrations with the fourth lens unit comprising four lens elements having spherical surfaces. In order to design the fourth lens unit having light weight by reducing the number of the lens elements composing said lens unit, it is preferable to adopt at least one graded refractive index lens element in the fourth lens unit so as to satisfy the following condition (14):

$$-4.5 < f_W^2 \times n_1(4) < 0 \quad (14)$$

wherein the reference symbol $n_1(4)$ represents constant $n_1$ of the graded refractive index lens element used in the fourth lens unit.

The fourth lens unit has positive refractive power as a whole. If the upper limit of the condition (14) is exceeded, the medium of the graded refractive index lens used in the fourth lens unit will function as negative refractive power, thereby imposing the burdens of positive refractive power to the other lens elements arranged in the fourth lens unit and producing undesirable effect for correcting aberrations. If the lower limit ($-4.5$) is exceeded, too heavy a burden of refractive power is imposed on the graded refractive lens element, thereby making it impossible to correct spherical aberration, coma and astigmatism in the range from the wide position to the tele position.

The fourth lens unit is composed of at least four lens elements made of homogeneous media mainly for the purpose of correcting the chromatic aberrations and spherical aberration. However, the graded refractive index lens has a function to correct the chromatic aberrations and the medium thereof also has refractive power as described above. Therefore, flexibility of aberration correction is increased to correct the aberrations produced by the graded refractive index lens element and the other lens elements. When the condition (14) is satisfied, it is possible to impart positive refractive power to the medium of the graded refractive index lens element, correct the aberrations by the lens surfaces having increased flexibility and the medium of the graded refractive index lens element, and compose the fourth lens unit of three or fewer lens elements, thereby reducing weight of the fourth lens unit.

In order to design the zoom lens system according to the present invention further more compact, it is desirable to satisfy the following conditions (viii) and (ix):

$$H/f_W < 4 \quad \text{(viii)}$$

$$E/f_W < 2.3 \quad \text{(ix)}$$

wherein the reference symbol H represents distance between the principal points of the zoom lens system as a whole at the wide position, and the reference symbol E designates position of the entrance pupil of the zoom lens system as a whole at the wide position.

The condition (viii) defines total length of the zoom lens system as a whole. If $H/f_W$ is larger than 4, it will be impossible to shorten total length of the zoom lens system.

The condition (ix) specifies diameter of the front lens element arranged in the zoom lens system. If $E/f_W$ is larger than 2.3, diameter of the front lens element will be too large to design a compact zoom lens system having light weight.

In case of a lens system such as the zoom lens system according to the present invention, vari-focal ratio is dependent on the second lens unit having negative refractive power. In order to reserve the vari-focal ratio required for the zoom lens system according to the present invention and obtain a zoom lens system wherein aberrations are varied little during variation of focal length thereof, it is desirable to satisfy the following condition (x):

$$-1.3 < f_2/f_W < 0.3 \quad \text{(x)}$$

wherein the reference symbol $f_2$ represents focal length of the second lens unit.

If $f_2/f_W$ is larger than $-0.3$ defined as the upper limit of the condition (x), the second lens unit will have too strong refractive power to suppress variations of aberrations during variation of focal length of the zoom lens system. If $f_2/f_W$ is smaller than $-1.3$ defined as the lower limit of the condition (x), the second lens unit must be shifted for a long distance to reserve the required vari-focal ratio and the zoom lens system as a whole will have a long total length.

BRIEF DESCRIPTION OF THE DRAWINGS

FIGS. 1 through 22 show sectional views illustrating Embodiments 1 through 22 of the zoom lens system according to the present invention;

DETAILED DESCRIPTION OF THE PREFERRED EMBODIMENTS

Figure 1:
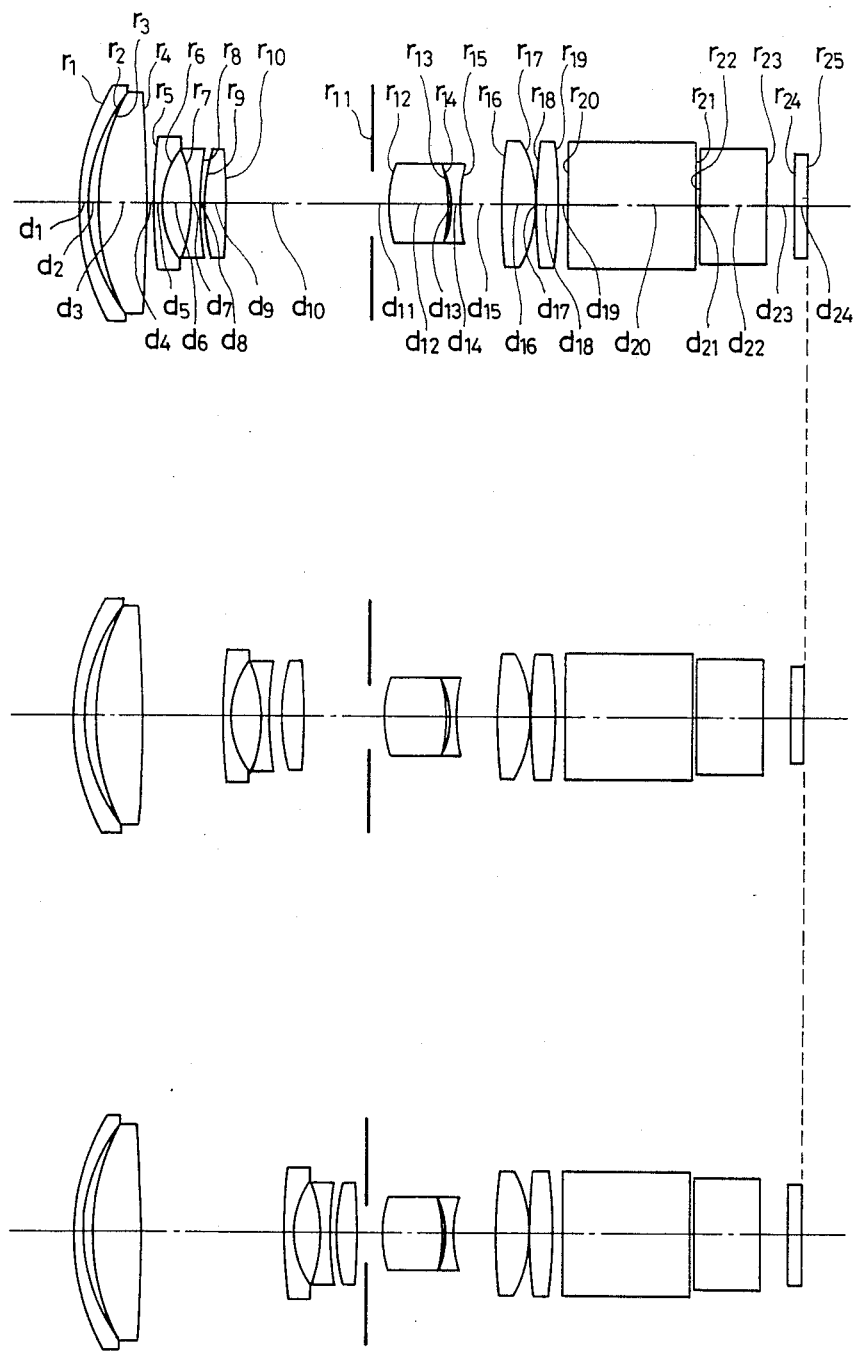
Figure 2:
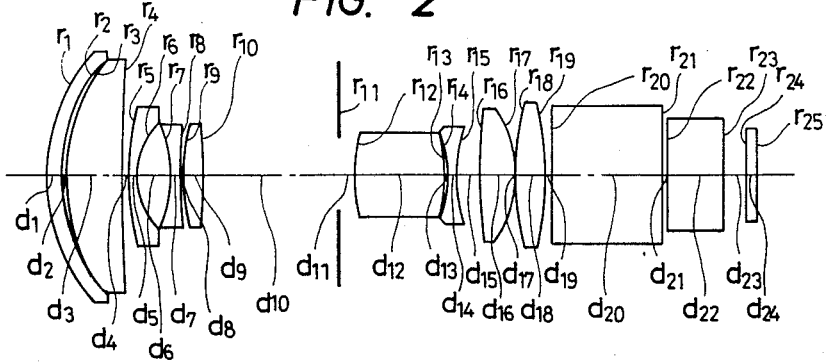
Figure 3:
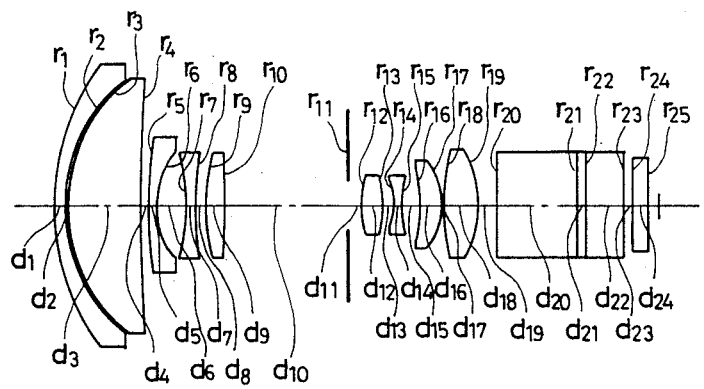
Figure 4:
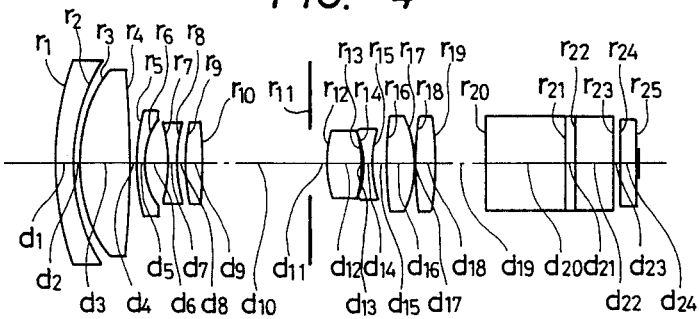
Figure 5:
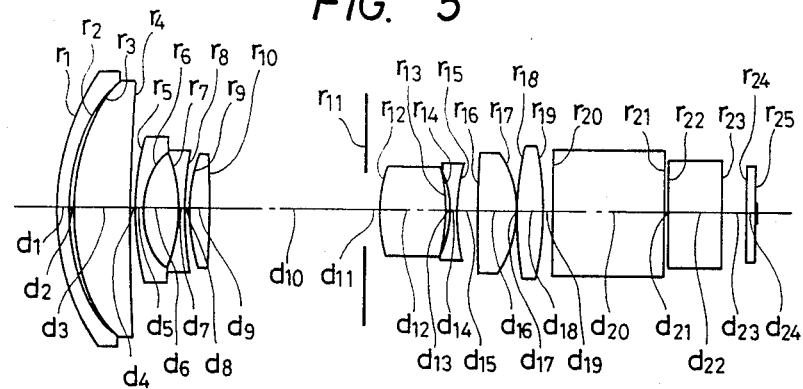
Figure 6:
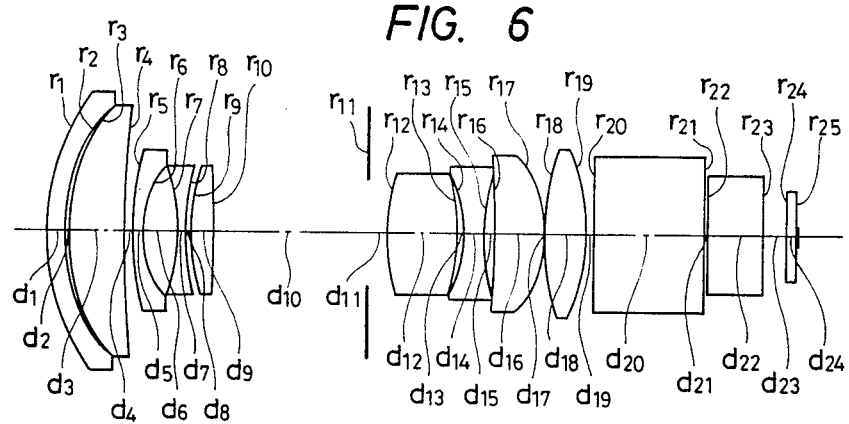

Now, the present invention will be described more detailedly with reference to the preferred embodiments.

| Embodiment 1 $f = 9-27, F/2.8, 2\omega = 48.8°-18.2°$ | | | |
|---|---|---|---|
| $r_1 = 21.5528$ | | | |
| | $d_1 = 1.2000$ | $n_1 = 1.84666$ | $\nu_1 = 23.78$ |
| $r_2 = 16.9152$ | | | |
| | $d_2 = 0.6500$ | | |
| $r_3 = 19.6785$ | | | |
| | $d_3 = 4.7000$ | $n_2 = 1.69680$ | $\nu_2 = 55.52$ |
| $r_4 = -244.2957$ | | | |
| | $d_4 = D_1$ (variable) | | |
| $r_5 = 73.0405$ | | | |
| | $d_5 = 0.9000$ | $n_3 = 1.69680$ | $\nu_3 = 55.52$ |
| $r_6 = 8.7907$ | | | |
| | $d_6 = 2.5000$ | | |
| $r_7 = -15.8099$ | | | |
| | $d_7 = 1.0000$ | $n_4 = 1.69680$ | $\nu_4 = 55.52$ |
| $r_8 = 27.5815$ | | | |
| | $d_8 = D_2$ (variable) | | |
| $r_9 = 19.7610$ | | | |
| | $d_9 = 1.9000$ | $n_5 = 1.84666$ | $\nu_5 = 23.78$ |
| $r_{10} = -107.1367$ | | | |
| | $d_{10} = D_3$ (variable) | | |
| $r_{11} = \infty$ (stop) | | | |
| | $d_{11} = 1.5000$ | | |
| $r_{12} = 11.3607$ | | | |
| | $d_{12} = 5.4561$ | $n_6 = 1.83400$ | $\nu_6 = 37.16$ |
| $r_{13} = -16.8080$ | | | |
| | $d_{13} = 0.2000$ | | |
| $r_{14} = -11.0821$ | | | |
| | $d_{14} = 1.0000$ | $n_7 = 1.84666$ | $\nu_7 = 23.78$ |
| $r_{15} = 10.7766$ | | | |
| | $d_{15} = 4.0108$ | | |
| $r_{16} = 81.4908$ | | | |
| | $d_{16} = 3.0000$ | $n_8 = 1.69680$ | $\nu_8 = 55.52$ |
| $r_{17} = -12.4750$ | | | |
| | $d_{17} = 0.1500$ | | |
| $r_{18} = 48.4255$ | | | |
| | $d_{18} = 2.1000$ | $n_9 = 1.69680$ | $\nu_9 = 55.52$ |
| $r_{19} = -39.9795$ | | | |
| | $d_{19} = 1.0000$ | | |
| $r_{20} = \infty$ | | | |
| | $d_{20} = 12.0000$ | $n_{10} = 1.51633$ | $\nu_{10} = 64.15$ |
| $r_{21} = \infty$ | | | |
| | $d_{21} = 0.3000$ | | |
| $r_{22} = \infty$ | | | |
| | $d_{22} = 6.0000$ | $n_{11} = 1.54771$ | $\nu_{11} = 62.83$ |
| $r_{23} = \infty$ | | | |
| | $d_{23} = 2.5000$ | | |
| $r_{24} = \infty$ | | | |
| | $d_{24} = 1.0000$ | $n_{12} = 1.51633$ | $\nu_{12} = 64.15$ |
| $r_{25} = \infty$ | | | |

-continued

| Embodiment 1 |
|---|
| f = 9-27, F/2.8, 2ω = 48.8°-18.2° |

| f | 9.279 | 15.554 | 26.242 |
|---|---|---|---|
| $D_1$ | 0.600 | 7.569 | 13.367 |
| $D_2$ | 0.502 | 1.136 | 0.500 |
| $D_3$ | 13.597 | 5.994 | 0.832 |

$\Delta x_3/\Delta x_2 = 1.2$ (wide position)   $\Delta x_3/\Delta x_2 = 0.7$ (tele position)

$|f_{II\ III}|/\sqrt{f_W \cdot f_T} = 0.759$   $f_{III}/|f_{II\ III}| = 1.676$ $r_{III} - 1/r_{II} - 4 = 0.716$   $\nu_{II} = 55.52$
$\nu_{II} - \nu_{III} = 31.74$   $\nu_{I-2} - \nu_{I-1} = 31.74$
$f_I/|f_{I-1}| = 0.341$   $f_{IV}/f_{IV\ -F} = -0.047$
$D_{IV-4}/f_{IV} = 0.266$   $(D_{IV-1} + D_{IV-3})/f_{IV} = 0.429$

| Embodiment 2 |
|---|
| f = 9-27, F/2.0, 2ω = 48.6°-18.2° |

| | | | |
|---|---|---|---|
| $r_1 = 21.6083$ | $d_1 = 1.2000$ | $n_1 = 1.84666$ | $\nu_1 = 23.78$ |
| $r_2 = 17.3958$ | $d_2 = 0.9000$ | | |
| $r_3 = 19.7348$ | $d_3 = 5.9000$ | $n_2 = 1.69680$ | $\nu_2 = 55.52$ |
| $r_4 = 464.3241$ | $d_4 = D_1$ (variable) | | |
| $r_5 = 30.9991$ | $d_5 = 0.9000$ | $n_3 = 1.69680$ | $\nu_3 = 55.52$ |
| $r_6 = 8.3828$ | $d_6 = 3.5000$ | | |
| $r_7 = -15.7830$ | $d_7 = 1.0000$ | $n_4 = 1.69680$ | $\nu_4 = 55.52$ |
| $r_8 = 35.4370$ | $d_8 = D_2$ (variable) | | |
| $r_9 = 23.3900$ | $d_9 = 2.0000$ | $n_5 = 1.84666$ | $\nu_5 = 23.78$ |
| $r_{10} = -119.7807$ | $d_{10} = D_3$ (variable) | | |
| $r_{11} = \infty$ (stop) | $d_{11} = 1.5000$ | | |
| $r_{12} = 19.0913$ | $d_{12} = 9.6237$ | $n_6 = 1.83400$ | $\nu_6 = 37.16$ |
| $r_{13} = -21.6849$ | $d_{13} = 0.4000$ | | |
| $r_{14} = -11.8618$ | $d_{14} = 1.0000$ | $n_7 = 1.84666$ | $\nu_7 = 23.78$ |
| $r_{15} = 17.4006$ | $d_{15} = 2.2789$ | | |
| $r_{16} = 52.7559$ | $d_{16} = 4.0000$ | $n_8 = 1.69680$ | $\nu_8 = 55.52$ |
| $r_{17} = -13.2555$ | $d_{17} = 0.1500$ | | |
| $r_{18} = 33.7589$ | $d_{18} = 2.9000$ | $n_9 = 1.69680$ | $\nu_9 = 55.52$ |
| $r_{19} = -35.5295$ | $d_{19} = 1.0000$ | | |
| $r_{20} = \infty$ | $d_{20} = 12.0000$ | $n_{10} = 1.51633$ | $\nu_{10} = 64.15$ |
| $r_{21} = \infty$ | $d_{21} = 0.3000$ | | |
| $r_{22} = \infty$ | $d_{22} = 6.0000$ | $n_{11} = 1.54771$ | $\nu_{11} = 62.83$ |
| $r_{23} = \infty$ | $d_{23} = 2.5000$ | | |
| $r_{24} = \infty$ | $d_{24} = 1.0000$ | $n_{12} = 1.51633$ | $\nu_{12} = 64.15$ |
| $r_{25} = \infty$ | | | |

| f | 9.298 | 15.504 | 26.134 |
|---|---|---|---|
| $D_1$ | 0.600 | 8.164 | 14.352 |
| $D_2$ | 0.507 | 1.276 | 0.500 |
| $D_3$ | 14.577 | 6.245 | 0.832 |

$\Delta x_3/\Delta x_2 = 1.25$ (wide position)   $\Delta x_3/\Delta x_2 = 0.65$ (tele position)

-continued

| Embodiment 2 |
|---|
| f = 9-27, F/2.0, 2ω = 48.6°-18.2° |

$|f_{II\ III}|/\sqrt{f_W \cdot f_T} = 0.811$   $f_{III}/|f_{II\ III}| = 1.837$ $r_{III-1}/r_{II-4} = 0.660$   $\nu_{II} = 55.52$
$\nu_{II} - \nu_{III} = 31.74$   $\nu_{I-2} - \nu_{I-1} = 31.74$
$f_I/|f_{I-1}| = 0.329$   $f_{IV}/f_{IV\ -F} = -0.232$
$D_{IV-4}/f_{IV} = 0.148$   $(D_{IV-1} + D_{IV-3})/f_{IV} = 0.692$

| Embodiment 3 |
|---|
| f = 8-24, F/2.8 |

| | | | |
|---|---|---|---|
| $r_1 = 24.7617$ | $d_1 = 1.2000$ | $n_1 = 1.84666$ | $\nu_1 = 23.78$ |
| $r_2 = 17.1917$ | $d_2 = 0.5000$ | | |
| $r_3 = 17.9233$ | $d_3 = 8.0000$ | $n_2 = 1.77250$ | $\nu_2 = 49.66$ |
| $r_4 = 292.8233$ | $d_4 = D_1$ (variable) | | |
| $r_5 = 50.4082$ | $d_5 = 0.9000$ | $n_3 = 1.69680$ | $\nu_3 = 55.52$ |
| $r_6 = 8.4202$ | $d_6 = 3.4000$ | | |
| $r_7 = -16.7250$ | $d_7 = 0.9000$ | $n_4 = 1.69680$ | $\nu_4 = 55.52$ |
| $r_8 = 35.7904$ | $d_8 = D_2$ (variable) | | |
| $r_9 = 21.8570$ | $d_9 = 2.0000$ | $n_5 = 1.84666$ | $\nu_5 = 23.78$ |
| $r_{10} = -326.2179$ | $d_{10} = D_3$ (variable) | | |
| $r_{11} = \infty$ (stop) | $d_{11} = 1.5000$ | | |
| $r_{12} = 9.3737$ | $d_{12} = 2.5000$ | $n_6 = 1.74950$ | $\nu_6 = 35.27$ |
| $r_{13} = -14.4963$ | $d_{13} = 1.1838$ | | |
| $r_{14} = -7.3176$ | $d_{14} = 1.0000$ | $n_7 = 1.84666$ | $\nu_7 = 23.78$ |
| $r_{15} = 10.8802$ | $d_{15} = 1.8442$ | | |
| $r_{16} = -14.1044$ | $d_{16} = 2.3000$ | $n_8 = 1.60311$ | $\nu_8 = 60.70$ |
| $r_{17} = -7.2266$ | $d_{17} = 0.1500$ | | |
| $r_{18} = 23.7943$ | $d_{18} = 3.8000$ | $n_9 = 1.60311$ | $\nu_9 = 60.70$ |
| $r_{19} = -12.2012$ | $d_{19} = 2.0000$ | | |
| $r_{20} = \infty$ | $d_{20} = 8.6000$ | $n_{10} = 1.51633$ | $\nu_{10} = 64.15$ |
| $r_{21} = \infty$ | $d_{21} = 1.0000$ | $n_{11} = 1.51633$ | $\nu_{11} = 64.15$ |
| $r_{22} = \infty$ | $d_{22} = 4.0000$ | $n_{12} = 1.54771$ | $\nu_{12} = 62.83$ |
| $r_{23} = \infty$ | $d_{23} = 0.8000$ | | |
| $r_{24} = \infty$ | $d_{24} = 1.7000$ | $n_{13} = 1.51633$ | $\nu_{13} = 64.15$ |
| $r_{25} = \infty$ | | | |

| | W | S | T |
|---|---|---|---|
| $D_1$ | 0.600 | 7.614 | -13.283 |
| $D_2$ | 1.049 | 1.814 | 1.000 |
| $D_3$ | 13.466 | 5.687 | 0.832 |

$|f_{II\ III}|/\sqrt{f_W \cdot f_T} = 0.8526$, $f_{III}/|f_{II\ III}| = 2.0542$ $f_I/|f_{I-1}| = 0.5324$, $\nu_{II} - \nu_{III} = 31.74$ $\nu_{I-2} - \nu_{I-1} = 25.88$, $\sqrt{f_W \cdot f_T}/f_{I\ II\ III} = -0.6041$ $|f_{II}/f_I| = 0.1815$, $r_{III-1}/r_{II-4} = 0.6107$

Embodiment 3
f = 8 − 24, F/2.8

$D_{2W} - D_{2T}/\sqrt{f_W \cdot f_T} = 0.003$, $\overline{EP_T} = 63.515$ $I_2 = 31.696°$, $\Sigma D_I/\sqrt{f_W \cdot f_T} = 0.7003$ $f_W = 8.264$, $\sqrt{f_W \cdot f_T} = 13.850$
$f_T = 23.213$

Embodiment 4
f = 9 − 27, F/2.8

| | | | |
|---|---|---|---|
| $r_1 = 35.6256$ | $d_1 = 1.8000$ (aspherical surface) | $n_1 = 1.84666$ | $\nu_1 = 23.78$ |
| $r_2 = 22.2778$ | $d_2 = 0.6000$ | | |
| $r_3 = 17.1279$ | $d_3 = 5.6000$ | $n_2 = 1.69680$ | $\nu_2 = 55.52$ |
| $r_4 = -112.6184$ | $d_4 = D_1$ (variable) | | |
| $r_5 = 25.0568$ | $d_5 = 0.9000$ | $n_3 = 1.69680$ | $\nu_3 = 55.52$ |
| $r_6 = 7.1988$ | $d_6 = 2.6000$ | | |
| $r_7 = -14.8105$ | $d_7 = 0.9000$ | $n_4 = 1.69680$ | $\nu_4 = 55.52$ |
| $r_8 = 13.5090$ | $d_8 = D_2$ (variable) | | |
| $r_9 = 16.9942$ | $d_9 = 2.0000$ | $n_5 = 1.84666$ | $\nu_5 = 23.78$ |
| $r_{10} = -84.8888$ | $d_{10} = D_3$ (variable) | | |
| $r_{11} = \infty$ (stop) | $d_{11} = 1.5000$ | | |
| $r_{12} = 12.4241$ | $d_{12} = 4.0083$ | $n_6 = 1.74950$ | $\nu_6 = 35.27$ |
| $r_{13} = -16.3307$ | $d_{13} = 0.1500$ | | |
| $r_{14} = -12.7950$ | $d_{14} = 1.0000$ | $n_7 = 1.84666$ | $\nu_7 = 23.78$ |
| $r_{15} = 13.1953$ | $d_{15} = 1.4390$ | | |
| $r_{16} = 37.5930$ | $d_{16} = 3.0000$ | $n_8 = 1.69680$ | $\nu_8 = 55.52$ |
| $r_{17} = -14.0396$ | $d_{17} = 0.1500$ | | |
| $r_{18} = 33.3805$ | $d_{18} = 2.2000$ | $n_9 = 1.69680$ | $\nu_9 = 55.52$ |
| $r_{19} = -48.7903$ | $d_{19} = 5.4000$ | | |
| $r_{20} = \infty$ | $d_{20} = 8.6000$ | $n_{10} = 1.51633$ | $\nu_{10} = 64.15$ |
| $r_{21} = \infty$ | $d_{21} = 1.0000$ | $n_{11} = 1.51633$ | $\nu_{11} = 64.15$ |
| $r_{22} = \infty$ | $d_{22} = 4.0000$ | $n_{12} = 1.54771$ | $\nu_{12} = 62.83$ |
| $r_{23} = \infty$ | $d_{23} = 0.8000$ | | |
| $r_{24} = \infty$ | $d_{24} = 1.7000$ | $n_{13} = 1.51633$ | $\nu_{13} = 64.15$ |
| $r_{25} = \infty$ | | | |

Aspherical coefficient P = 1,
$A_4 = 0.20329 \times 10^{-5}$, $A_6 = 0.24324 \times 10^{-6}$
$A_8 = -0.17558 \times 10^{-8}$, $A_{10} = 0.69383 \times 10^{-11}$

| | W | S | T |
|---|---|---|---|
| $D_1$ | 0.600 | 6.490 | 11.247 |
| $D_2$ | 0.800 | 1.330 | 0.800 |
| $D_3$ | 11.979 | 5.559 | 1.332 |

$|f_{II\ III}|/\sqrt{f_W \cdot f_T} = 0.6294$, $f_{III}/|f_{II\ III}| = 1.7208$ $f_I/|f_{I-1}| = 0.4142$, $\nu_{II} - \nu_{III} = 31.74$

Embodiment 4
f = 9 − 27, F/2.8

$\nu_{I-2} - \nu_{I-1} + 31.74$, $\sqrt{f_W \cdot f_T}/f_{I\ II\ III} = -0.8447$ $|f_{II}|/f_I = 0.1740$, $r_{III\text{-}1}/r_{II\text{-}4} = 1.2580$ $D_{2W} - D_{2T}/\sqrt{f_W \cdot f_T} = 0$, $\overline{EP_T} = 52.059$ $I_2 = 12.899°$, $\Sigma D_I/\sqrt{f_W \cdot f_T} = 0.5134$ $f_W = 9.271$, $\sqrt{f_W \cdot f_T} = 15.582$
$f_T = 26.189$

Embodiment 5
f = 9 − 27, F/2.0

| | | | |
|---|---|---|---|
| $r_1 = 23.8234$ | $d_1 = 1.2000$ | $n_1 = 1.84666$ | $\nu_1 = 23.78$ |
| $r_2 = 18.6794$ | $d_2 = 0.5700$ | | |
| $r_3 = 20.0086$ | $d_3 = 6.3000$ | $n_2 = 1.69680$ | $\nu_2 = 55.52$ |
| $r_4 = 177.8620$ | $d_4 = D_1$ (variable) | | |
| $r_5 = 33.4039$ | $d_5 = 0.9000$ | $n_3 = 1.69680$ | $\nu_3 = 55.52$ |
| $r_6 = 8.6186$ | $d_6 = 3.5000$ | | |
| $r_7 = -18.3635$ | $d_7 = 1.0000$ | $n_4 = 1.69680$ | $\nu_4 = 55.52$ |
| $r_8 = 38.2427$ | $d_8 = D_2$ (variable) | | |
| $r_9 = 22.4777$ | $d_9 = 2.0000$ | $n_5 = 1.84666$ | $\nu_5 = 23.78$ |
| $r_{10} = -128.1210$ | $d_{10} = D_3$ (variable) | | |
| $r_{11} = \infty$ (stop) | $d_{11} = 1.5000$ | | |
| $r_{12} = 21.4125$ | $d_{12} = 7.0026$ | $n_6 = 1.83400$ | $\nu_6 = 37.16$ |
| $r_{13} = -19.9397$ | $d_{13} = 0.4000$ | | |
| $r_{14} = -11.5463$ | $d_{14} = 1.0000$ | $n_7 = 1.84666$ | $\nu_7 = 23.78$ |
| $r_{15} = 24.2984$ | $d_{15} = 1.9619$ | | |
| $r_{16} = 197.3237$ | $d_{16} = 4.0000$ | $n_8 = 1.69680$ | $\nu_8 = 55.52$ |
| $r_{17} = -13.1165$ | $d_{17} = 0.1500$ | | |
| $r_{18} = 34.9126$ | $d_{18} = 2.9000$ | $n_9 = 1.69680$ | $\nu_9 = 55.52$ |
| $r_{19} = -34.9024$ | $d_{19} = 1.0000$ | | |
| $r_{20} = \infty$ | $d_{20} = 12.0000$ | $n_{10} = 1.51633$ | $\nu_{10} = 64.15$ |
| $r_{21} = \infty$ | $d_{21} = 0.3000$ | | |
| $r_{22} = \infty$ | $d_{22} = 6.0000$ | $n_{11} = 1.54771$ | $\nu_{11} = 62.83$ |
| $r_{23} = \infty$ | $d_{23} = 2.5000$ | | |
| $r_{24} = \infty$ | $d_{24} = 1.0000$ | $n_{12} = 1.51633$ | $\nu_{12} = 64.15$ |
| $r_{25} = \infty$ | | | |

| | W | S | T |
|---|---|---|---|
| $D_1$ | 0.600 | 9.247 | 16.481 |
| $D_2$ | 0.501 | 1.210 | 0.500 |
| $D_3$ | 16.712 | 7.356 | 0.832 |

$|f_{II\ III}|/\sqrt{f_W \cdot f_T} = 0.9375$, $f_{III}/|f_{II\ III}| = 1.5527$

-continued

Embodiment 5
f = 9 — 27, F/2.0

$f_I/|f_{I-1}| = 0.3977$, $\nu_{II} - \nu_{III} = 31.74$ $\nu_{I-2} - \nu_{I-1} = 31.74$, $\sqrt{f_W \cdot f_T}/f_{I\,II\,III} = -0.5764$ $|f_{II}|/f_I = 0.1725$, $r_{III-1}/r_{II-4} = 0.5878$ $D_{2W} = D_{2T}/\sqrt{f_W \cdot f_T} = 0$, $\overline{EP_T} = 64.853$ $I_2 = 24.672°$, $\Sigma D_I/\sqrt{f_W \cdot f_T} = 0.5169$ $f_W = 9.291$, $\sqrt{f_W \cdot f_T} = 15.612$ $f_T = 26.234$

Embodiment 6
f = 9 — 27, F/1.4

| | | | |
|---|---|---|---|
| $r_1 = 24.5240$ | | | |
| | $d_1 = 2.0000$ | $n_1 = 1.84666$ | $\nu_1 = 23.78$ |
| $r_2 = 19.0800$ | | | |
| | $d_2 = 0.6000$ | | |
| $r_3 = 20.4803$ | | | |
| | $d_3 = 6.3000$ | $n_2 = 1.69680$ | $\nu_2 = 55.52$ |
| $r_4 = 195.5354$ | | | |
| | $d_4 = D_1$ (variable) | | |
| $r_5 = 38.0267$ | | | |
| | $d_5 = 0.9000$ | $n_3 = 1.69680$ | $\nu_3 = 55.52$ |
| $r_6 = 9.7446$ | | | |
| | $d_6 = 3.8000$ | | |
| $r_7 = -21.0838$ | | | |
| | $d_7 = 1.0000$ | $n_4 = 1.69680$ | $\nu_4 = 55.52$ |
| $r_8 = 31.2438$ | | | |
| | $d_8 = D_2$ (variable) | | |
| $r_9 = 22.4284$ | | | |
| | $d_9 = 2.3000$ | $n_5 = 1.84666$ | $\nu_5 = 23.78$ |
| $r_{10} = -844.1494$ | | | |
| | $d_{10} = D_3$ (variable) | | |
| $r_{11} = \infty$ (stop) | | | |
| | $d_{11} = 1.9626$ | | |
| $r_{12} = 23.9559$ | | | |
| | $d_{12} = 7.3226$ | $n_6 = 1.83400$ | $\nu_6 = 37.16$ |
| $r_{13} = -28.1229$ | | | |
| | $d_{13} = 1.1000$ | | |
| $r_{14} = -11.9093$ | | | |
| | $d_{14} = 2.1541$ | $n_7 = 1.84666$ | $\nu_7 = 23.78$ |
| $r_{15} = 30.7128$ | | | |
| | $d_{15} = 0.8500$ | | |
| $r_{16} = -449.3856$ (aspherical surface) | | | |
| | $d_{16} = 5.4000$ | $n_8 = 1.69680$ | $\nu_8 = 55.52$ |
| $r_{17} = -12.9747$ | | | |
| | $d_{17} = 0.1500$ | | |
| $r_{18} = 34.1383$ (aspherical surface) | | | |
| | $d_{18} = 4.2000$ | $n_9 = 1.69680$ | $\nu_9 = 55.52$ |
| $r_{19} = -25.0257$ | | | |
| | $d_{19} = 1.0000$ | | |
| $r_{20} = \infty$ | | | |
| | $d_{20} = 12.0000$ | $n_{10} = 1.51633$ | $\nu_{10} = 64.15$ |
| $r_{21} = \infty$ | | | |
| | $d_{21} = 0.3000$ | | |
| $r_{22} = \infty$ | | | |
| | $d_{22} = 6.0000$ | $n_{11} = 1.54771$ | $\nu_{11} = 62.83$ |
| $r_{23} = \infty$ | | | |
| | $d_{23} = 2.5000$ | | |
| $r_{24} = \infty$ | | | |
| | $d_{24} = 1.0000$ | $n_{12} = 1.51633$ | $\nu_{12} = 64.15$ |
| $r_{25} = \infty$ | | | |

-continued

Embodiment 6

Aspherical coefficient $(r_{16})\ P = 1$,
$A_4 = -0.51000 \times 10^{-4}$, $A_6 = -0.15072 \times 10^{-6}$
$A_8 = 0.12371 \times 10^{-8}$, $A_{10} = 0.19910 \times 10^{-9}$
$(r_{18})\ P = 1$,
$A_4 = 0.49152 \times 10^{-5}$, $A_6 = 0.33530 \times 10^{-7}$
$A_8 = 0.23344 \times 10^{-8}$, $A_{10} = -0.28938 \times 10^{-10}$

| | W | S | T |
|---|---|---|---|
| $D_1$ | 0.600 | 9.286 | 16.341 |
| $D_2$ | 0.517 | 1.378 | 0.500 |
| $D_3$ | 16.556 | 7.009 | 0.832 |

$|f_{II\,III}|/\sqrt{f_W \cdot f_T} = 0.9322$, $f_{III}/|f_{II\,III}| = 1.7791$ $f_I/|f_{I-1}| = 0.3791$, $\nu_{II} - \nu_{III} = 31.74$ $\nu_{I-2} - \nu_{I-1} = 31.74$ $\sqrt{f_W \cdot f_T}/f_{I\,II\,III} = -0.5643$ $|f_{II}|/f_I = 0.1807$, $r_{III-1}/r_{II-4} = 0.7179$ $D_{2W} - D_{2T}/\sqrt{f_W \cdot f_T} = 0.0010$, $\overline{EP_T} = 68.326$ $I_2 = 25.948°$, $\Sigma D_I/\sqrt{f_W \cdot f_T} = 0.5713$ $f_W = 9.270$, $\sqrt{f_W \cdot f_T} = 15.579$ $f_T = 26.182$

Embodiment 7
f = 9 — 27, F/2.8

| | | | |
|---|---|---|---|
| $r_1 = 21.9151$ | | | |
| | $d_1 = 1.5000$ | $n_1 = 1.84666$ | $\nu_1 = 23.78$ |
| $r_2 = 16.0839$ | | | |
| | $d_2 = 0.3600$ | | |
| $r_3 = 17.2540$ | | | |
| | $d_3 = 4.8000$ | $n_2 = 1.69680$ | $\nu_2 = 55.52$ |
| $r_4 = -3292.7723$ | | | |
| | $d_4 = D_1$ (variable) | | |
| $r_5 = 164.4336$ | | | |
| | $d_5 = 0.9000$ | $n_3 = 1.69680$ | $\nu_3 = 55.52$ |
| $r_6 = 8.4875$ | | | |
| | $d_6 = 2.4000$ | | |
| $r_7 = -20.6943$ | | | |
| | $d_7 = 0.9000$ | $n_4 = 1.69680$ | $\nu_4 = 55.52$ |
| $r_8 = 29.0038$ | | | |
| | $d_8 = D_2$ (variable) | | |
| $r_9 = 18.3911$ | | | |
| | $d_9 = 2.0000$ | $n_5 = 1.84666$ | $\nu_5 = 23.78$ |
| $r_{10} = -744.3524$ | | | |
| | $d_{10} = D_3$ (variable) | | |
| $r_{11} = \infty$ (stop) | | | |
| | $d_{11} = 1.5000$ | | |
| $r_{12} = 11.1728$ | | | |
| | $d_{12} = 4.0000$ | $n_6 = 1.79952$ | $\nu_6 = 42.24$ |
| $r_{13} = -15.9029$ | | | |
| | $d_{13} = 0.2000$ | | |
| $r_{14} = -11.6773$ | | | |
| | $d_{14} = 1.3000$ | $n_7 = 1.76182$ | $\nu_7 = 26.52$ |
| $r_{15} = 12.4752$ | | | |
| | $d_{15} = 2.2149$ | | |
| $r_{16} = 28.0903$ (aspherical surface) | | | |
| | $d_{16} = 4.3000$ | $n_8 = 1.69680$ | $\nu_8 = 55.52$ |
| $r_{17} = -11.4342$ | | | |
| | $d_{17} = 1.0000$ | | |
| $r_{18} = \infty$ | | | |
| | $d_{18} = 0.5000$ | $n_9 = 1.51633$ | $\nu_9 = 64.15$ |

-continued

Embodiment 7

$r_{19} = \infty$
$d_{19} = 7.9000$, $n_{10} = 1.51633$, $\nu_{10} = 64.15$ $r_{20} = \infty$
$d_{20} = 1.0000$, $n_{11} = 1.51633$, $\nu_{11} = 64.15$ $r_{21} = \infty$
$d_{21} = 5.1000$, $n_{12} = 1.54771$, $\nu_{12} = 62.83$ $r_{22} = \infty$
$d_{22} = 0.9000$ $r_{23} = \infty$
$d_{23} = 0.7000$, $n_{13} = 1.51633$, $\nu_{13} = 64.15$ $r_{24} = \infty$
$d_{24} = 0.3100$ $r_{25} = \infty$
$d_{25} = 0.6000$, $n_{14} = 1.48749$, $\nu_{14} = 70.20$ $r_{26} = \infty$ Aspherical coefficient $P = 1$,
$A_4 = -0.16225 \times 10^{-3}$, $A_6 = -0.77431 \times 10^{-5}$
$A_8 = 0.68322 \times 10^{-6}$, $A_{10} = -0.18974 \times 10^{-7}$

|  | W | S | T |
|---|---|---|---|
| $D_1$ | 0.600 | 7.783 | 13.680 |
| $D_2$ | 0.800 | 1.488 | 0.800 |
| $D_3$ | 14.379 | 6.509 | 1.300 |

$|f_{II\,III}|/\sqrt{f_W \cdot f_T} = 0.7730$, $f_{III}/|f_{II\,III}| = 1.7621$ $f_I/|f_{I-1}| = 0.4553$, $\nu_{II} - \nu_{III} = 31.74$ $\nu_{I-2} - \nu_{I-1} = 31.74$, $\sqrt{f_W \cdot f_T}/f_{I\,II\,III} = -0.7106$ $|f_{II}|/f_I = 0.1840$, $r_{III-1}/r_{II-4} = 0.6341$ $D_{2W} - D_{2T}/\sqrt{f_W \cdot f_T} = 0$, $\overline{EP_T} = 54.738$ $I_2 = 23.967°$, $\Sigma D_I/\sqrt{f_W \cdot f_T} = 0.4274$ $f_W = 9.270$, $\sqrt{f_W \cdot f_T} = 15.581$ $f_T = 26.190$

Embodiment 8
f = 9 − 27, F/2.0

$r_1 = 23.8134$
$d_1 = 1.2000$, $n_1 = 1.84666$, $\nu_1 = 23.78$ $r_2 = 18.9173$
$d_2 = 0.5700$ $r_3 = 20.3588$
$d_3 = 6.3000$, $n_2 = 1.69680$, $\nu_2 = 55.52$ $r_4 = 196.7158$
$d_4 = D_1$ (variable)

$r_5 = 37.8635$
$d_5 = 0.9000$, $n_3 = 1.69680$, $\nu_3 = 55.52$ $r_6 = 8.9014$
$d_6 = 3.5000$ $r_7 = -18.1128$
$d_7 = 1.0000$, $n_4 = 1.69680$, $\nu_4 = 55.52$ $r_8 = 31.0344$
$d_8 = D_2$ (variable)

$r_9 = 22.2426$
$d_9 = 2.0000$, $n_5 = 1.84666$, $\nu_5 = 23.78$ $r_{10} = -86.4801$
$d_{10} = D_3$ (variable)

$r_{11} = \infty$ (stop)
$d_{11} = 1.5000$ $r_{12} = 15.9985$
$d_{12} = 3.2821$, $n_6 = 1.83400$, $\nu_6 = 37.16$ $r_{13} = -15.0641$
$d_{13} = 0.3100$

-continued

Embodiment 8

$r_{14} = -10.8645$
$d_{14} = 1.8819$, $n_7 = 1.84666$, $\nu_7 = 23.78$ $r_{15} = 16.4371$
$d_{15} = 2.2440$ $r_{16} = 32.8914$ (aspherical surface)
$d_{16} = 4.0000$, $n_8 = 1.77250$, $\nu_8 = 49.66$ $r_{17} = -10.6783$
$d_{17} = 1.0000$ $r_{18} = \infty$
$d_{18} = 12.0000$, $n_9 = 1.51633$, $\nu_9 = 64.15$ $r_{19} = \infty$
$d_{19} = 0.3000$ $r_{20} = \infty$
$d_{20} = 6.0000$, $n_{10} = 1.54771$, $\nu_{10} = 62.83$ $r_{21} = \infty$
$d_{21} = 2.5000$ $r_{22} = \infty$
$d_{22} = 1.0000$, $n_{11} = 1.51633$, $\nu_{11} = 64.15$ $r_{23} = \infty$ Aspherical coefficient $P = 1$,
$A_4 = -0.11023 \times 10^{-3}$, $A_6 = 0.33203 \times 10^{-6}$
$A_8 = -0.17349 \times 10^{-6}$, $A_{10} = =0.67607 \times 10^{-8}$

|  | W | S | T |
|---|---|---|---|
| $D_1$ | 0.600 | 9.255 | 16.289 |
| $D_2$ | 0.539 | 1.153 | 0.500 |
| $D_3$ | 16.482 | 7.212 | 0.832 |

$|f_{II\,III}|/\sqrt{f_W \cdot f_T} = 0.9323$, $f_{III}/|f_{II\,III}| = 1.4512$ $f_I/|f_{I-1}| = 0.3665$, $\nu_{II} - \nu_{III} = 31.74$ $\nu_{I-2} - \nu_{I-1} = 31.74$, $\sqrt{f_W \cdot f_T}/f_{I\,II\,III} = -0.5788$ $|f_{II}|/f_I = 0.1670$, $r_{III-1}/r_{II-4} = 0.7167$ $D_{2W} - D_{2T}/\sqrt{f_W \cdot f_T} = 0.0025$, $\overline{EP_T} = 64.580$ $I_2 = 24.099°$, $\Sigma D_I/\sqrt{f_W \cdot f_T} = 0.5181$ $f_W = 9.269$, $\sqrt{f_W \cdot f_T} = 15.576$ $f_T = 26.176$

Embodiment 9
f = 9−27, F/1.4

$r_1 = 24.1655$
$d_1 = 1.7500$, $n_1 = 1.84666$, $\nu_1 = 23.78$ $r_2 = 19.4072$
$d_2 = 0.7000$ $r_3 = 21.3479$
$d_3 = 6.3000$, $n_2 = 1.69680$, $\nu_2 = 55.52$ $r_4 = 197.0232$
$d_4 = D_1$ (variable)

$r_5 = 38.6579$
$d_5 = 0.9000$, $n_3 = 1.69680$, $\nu_3 = 55.52$ $r_6 = 8.8816$
$d_6 = 4.2000$ $r_7 = -24.4990$
$d_7 = 1.0000$, $n_4 = 1.69680$, $\nu_4 = 55.52$ $r_8 = 35.9947$
$d_8 = D_2$ (variable)

$r_9 = 20.9191$
$d_9 = 2.6000$, $n_5 = 1.84666$, $\nu_5 = 23.78$ $r_{10} = 928.2106$
$d_{10} = D_3$ (variable)

$r_{11} = \infty$ (stop)
$d_{11} = 2.5000$ $r_{12} = 18.1436$
$d_{12} = 6.0000$, $n_6 = 1.77250$, $\nu_6 = 49.66$ -continued

Embodiment 9

| | | |
|---|---|---|
| $r_{13} = -43.3346$ | | |
| $d_{13} = 0.8500$ | | |
| $r_{14} = -17.9866$ | | |
| $d_{14} = 3.0000$ | $n_7 = 1.84666$ | $v_7 = 23.78$ |
| $r_{15} = 25.0721$ | | |
| $d_{15} = 2.5792$ | | |
| $r_{16} = -2771.2828$ | | |
| $d_{16} = 2.7000$ | $n_8 = 1.69680$ | $v_8 = 55.52$ |
| $r_{17} = -24.7556$ | | |
| $d_{17} = 0.1500$ | | |
| $r_{18} = 73.8479$ | | |
| $d_{18} = 3.6000$ | $n_9 = 1.69680$ | $v_9 = 55.52$ |
| $r_{19} = -26.1689$ | | |
| $d_{19} = 0.0$ | | |
| $r_{20} = 18.5533$ | | |
| $d_{20} = 2.8000$ | $n_{10} = 1.69680$ | $v_{10} = 55.52$ |
| $r_{21} = 59.0346$ | | |
| $d_{21} = 8.9704$ | | |
| $r_{22} = \infty$ | | |
| $d_{22} = 5.1000$ | $n_{11} = 1.54771$ | $v_{11} = 62.83$ |
| $r_{23} = \infty$ | | |
| $d_{23} = 1.5000$ | | |
| $r_{24} = \infty$ | | |
| $d_{24} = 1.3000$ | $n_{12} = 1.51633$ | $v_{12} = 64.15$ |
| $r_{25} = \infty$ | | |

| | W | S | T |
|---|---|---|---|
| $D_1$ | 0.600 | 9.256 | 16.561 |
| $D_2$ | 0.687 | 1.372 | 0.500 |
| $D_3$ | 16.606 | 7.266 | 0.832 |

$|f_{II\,III}|/\sqrt{f_W \cdot f_T} = 0.9792$, $\quad f_{III}/|f_{II\,III}| = 1.6559$ $f_I/|f_{I\text{-}1}| = 0.3327$, $\quad v_{II} - v_{III} = 31.74$ $v_{I\text{-}2} - v_{I\text{-}1} = 31.74$, $\quad \sqrt{f_W \cdot f_T}/f_{I\,II\,III} = -0.5405$ $|f_{II}|/f_I = 0.1787$, $\quad r_{III\text{-}1}/r_{II\text{-}4} = 0.5812$ $D_{2W} - D_{2T}/\sqrt{f_W \cdot f_T} = 0.0120$, $\quad \overline{EP_T} = 68.840$ $I_2 = 25.854°$, $\Sigma D_I/\sqrt{f_W \cdot f_T} = 0.5620$, $\quad f_W = 9.344$ $\sqrt{f_W \cdot f_T} = 15.569$, $\quad f_T = 25.941$

Embodiment 10 f = 9–27, F/1.4

| | | |
|---|---|---|
| $r_1 = 26.5275$ | | |
| $d_1 = 1.7000$ | $n_1 = 1.84666$ | $v_1 = 23.78$ |
| $r_2 = 20.1365$ | | |
| $d_2 = 0.4500$ | | |
| $r_3 = 21.6926$ | | |
| $d_3 = 6.1000$ | $n_2 = 1.69680$ | $v_2 = 55.52$ |
| $r_4 = 1445.5992$ | | |
| $d_4 = D_1$ (variable) | | |
| $r_5 = 65.3019$ | | |
| $d_5 = 0.9000$ | $n_3 = 1.69680$ | $v_3 = 55.52$ |
| $r_6 = 10.5838$ | | |
| $d_6 = 3.7000$ | | |
| $r_7 = -20.8855$ | | |
| $d_7 = 1.0000$ | $n_4 = 1.69680$ | $v_4 = 55.52$ |
| $r_8 = 37.8092$ | | |
| $d_8 = D_2$ (variable) | | |
| $r_9 = 25.2048$ | | |
| $d_9 = 2.3000$ | $n_5 = 1.84666$ | $v_5 = 23.78$ |
| $r_{10} = -194.5321$ | | |
| $d_{10} = D_3$ (variable) | | |
| $r_{11} = \infty$ (stop) | | |
| $d_{11} = 4.0000$ | | |

-continued

Embodiment 10

| | | |
|---|---|---|
| $r_{12} = 46.3725$ | | |
| $d_{12} = 6.0000$ | $n_6 = 1.60311$ | $v_6 = 60.70$ |
| $r_{13} = -18.4307$ | | |
| $d_{13} = 1.6000$ | | |
| $r_{14} = -10.7020$ | | |
| $d_{14} = 1.2000$ | $n_7 = 1.84666$ | $v_7 = 23.78$ |
| $r_{15} = -21.1903$ | | |
| $d_{15} = 5.6390$ | | |
| $r_{16} = -78.4887$ | | |
| $d_{16} = 3.7000$ | $n_8 = 1.69680$ | $v_8 = 55.52$ |
| $r_{17} = -19.0712$ | | |
| $d_{17} = 0.1500$ | | |
| $r_{18} = 61.8691$ | | |
| $d_{18} = 4.3000$ | $n_9 = 1.69680$ | $v_9 = 55.52$ |
| $r_{19} = -28.7655$ | | |
| $d_{19} = 0.1500$ | | |
| $r_{20} = 43.1682$ | | |
| $d_{20} = 2.7000$ | $n_{10} = 1.69680$ | $v_{10} = 55.52$ |
| $r_{21} = -90.4107$ | | |
| $d_{21} = 1.4000$ | | |
| $r_{22} = -22.7020$ | | |
| $d_{22} = 1.2000$ | $n_{11} = 1.84666$ | $v_{11} = 23.78$ |
| $r_{23} = -103.0298$ | | |
| $d_{23} = 1.0000$ | | |
| $r_{24} = \infty$ | | |
| $d_{24} = 8.9000$ | $n_{12} = 1.51633$ | $v_{12} = 64.15$ |
| $r_{25} = \infty$ | | |
| $d_{25} = 5.1000$ | $n_{13} = 1.54771$ | $v_{13} = 62.83$ |
| $r_{26} = \infty$ | | |
| $d_{26} = 1.5000$ | | |
| $r_{27} = \infty$ | | |
| $d_{27} = 1.3000$ | $n_{14} = 1.51633$ | $v_{14} = 64.15$ |
| $r_{28} = \infty$ | | |

| | W | S | T |
|---|---|---|---|
| $D_1$ | 0.600 | 9.413 | 16.561 |
| $D_2$ | 0.689 | 1.468 | 0.500 |
| $D_3$ | 16.603 | 7.012 | 0.832 |

$|f_{II\,III}|/\sqrt{f_W \cdot f_T} = 0.9605$, $\quad f_{III}/|f_{II\,III}| = 1.7691$ $f_I/|f_{I\text{-}1}| = 0.4046$, $\quad v_{II} - v_{III} = 31.74$ $v_{I\text{-}2} - v_{I\text{-}1} = 31.74$, $\quad \sqrt{f_W \cdot f_T}/f_{I\,II\,III} = -0.5599$ $|f_{II}|/f_I = 0.1866$, $\quad r_{III\text{-}1}/r_{II\text{-}4} = 0.6666$ $D_{2W} - D_{2T}/\sqrt{f_W \cdot f_T} = 0.0121$, $\quad \overline{EP_T} = 65.395$ $I_2 = 22.290°$, $\quad \Sigma D_I/\sqrt{f_W \cdot f_T} = 0.5293$ $f_W = 9.280$, $\quad \sqrt{f_W \cdot f_T} = 15.586$ $f_T = 26.176$

Embodiment 11 f = 9–27, F/1.4

| | | |
|---|---|---|
| $r_1 = 26.8695$ | | |
| $d_1 = 1.7000$ | $n_1 = 1.84666$ | $v_1 = 23.78$ |
| $r_2 = 20.5387$ | | |
| $d_2 = 0.7000$ | | |
| $r_3 = 22.6921$ | | |
| $d_3 = 6.3000$ | $n_2 = 1.69680$ | $v_2 = 55.52$ |
| $r_4 = 945.2768$ | | |
| $d_4 = D_1$ (variable) | | |
| $r_5 = 76.0628$ | | |
| $d_5 = 0.9000$ | $n_3 = 1.69680$ | $v_3 = 55.52$ |
| $r_6 = 9.6436$ | | |
| $d_6 = 4.3000$ | | |
| $r_7 = -22.5195$ | | |
| $d_7 = 1.0000$ | $n_4 = 1.69680$ | $v_4 = 55.52$ |

-continued
Embodiment 11

| | | | |
|---|---|---|---|
| $r_8 = 39.8671$ | | | |
| $d_8 = D_2$ (variable) | | | |
| $r_9 = 23.2241$ | | | |
| $d_9 = 2.8000$ | | $n_5 = 1.84666$ | $\nu_5 = 23.78$ |
| $r_{10} = -109.9618$ | | | |
| $d_{10} = D_3$ (variable) | | | |
| $r_{11} = \infty$ (stop) | | | |
| $d_{11} = 2.0000$ | | | |
| $r_{12} = -49.9601$ | | | |
| $d_{12} = 2.7000$ | | $n_6 = 1.83400$ | $\nu_6 = 37.16$ |
| $r_{13} = -30.5607$ | | | |
| $d_{13} = 0.1500$ | | | |
| $r_{14} = 26.3497$ | | | |
| $d_{14} = 3.0000$ | | $n_7 = 1.69680$ | $\nu_7 = 55.52$ |
| $r_{15} = -55.5503$ | | | |
| $d_{15} = 1.0000$ | | | |
| $r_{16} = -20.0680$ | | | |
| $d_{16} = 1.2000$ | | $n_8 = 1.84666$ | $\nu_8 = 23.78$ |
| $r_{17} = -99.7302$ | | | |
| $d_{17} = 4.3077$ | | | |
| $r_{18} = 420.8380$ | | | |
| $d_{18} = 1.2000$ | | $n_9 = 1.84666$ | $\nu_9 = 23.78$ |
| $r_{19} = 27.6042$ | | | |
| $d_{19} = 1.2000$ | | | |
| $r_{20} = 2221.2367$ | | | |
| $d_{20} = 4.0000$ | | $n_{10} = 1.69680$ | $\nu_{10} = 55.52$ |
| $r_{21} = -19.5206$ | | | |
| $d_{21} = 0.1500$ | | | |
| $r_{22} = 22.5048$ | | | |
| $d_{22} = 4.2000$ | | $n_{11} = 1.69680$ | $\nu_{11} = 55.52$ |
| $r_{23} = -52.3526$ | | | |
| $d_{23} = 5.0000$ | | | |
| $r_{24} = \infty$ | | | |
| $d_{24} = 8.9000$ | | $n_{12} = 1.51633$ | $\nu_{12} = 64.15$ |
| $r_{25} = \infty$ | | | |
| $d_{25} = 5.1000$ | | $n_{13} = 1.54771$ | $\nu_{13} = 62.83$ |
| $r_{26} = \infty$ | | | |
| $d_{26} = 1.5000$ | | | |
| $r_{27} = \infty$ | | | |
| $d_{27} = 1.3000$ | | $n_{14} = 1.51633$ | $\nu_{14} = 64.15$ |
| $r_{28} = \infty$ | | | |

| | W | S | T |
|---|---|---|---|
| $D_1$ | 0.600 | 9.786 | 17.693 |
| $D_2$ | 0.500 | 1.149 | 0.500 |
| $D_3$ | 17.925 | 8.090 | 0.832 |

$|f_{II\,III}|/\sqrt{f_W \cdot f_T} = 1.0167,\quad f_{III}/|f_{II\,III}| = 1.4389$ $f_I/|f_{I-1}| = 0.4090,\quad \nu_{II} - \nu_{III} = 31.74$ $\nu_{I-2} - \nu_{I-1} = 31.74,\quad \sqrt{f_W \cdot f_T}/f_{I\,II\,III} = -0.5446$ $|f_{II}|/f_I = 0.1665,\quad r_{III-1}/r_{II-4} = 0.5825$ $D_{2W} - D_{2T}/\sqrt{f_W \cdot f_T} = 0,\quad \overline{EP_T} = 69.247$ $I_2 = 23.652°,\quad \Sigma D_I/\sqrt{f_W \cdot f_T} = 0.5564$ $f_W = 9.346,\quad \sqrt{f_W \cdot f_T} = 15.636$ $f_T = 26.159$

Embodiment 12
f = 9–27, F/1.4

| | | | |
|---|---|---|---|
| $r_1 = 25.1665$ | | | |
| | $d_1 = 1.7500$ | $n_1 = 1.84666$ | $\nu_1 = 23.78$ |
| $r_2 = 19.7653$ | | | |
| | $d_2 = 0.7000$ | | |
| $r_3 = 21.6403$ | | | |
| | $d_3 = 6.3000$ | $n_2 = 1.69680$ | $\nu_2 = 55.52$ |

-continued
Embodiment 12

| | | | |
|---|---|---|---|
| $r_4 = 243.6120$ | | | |
| | $d_4 = D_1$ (variable) | | |
| $r_5 = 35.2153$ | | | |
| | $d_5 = 0.9000$ | $n_3 = 1.69680$ | $\nu_3 = 55.52$ |
| $r_6 = 8.7468$ | | | |
| | $d_6 = 4.2000$ | | |
| $r_7 = -21.0387$ | | | |
| | $d_7 = 1.0000$ | $n_4 = 1.69680$ | $\nu_4 = 55.52$ |
| $r_8 = 38.2528$ | | | |
| | $d_8 = D_2$ (variable) | | |
| $r_9 = 21.4968$ | | | |
| | $d_9 = 2.6000$ | $n_5 = 1.84666$ | $\nu_5 = 23.78$ |
| $r_{10} = -245.2371$ | | | |
| | $d_{10} = D_3$ (variable) | | |
| $r_{11} = \infty$ (stop) | | | |
| | $d_{11} = 2.5000$ | | |
| $r_{12} = 36.8342$ | | | |
| | $d_{12} = 2.8000$ | $n_6 = 1.77250$ | $\nu_6 = 49.66$ |
| $r_{13} = -27.7372$ | | | |
| | $d_{13} = 0.7500$ | | |
| $r_{14} = -15.0115$ | | | |
| | $d_{14} = 1.2000$ | $n_7 = 1.80518$ | $\nu_7 = 25.43$ |
| $r_{15} = -35.7678$ | | | |
| | $d_{15} = 4.6000$ | | |
| $r_{16} = -212.1292$ | | | |
| | $d_{16} = 1.2000$ | $n_8 = 1.84666$ | $\nu_8 = 23.78$ |
| $r_{17} = 24.5515$ | | | |
| | $d_{17} = 1.2000$ | | |
| $r_{18} = 198.3738$ | | | |
| | $d_{18} = 3.6000$ | $n_9 = 1.69680$ | $\nu_9 = 55.52$ |
| $r_{19} = -19.5333$ | | | |
| | $d_{19} = 0.1500$ | | |
| $r_{20} = 21.8991$ | | | |
| | $d_{20} = 5.0000$ | $n_{10} = 1.69680$ | $\nu_{10} = 55.52$ |
| $r_{21} = -36.4961$ | | | |
| | $d_{21} = 11.0000$ | | |
| $r_{22} = \infty$ | | | |
| | $d_{22} = 5.1000$ | $n_{11} = 1.54771$ | $\nu_{11} = 62.83$ |
| $r_{23} = \infty$ | | | |
| | $d_{23} = 1.5000$ | | |
| $r_{24} = \infty$ | | | |
| | $d_{24} = 1.3000$ | $n_{12} = 1.51633$ | $\nu_{12} = 64.15$ |
| $r_{25} = \infty$ | | | |

| | W | S | T |
|---|---|---|---|
| $D_1$ | 0.600 | 9.576 | 17.212 |
| $D_2$ | 0.502 | 1.211 | 0.500 |
| $D_3$ | 17.442 | 7.757 | 0.832 |

$|f_{II\,III}|/\sqrt{f_W \cdot f_T} = 0.9823,\ f_{III}/|f_{II\,III}| = 1.5266$ $f_I/|f_{I-1}| = 0.3730,\ \nu_{II} - \nu_{III} = 31.74$ $\nu_{I-2} - \nu_{I-1} = 31.74,\ \sqrt{f_W \cdot f_T}/f_{I\,II\,III} = -0.5503$ $|f_{II}|/f_I = 0.1697,\ r_{III-1}/r_{II-4} = 0.5620$ $D_{2W} - D_{2T}/\sqrt{f_W \cdot f_T} = 0.0001,\ \overline{EP_T} = 69.832$ $I_2 = 25.350°,\ \Sigma D_I/\sqrt{f_W \cdot f_T} = 0.5596$ $f_W = 9.319,\ \sqrt{f_W \cdot f_T} = 15.636$ $f_T = 26.234$

Embodiment 13
d = 9–27, F/1.4

$r_1 = 24.8856$

-continued

Embodiment 13

| | $d_1 = 1.7500$ | $n_1 = 1.84666$ | $\nu_1 = 23.78$ |
|---|---|---|---|
| $r_2 = 19.5041$ | | | |
| | $d_2 = 0.6000$ | | |
| $r_3 = 21.2180$ | | | |
| | $d_3 = 6.3000$ | $n_2 = 1.69680$ | $\nu_2 = 55.52$ |
| $r_4 = 239.6605$ | | | |
| | $d_4 = D_1$ (variable) | | |
| $r_5 = 40.0102$ | | | |
| | $d_5 = 0.9000$ | $n_3 = 1.69680$ | $\nu_3 = 55.52$ |
| $r_6 = 9.0012$ | | | |
| | $d_6 = 4.2000$ | | |
| $r_7 = -20.7938$ | | | |
| | $d_7 = 1.0000$ | $n_4 = 1.69680$ | $\nu_4 = 55.52$ |
| $r_8 = 37.9948$ | | | |
| | $d_8 = D_2$ (variable) | | |
| $r_9 = 22.7156$ | | | |
| | $d_9 = 2.6000$ | $n_5 = 1.84666$ | $\nu_5 = 23.78$ |
| $r_{10} = -170.0296$ | | | |
| | $d_{10} = D_3$ (variable) | | |
| $r_{11} = \infty$ (stop) | | | |
| | $d_{11} = 2.5000$ | | |
| $r_{12} = 35.9655$ | | | |
| | $d_{12} = 3.0000$ | $n_6 = 1.77250$ | $\nu_6 = 49.66$ |
| $r_{13} = -25.7842$ | | | |
| | $d_{13} = 0.9000$ | | |
| $r_{14} = -13.8639$ | | | |
| | $d_{14} = 1.2000$ | $n_7 = 1.84666$ | $\nu_7 = 23.78$ |
| $r_{15} = -25.2115$ | | | |
| | $d_{15} = 3.3702$ | | |
| $r_{16} = 51.9746$ | | | |
| | $d_{16} = 1.2000$ | $n_8 = 1.84666$ | $\nu_8 = 23.78$ |
| $r_{17} = 24.1331$ | | | |
| | $d_{17} = 1.0000$ | | |
| $r_{18} = 56.0279$ | | | |
| | $d_{18} = 1.2000$ | $n_9 = 1.84666$ | $\nu_9 = 23.78$ |
| $r_{19} = 22.8461$ | | | |
| | $d_{19} = 1.2000$ | | |
| $r_{20} = 30.1041$ | | | |
| | $d_{20} = 5.6000$ | $n_{10} = 1.69680$ | $\nu_{10} = 55.52$ |
| $r_{21} = -17.6131$ | | | |
| | $d_{21} = 0.1500$ | | |
| $r_{22} = 19.6943$ | | | |
| | $d_{22} = 3.0000$ | $n_{11} = 1.69680$ | $\nu_{11} = 55.52$ |
| $r_{23} = 77.5888$ | | | |
| | $d_{23} = 9.5000$ | | |
| $r_{24} = \infty$ | | | |
| | $d_{24} = 5.1000$ | $n_{12} = 1.54771$ | $\nu_{12} = 62.83$ |
| $r_{25} = \infty$ | | | |
| | $d_{25} = 1.5000$ | | |
| $r_{26} = \infty$ | | | |
| | $d_{26} = 1.3000$ | $n_{13} = 1.51633$ | $\nu_{13} = 64.15$ |
| $r_{27} = \infty$ | | | |

| | W | S | T |
|---|---|---|---|
| $D_1$ | 0.600 | 9.449 | 16.820 |
| $D_2$ | 0.501 | 1.228 | 0.500 |
| $D_3$ | 17.052 | 7.475 | 0.832 |

$|f_{II\,III}|/\sqrt{f_W \cdot f_T} = 0.9623$, $f_{III}/|f_{II\,III}| = 1.5264$ $f_I/|f_{I-1}| = 0.3736$, $\nu_{II} - \nu_{III} = 31.74$ $\nu_{I-2} - \nu_{I-1} = 31.74$, $\sqrt{f_W \cdot f_T}/f_{I\,II\,III} = -0.5593$ $|f_{II}|/f_I = 0.1715$, $r_{III-1}/r_{II-4} = 0.5979$ $D_{2W} - D_{2T}/\sqrt{f_W \cdot f_T} = 0$, $\overline{EP_T} = 69.211$ $I_2 = 25.608°$, $\Sigma D_I/\sqrt{f_W \cdot f_T} = 0.5544$ $f_W = 9.305$, $\sqrt{f_W \cdot f_T} = 15.602$ $f_T = 26.162$

Embodiment 14

$f = 9-27$, $F/1.4$

| | $d_1 = 1.7500$ | $n_1 = 1.84666$ | $\nu_1 = 23.78$ |
|---|---|---|---|
| $r_1 = 24.2862$ | | | |
| $r_2 = 19.3341$ | | | |
| | $d_2 = 0.7000$ | | |
| $r_3 = 21.2814$ | | | |
| | $d_3 = 6.3000$ | $n_2 = 1.69680$ | $\nu_2 = 55.52$ |
| $r_4 = 243.9029$ | | | |
| | $d_4 = D_1$ (variable) | | |
| $r_5 = 42.3398$ | | | |
| | $d_5 = 0.9000$ | $n_3 = 1.69680$ | $\nu_3 = 55.52$ |
| $r_6 = 8.9825$ | | | |
| | $d_6 = 4.2000$ | | |
| $r_7 = -21.9765$ | | | |
| | $d_7 = 1.0000$ | $n_4 = 1.69680$ | $\nu_4 = 55.52$ |
| $r_8 = 32.2503$ | | | |
| | $d_8 = D_2$ (variable) | | |
| $r_9 = 21.3499$ | | | |
| | $d_9 = 2.6000$ | $n_5 = 1.84666$ | $\nu_5 = 23.78$ |
| $r_{10} = -194.8388$ | | | |
| | $d_{10} = D_3$ (variable) | | |
| $r_{11} = \infty$ (stop) | | | |
| | $d_{11} = 2.5000$ | | |
| $r_{12} = 31.9542$ | | | |
| | $d_{12} = 2.8000$ | $n_6 = 1.77250$ | $\nu_6 = 49.66$ |
| $r_{13} = -33.1146$ | | | |
| | $d_{13} = 0.7500$ | | |
| $r_{14} = -15.9754$ | | | |
| | $d_{14} = 1.2000$ | $n_7 = 1.84666$ | $\nu_7 = 23.78$ |
| $r_{15} = -44.5166$ | | | |
| | $d_{15} = 4.2974$ | | |
| $r_{16} = -75.9250$ | | | |
| | $d_{16} = 1.2000$ | $n_8 = 1.84666$ | $\nu_8 = 23.78$ |
| $r_{17} = 32.8220$ | | | |
| | $d_{17} = 1.1000$ | | |
| $r_{18} = 929.0165$ | | | |
| | $d_{18} = 2.7000$ | $n_9 = 1.69680$ | $\nu_9 = 55.52$ |
| $r_{19} = -25.4942$ | | | |
| | $d_{19} = 0.1500$ | | |
| $r_{20} = 39.6975$ | | | |
| | $d_{20} = 4.5000$ | $n_{10} = 1.69680$ | $\nu_{10} = 55.52$ |
| $r_{21} = -26.4889$ | | | |
| | $d_{21} = 0.0$ | | |
| $r_{22} = 25.8811$ | | | |
| | $d_{22} = 2.5000$ | $n_{11} = 1.69680$ | $\nu_{11} = 55.52$ |
| $r_{23} = 83.5812$ | | | |
| | $d_{23} = 11.0000$ | | |
| $r_{24} = \infty$ | | | |
| | $d_{24} = 5.1000$ | $n_{12} = 1.54771$ | $\nu_{12} = 62.83$ |
| $r_{25} = \infty$ | | | |
| | $d_{25} = 1.5000$ | | |
| $r_{26} = \infty$ | | | |
| | $d_{26} = 1.3000$ | $n_{13} = 1.51633$ | $\nu_{13} = 64.15$ |
| $r_{27} = \infty$ | | | |

| | W | S | T |
|---|---|---|---|
| $D_1$ | 0.600 | 9.300 | 16.507 |
| $D_2$ | 0.697 | 1.279 | 0.500 |
| $D_3$ | 16.541 | 7.259 | 0.832 |

$|f_{II\,III}|/\sqrt{f_W \cdot f_T} = 0.9661$, $f_{III}/|f_{II\,III}| = 1.5159$ $f_I/|f_{I-1}| = 0.3428$, $\nu_{II} - \nu_{III} = 31.74$ $\nu_{I-2} - \nu_{I-1} = 31.74$, $\sqrt{f_W \cdot f_T}/f_{I\,II\,III} = -0.5503$ $|f_{II}|/f_I = 0.1704$, $r_{III-1}/r_{II-4} = 0.6620$ -continued

Embodiment 14

$D_{2W} - D_{2T}/\sqrt{f_W \cdot f_T} = 0.0126$, $\overline{EP_T} = 69.172$ $I_2 = 25.956°$, $\Sigma D_I/\sqrt{f_W \cdot f_T} = 0.5608$ $f_W = 9.313$, $\sqrt{f_W \cdot f_T} = 15.604$ $f_T = 26.144$

Embodiment 15
f = 9–27, F/1.4

| | | | |
|---|---|---|---|
| $r_1 = 24.4590$ | $d_1 = 1.7000$ | $n_1 = 1.84666$ | $\nu_1 = 23.78$ |
| $r_2 = 18.9005$ | $d_2 = 0.8000$ | | |
| $r_3 = 20.8238$ | $d_3 = 6.3000$ | $n_2 = 1.69680$ | $\nu_2 = 55.52$ |
| $r_4 = 260.4979$ | $d_4 = D_1$ (variable) | | |
| $r_5 = 53.1445$ | $d_5 = 0.9000$ | $n_3 = 1.69680$ | $\nu_3 = 55.52$ |
| $r_6 = 8.5206$ | $d_6 = 3.8000$ | | |
| $r_7 = -29.2964$ | $d_7 = 1.0000$ | $n_4 = 1.69680$ | $\nu_4 = 55.52$ |
| $r_8 = 33.8850$ | $d_8 = D_2$ (variable) | | |
| $r_9 = 18.0053$ | $d_9 = 2.3000$ | $n_5 = 1.84666$ | $\nu_5 = 23.78$ |
| $r_{10} = 238.1386$ | $d_{10} = D_3$ (variable) | | |
| $r_{11} = \infty$ (stop) | $d_{11} = 2.0000$ | | |
| $r_{12} = 127.2469$ | $d_{12} = 6.8044$ | $n_6 = 1.83400$ | $\nu_6 = 37.16$ |
| $r_{13} = -39.6419$ | $d_{13} = 0.1500$ | | |
| $r_{14} = 30.0401$ | $d_{14} = 2.4000$ | $n_7 = 1.69680$ | $\nu_7 = 55.52$ |
| $r_{15} = -146.7701$ | $d_{15} = 1.0000$ | | |
| $r_{16} = -21.5018$ | $d_{16} = 3.0000$ | $n_8 = 1.84666$ | $\nu_8 = 23.78$ |
| $r_{17} = 23.6009$ | $d_{17} = 1.9688$ | | |
| $r_{18} = -147.0434$ | $d_{18} = 3.5000$ | $n_9 = 1.69680$ | $\nu_9 = 55.52$ |
| $r_{19} = -17.6852$ | $d_{19} = 0.1500$ | | |
| $r_{20} = 23.0333$ | $d_{20} = 5.3000$ | $n_{10} = 1.69680$ | $\nu_{10} = 55.52$ |
| $r_{21} = -31.5816$ | $d_{21} = 1.0000$ | | |
| $r_{22} = \infty$ | $d_{22} = 12.0000$ | $n_{11} = 1.51633$ | $\nu_{11} = 64.15$ |
| $r_{23} = \infty$ | $d_{23} = 0.3000$ | | |
| $r_{24} = \infty$ | $d_{24} = 6.000$ | $n_{12} = 1.54771$ | $\nu_{12} = 62.83$ |
| $r_{25} = \infty$ | $d_{25} = 2.5000$ | | |
| $r_{26} = \infty$ | $d_{26} = 1.0000$ | $n_{13} = 1.51633$ | $\nu_{13} = 64.15$ |
| $r_{27} = \infty$ | | | |

| | W | S | T |
|---|---|---|---|
| $D_1$ | 0.600 | 9.523 | 16.967 |
| $D_2$ | 0.679 | 1.271 | 0.500 |
| $D_3$ | 17.020 | 7.505 | 0.832 |

$|f_{II\,III}|/\sqrt{F_W \cdot f_t} = 0.9946$, $f_{III}/|f_{II\,III}| = 1.4678$

-continued

Embodiment 15

$f_I/|f_{I-1}| = 0.4070$, $\nu_{II} - \nu_{III} = 31.74$ $\nu_{I-2} - \nu_{I-1} = 31.74$, $\sqrt{f_W \cdot f_T}/f_{I\,II\,III} = -0.5432$ $|f_{II}|/f_I = 0.1723$, $r_{III-1}/r_{II-4} = 0.5314$ $D_{2W} - D_{2T}/\sqrt{f_W \cdot f_T} = 0.0115$, $\overline{EP_T} = 67.353$ $I_2 = 24.837°$, $f_W = 9.321$, $\Sigma D_I/\sqrt{f_W \cdot f_T} = 0.5641$ $\sqrt{f_W \cdot f_T} = 15.599$ $f_T = 26.105$

Embodiment 16
f = 9–27 (mm), F/2.8

| | | | |
|---|---|---|---|
| $r_1 = 27.5988$ | $d_1 = 5.5897$ | $n_{01} = 1.62041$ (GRIN lens) | |
| $r_2 = -200.0000$ | $d_2 = D_1$ (variable) | | |
| $r_3 = 70.4187$ | $d_3 = 0.9000$ | $n_{02} = 1.69680$ | $\nu_{02} = 55.52$ |
| $r_4 = 8.0000$ | $d_4 = 2.4000$ | | |
| $r_5 = -40.8475$ | $d_5 = 0.9000$ | $n_{03} = 1.69680$ | $\nu_{03} = 55.52$ |
| $r_6 = 15.2932$ | $d_6 = D_2$ (variable) | | |
| $r_7 = 14.3709$ | $d_7 = 2.0000$ | $n_{04} = 1.84666$ | $\nu_{04} = 23.78$ |
| $r_8 = 121.6728$ | $d_8 = D_3$ (variable) | | |
| $r_9 = \infty$ (stop) | $d_9 = 1.5000$ | | |
| $r_{10} = 10.8050$ | $d_{10} = 4.3707$ | $n_{05} = 1.74950$ | $\nu_{05} = 35.27$ |
| $r_{11} = -14.5800$ | $d_{11} = 0.2977$ | | |
| $r_{12} = -10.6054$ | $d_{12} = 1.0000$ | $n_{06} = 1.84666$ | $\nu_{06} = 23.78$ |
| $r_{13} = 12.0000$ | $d_{13} = 2.6293$ | | |
| $r_{14} = 66.8497$ | $d_{14} = 3.0467$ | $n_{07} = 1.69680$ | $\nu_{07} = 55.52$ |
| $r_{15} = -12.2033$ | $d_{15} = 0.1500$ | | |
| $r_{16} = 44.1101$ | $d_{16} = 1.8151$ | $n_{08} = 1.67790$ | $\nu_{08} = 55.33$ |
| $r_{17} = -47.4916$ | $d_{17} = 5.4040$ | | |
| $r_{18} = \infty$ | $d_{18} = 8.6000$ | $n_{09} = 1.51633$ | $\nu_{09} = 64.15$ |
| $r_{19} = \infty$ | $d_{19} = 1.0000$ | | |
| $r_{20} = \infty$ | $d_{20} = 4.0000$ | $n_{010} = 1.51633$ | $\nu_{010} = 64.15$ |
| $r_{21} = \infty$ | $d_{21} = 0.8000$ | | |
| $r_{22} = \infty$ | $d_{22} = 1.7000$ | $n_{011} = 1.54771$ | $\nu_{011} = 62.83$ |
| $r_{23} = \infty$ | | $n_{012} = 1.51633$ | $\nu_{012} = 64.15$ |

| f | 9.27 | 15.58 | 26.19 |
|---|---|---|---|
| $D_1$ | 0.600 | 7.789 | 13.670 |
| $D_2$ | 0.788 | 1.404 | 0.807 |
| $D_3$ | 14.421 | 6.616 | 1.332 |

(GRIN lens)

-continued

Embodiment 16

|  | $n_0$ | $n_1$ | $n_2$ |
|---|---|---|---|
| $n_{01d}(r)$ | 1.62041 | $-0.21472 \times 10^{-3}$ | $-0.34271 \times 10^{-6}$ |
| $n_{01g}(r)$ | 1.63316 | $-0.18117 \times 10^{-3}$ | $-0.17399 \times 10^{-6}$ |

$f_w^2 \cdot ni\,(1) = -1.8452 \times 10^{-2}$
$\{n_g(0) - n_d(0)\}/\{n_g(r) - n_d(r)\} = 0.6960$
$H/f_w = 3.2769,\ E/f_w = 1.8450$
$f_2/f_w = -0.7055$ $D_{2W} - D_{2T}/\sqrt{f_W \cdot f_T} = -1.2194 \times 10^{-3}$

Embodiment 17
f = 9-27, F/2.8

| $r_1 = 20.7575$ | | | |
|---|---|---|---|
| | $d_1 = 1.5000$ | $n_{01} = 1.84666$ | $\nu_{01} = 23.78$ |
| $r_2 = 14.5546$ | | | |
| | $d_2 = 0.4300$ | | |
| $r_3 = 15.2637$ | | | |
| | $d_3 = 4.9331$ | $n_{02} = 1.69680$ | $\nu_{02} = 55.52$ |
| $r_4 = 343.0212$ | | | |
| | $d_4 = D_1$ (variable) | | |
| $r_5 = 111.2942$ | | | |
| | $d_5 = 0.9000$ | $n_{03} = 1.69680$ | $\nu_{03} = 55.52$ |
| $r_6 = 8.1452$ | | | |
| | $d_6 = 2.4000$ | | |
| $r_7 = -21.5374$ | | | |
| | $d_7 = 0.9000$ | $n_{04} = 1.69680$ | $\nu_{04} = 55.52$ |
| $r_8 = 57.9375$ | | | |
| | $d_8 = D_2$ (variable) | | |
| $r_9 = 21.4667$ | | | |
| | $d_9 = 2.0000$ | $n_{05} = 1.84666$ | $\nu_{05} = 23.78$ |
| $r_{10} = 230.1214$ | | | |
| | $d_{10} = D_3$ (variable) | | |

Embodiment 17 (continued)

| $r_{11} = \infty$ (stop) | | | |
|---|---|---|---|
| | $d_{11} = 1.5000$ | | |
| $r_{12} = 21.4705$ | | | |
| | $d_{12} = 5.1242$ | $n_{06}$ (GRIN lens) | |
| $r_{13} = 14.5666$ | | | |
| | $d_{13} = 2.6060$ | | |
| $r_{14} = 39.2885$ | | | |
| | $d_{14} = 3.0059$ | $n_{07}$ (GRIN lens) | |
| $r_{15} = -35.5303$ | | | |
| | $d_{15} = 2.0385$ | | |
| $r_{16} = \infty$ | | | |
| | $d_{16} = 8.6000$ | $n_{08} = 1.51633$ | $\nu_{08} = 64.15$ |
| $r_{17} = \infty$ | | | |
| | $d_{17} = 1.0000$ | $n_{09} = 1.51633$ | $\nu_{09} = 64.15$ |
| $r_{18} = \infty$ | | | |
| | $d_{18} = 4.0000$ | $n_{010} = 1.54771$ | $\nu_{010} = 62.83$ |
| $r_{19} = \infty$ | | | |
| | $d_{19} = 0.8000$ | | |
| $r_{20} = \infty$ | | | |
| | $d_{20} = 1.7000$ | $n_{011} = 1.51633$ | $\nu_{011} = 64.15$ |
| $r_{21} = \infty$ | | | |

| f | 9.27 | 15.58 | 26.19 |
|---|---|---|---|
| $D_1$ | 0.600 | 7.756 | 13.472 |
| $D_2$ | 0.768 | 1.788 | 0.779 |
| $D_3$ | 14.231 | 6.055 | 1.348 |

(GRIN lens)

|  | $n_0$ | $n_1$ | $n_2$ |
|---|---|---|---|
| $n_{06d}(r)$ | 1.66446 | $-0.54385 \times 10^{-2}$ | $-0.48063 \times 10^{-5}$ |
| $n_{06g}(r)$ | 1.68853 | $-0.54390 \times 10^{-2}$ | $-0.83228 \times 10^{-5}$ |
| $n_{07d}(r)$ | 1.69680 | $-0.21158 \times 10^{-2}$ | $0.29124 \times 10^{-4}$ |
| $n_{07g}(r)$ | 1.71234 | $-0.20368 \times 10^{-2}$ | $0.40633 \times 10^{-4}$ |

$f_w^2 \cdot n_1\,(4) = -0.4674\ (n_{06})$
$f_w^2 \cdot n_1\,(4) = -0.1818\ (n_{07})$
$H/f_w = 2.7298,\ E/f_w = 2.0174$
$f_2/f_w = -0.8148$ $D_{2W} - D_{2T}/\sqrt{f_W \cdot f_T} = -7.0598 \times 10^{-4}$

Embodiment 18
f = 9-27, F/2.8

| $r_1 = 32.9950$ | | | |
|---|---|---|---|
| | $d_1 = 4.8299$ | $n_{01}$ (GRIN lens) | |
| $r_2 = -213.2740$ | | | |
| | $d_2 = D_1$ (variable) | | |
| $r_3 = 93.6352$ | | | |
| | $d_3 = 0.9000$ | $n_{02} = 1.54771$ | $\nu_{02} = 62.83$ |
| $r_4 = 8.0000$ | | | |
| | $d_4 = 2.5000$ | | |
| $r_5 = -33.5473$ | | | |
| | $d_5 = 0.9000$ | $n_{03} = 1.54771$ | $\nu_{03} = 62.83$ |
| $r_6 = 17.1210$ | | | |
| | $d_6 = D_2$ (variable) | | |
| $r_7 = 13.9993$ | | | |
| | $d_7 = 2.0000$ | $n_{04} = 1.84666$ | $\nu_{04} = 23.78$ |
| $r_8 = 40.4987$ | | | |
| | $d_8 = D_3$ (variable) | | |
| $r_9 = \infty$ (stop) | | | |
| | $d_9 = 1.5000$ | | |
| $r_{10} = 9.7334$ | | | |
| | $d_{10} = 2.4950$ | $n_{05} = 1.83400$ | $\nu_{05} = 37.16$ |
| $r_{11} = -17.5184$ | | | |
| | $d_{11} = 0.2844$ | | |
| $r_{12} = -13.1147$ | | | |
| | $d_{12} = 0.9000$ | $n_{06} = 1.84666$ | $\nu_{06} = 23.78$ |
| $r_{13} = 11.3479$ | | | |
| | $d_{13} = 3.2271$ | | |
| $r_{14} = 24.6678$ | | | |
| | $d_{14} = 3.2489$ | $n_{07}$ (GRIN lens) | |
| $r_{15} = -13.2050$ | | | |
| | $d_{15} = 3.7310$ | | |
| $r_{16} = \infty$ | | | |
| | $d_{16} = 8.6000$ | $n_{08} = 1.51633$ | $\nu_{08} = 64.15$ |
| $r_{17} = \infty$ | | | |
| | $d_{17} = 1.0000$ | $n_{09} = 1.51633$ | $\nu_{09} = 64.15$ |
| $r_{18} = \infty$ | | | |

-continued

Embodiment 18
f = 9~27, F/2.8

| | | | |
|---|---|---|---|
| $r_{19} = \infty$ | $d_{18} = 4.0000$ | $n_{010} = 1.54771$ | $\nu_{010} = 62.83$ |
| $r_{20} = \infty$ | $d_{19} = 0.8000$ | | |
| $r_{21} = \infty$ | $d_{20} = 1.7000$ | $n_{011} = 1.51633$ | $\nu_{011} = 64.15$ |

| f | 9.27 | 15.58 | 26.08 |
|---|---|---|---|
| $D_1$ | 0.600 | 9.202 | 16.294 |
| $D_2$ | 0.788 | 1.642 | 0.807 |
| $D_3$ | 17.045 | 7.588 | 1.332 |

(GRIN lens)

| | $n_0$ | $n_1$ | $n_2$ |
|---|---|---|---|
| $n_{01d}(r)$ | 1.63854 | $-0.14370 \times 10^{-3}$ | $-0.10848 \times 10^{-6}$ |
| $n_{01g}(r)$ | 1.65292 | $-0.10417 \times 10^{-3}$ | $-0.77477 \times 10^{-8}$ |
| $n_{07d}(r)$ | 1.58313 | $-0.21099 \times 10^{-2}$ | $-0.52428 \times 10^{-5}$ |
| $n_{07g}(r)$ | 1.59529 | $-0.22045 \times 10^{-2}$ | $-0.92205 \times 10^{-5}$ |

$f_w^2 \cdot n_1(1) = -1.2349 \times 10^{-2}$
$\{n_g(0) - n_d(0)\}/\{n_g(r) - n_d(r) - n_d(r)\} = 0.6825$
$f_w^2 \cdot n_1(4) = -0.1813$, $H/f_w = 2.9423$
$E/f_w = 1.9546$, $f_2/f_w = -0.9022$ $$D_{2W} - D_{2T}/\sqrt{f_W \cdot f_T} = -1.2194 \times 10^{-3}$$

Embodiment 19
f = 9~27, F/2.8

| | | | |
|---|---|---|---|
| $r_1 = 31.2224$ | $d_1 = 5.7006$ | $n_{01}$ (GRIN lens) | |
| $r_2 = -220.8913$ | $d_2 = D_1$ (variable) | | |
| $r_3 = 61.6088$ | $d_3 = 0.9000$ | $n_{02} = 1.69680$ | $\nu_{02} = 55.52$ |
| $r_4 = 8.0000$ | $d_4 = 2.4000$ | | |
| $r_5 = -36.1472$ | $d_5 = 0.9000$ | $n_{03} = 1.69680$ | $\nu_{03} = 55.52$ |
| $r_6 = 14.7621$ | $d_6 = D_2$ (variable) | | |
| $r_7 = 14.0226$ | $d_7 = 2.0000$ | $n_{04} = 1.84666$ | $\nu_{04} = 23.78$ |
| $r_8 = 133.2381$ | $d_8 = D_3$ (variable) | | |
| $r_9 = \infty$ (stop) | $d_9 = 1.5000$ | | |
| $r_{10} = 12.2172$ | $d_{10} = 4.9257$ | $n_{05}$ (GRIN lens) | |
| $r_{11} = 11.4461$ | $d_{11} = 2.6293$ | | |
| $r_{12} = -7594.3106$ | $d_{12} = 6.4805$ | $n_{06} = 1.69680$ | $\nu_{06} = 55.52$ |
| $r_{13} = -13.3491$ | $d_{13} = 0.1500$ | | |
| $r_{14} = 60.8466$ | $d_{14} = 1.8151$ | $n_{07} = 1.67790$ | $\nu_{07} = 55.33$ |
| $r_{15} = -57.4408$ | $d_{15} = 5.3033$ | | |
| $r_{16} = \infty$ | $d_{16} = 8.6000$ | $n_{08} = 1.51633$ | $\nu_{08} = 64.15$ |
| $r_{17} = \infty$ | $d_{17} = 1.0000$ | $n_{09} = 1.51633$ | $\nu_{09} = 64.15$ |
| $r_{18} = \infty$ | $d_{18} = 4.0000$ | $n_{010} = 1.54771$ | $\nu_{010} = 62.83$ |
| $r_{19} = \infty$ | $d_{19} = 0.8000$ | | |
| $r_{20} = \infty$ | $d_{20} = 1.7000$ | $n_{011} = 1.51633$ | $\nu_{011} = 64.15$ |
| $r_{21} = \infty$ | | | |

| f | 9.27 | 15.58 | 26.20 |
|---|---|---|---|
| $D_1$ | 0.600 | 7.766 | 13.648 |
| $D_2$ | 0.788 | 1.372 | 0.807 |
| $D_3$ | 14.399 | 6.650 | 1.332 |

(GRIN lens)

| | $n_0$ | $n_1$ | $n_2$ |
|---|---|---|---|

-continued

Embodiment 19
f = 9–27, F/2.8

| | | |
|---|---|---|
| $n_{01d}(r)$ | 1.69700 | $-0.2285 \times 10^{-3}$ | $-0.30009 \times 10^{-6}$ |
| $n_{01g}(r)$ | 1.71513 | $-0.19111 \times 10^{-3}$ | $-0.12340 \times 10^{-6}$ |
| $n_{05d}(r)$ | 1.74950 | $-0.53487 \times 10^{-3}$ | $0.21895 \times 10^{-4}$ |
| $n_{05g}(r)$ | 1.77702 | $-0.26069 \times 10^{-3}$ | $0.20870 \times 10^{-4}$ |

$f_w^2 \cdot n_1(1) = 1.9644 \times 10^{-2}$
$\{n_g(0) - n_d(0)\}/\{n_g(r) - n_d(r)\} = 0.7501$
$f_w^2 \cdot n_1(4) = -4.5979 \times 10^{-2}$
$H/f_w = 3.5442$, $E/f_w = 1.8286$
$f_2/f_w = -0.6922$ $D_{2W} - D_{2T}/\sqrt{f_W \cdot f_T} = -1.2191 \times 10^{-3}$

Embodiment 20
f = 9–27, F/2.8

| | | | |
|---|---|---|---|
| $r_1 = 26.3013$ | | | |
| | $d_1 = 5.1799$ | $n_{01}$ (GRIN lens) | |
| $r_2 = -100.1706$ | | | |
| | $d_2 = D_1$ (variable) | | |
| $r_3 = 70.0546$ | | | |
| | $d_3 = 0.9000$ | $n_{02} = 1.69680$ | $\nu_{02} = 55.52$ |
| $r_4 = 8.1452$ | | | |
| | $d_4 = 2.4000$ | | |
| $r_5 = -21.9020$ | | | |
| | $d_5 = 0.9000$ | $n_{03} = 1.69680$ | $\nu_{03} = 55.52$ |
| $r_6 = 62.4466$ | | | |
| | $d_6 = D_2$ (variable) | | |
| $r_7 = 22.0717$ | | | |
| | $d_7 = 2.000$ | $n_{04} = 1.84666$ | $\nu_{04} = 23.78$ |
| $r_8 = 148.7309$ | | | |
| | $d_8 = D_3$ (variable) | | |
| $r_9 = \infty$ (stop) | | | |
| | $d_9 = 1.5000$ | | |
| $r_{10} = 19.0975$ | | | |
| | $d_{10} = 5.1352$ | $n_{05}$ (GRIN lens) | |
| $r_{11} = 12.6685$ | | | |
| | $d_{11} = 3.5353$ | | |
| $r_{12} = 50.9677$ | | | |
| | $d_{12} = 3.0476$ | $n_{06}$ (GRIN lens) | |
| $r_{13} = -30.9686$ | | | |
| | $d_{13} = 2.3069$ | | |
| $r_{14} = \infty$ | | | |
| | $d_{14} = 8.6000$ | $n_{07} = 1.51633$ | $\nu_{07} = 64.15$ |
| $r_{15} = \infty$ | | | |
| | $d_{15} = 1.0000$ | $n_{08} = 1.51633$ | $\nu_{08} = 64.15$ |
| $r_{16} = \infty$ | | | |
| | $d_{16} = 4.0000$ | $n_{09} = 1.54771$ | $\nu_{09} = 62.83$ |
| $r_{17} = \infty$ | | | |
| | $d_{17} = 0.8000$ | | |
| $r_{18} = \infty$ | | | |
| | $d_{18} = 1.7000$ | $n_{010} = 1.51633$ | $\nu_{010} = 64.15$ |
| $r_{19} = \infty$ | | | |

| f | 9.27 | 15.58 | 26.19 |
|---|---|---|---|
| $D_1$ | 0.600 | 7.855 | 13.643 |
| $D_2$ | 0.768 | 1.923 | 0.779 |
| $D_3$ | 14.403 | 5.992 | 1.348 |

| | $n_0$ | $n_1$ | $n_2$ |
|---|---|---|---|
| $n_{01d}(r)$ | 1.53996 | $-0.23311 \times 10^{-3}$ | $-0.59188 \times 10^{-6}$ |
| $n_{01g}(r)$ | 1.55118 | $-0.21268 \times 10^{-3}$ | $-0.98274 \times 10^{-7}$ |
| $n_{05d}(r)$ | 1.66446 | $-0.52947 \times 10^{-2}$ | $-0.31642 \times 10^{-5}$ |
| $n_{05g}(r)$ | 1.68853 | $-0.53161 \times 10^{-2}$ | $-0.56501 \times 10^{-5}$ |
| $n_{06d}(r)$ | 1.69680 | $-0.27402 \times 10^{-2}$ | $0.21366 \times 10^{-4}$ |
| $n_{06g}(r)$ | 1.71234 | $-0.26139 \times 10^{-2}$ | $0.30893 \times 10^{-4}$ |

$f_w^2 \cdot n_1(1) = -2.0040 \times 10^{-2}$
$\{n_g(0) - n_d(0)\}/\{n_g(r) - n_d(r)\} = 0.5990$
$f_w^2 \cdot n_1(4) = -0.4552$ $(n_{05})$
$f_w^2 \cdot n_1(4) = -0.2356$ $(n_{06})$
$H/f_w = 2.8548$, $E/f_w = 1.8226$
$f_2/f_w = -0.8539$ $D_{2W} - D_{2T}/\sqrt{f_W \cdot f_T} = -7.0593 \times 10^{-4}$

| Embodiment 21 |
|---|
| $f = 9-27$, $F/2.8$ |

| | | | |
|---|---|---|---|
| $r_1 = 24.2596$ | | | |
| | $d_1 = 5.7051$ | $n_{01}$ (GRIN lens) | |
| $r_2 = 177.1920$ | | | |
| | $d_2 = D_1$ (variable) | | |
| $r_3 = 34.0890$ | | | |
| | $d_3 = 0.9000$ | $n_{02} = 1.69680$ | $\nu_{02} = 55.52$ |
| $r_4 = 8.0000$ | | | |
| | $d_4 = 2.4000$ | | |
| $r_5 = -25.8695$ | | | |
| | $d_5 = 0.9000$ | $n_{03} = 1.69680$ | $\nu_{03} = 55.52$ |
| $r_6 = 11.1697$ | | | |
| | $d_6 = D_2$ (variable) | | |
| $r_7 = 12.6498$ | | | |
| | $d_7 = 2.0000$ | $n_{04} = 1.84666$ | $\nu_{04} = 23.78$ |
| $r_8 = 3089.2076$ | | | |
| | $d_8 = D_3$ (variable) | | |
| $r_9 = \infty$ (stop) | | | |
| | $d_9 = 1.5000$ | | |
| $r_{10} = 31.1006$ | | | |
| | $d_{10} = 16.8264$ | $n_{05}$ (GRIN lens) | |
| $r_{11} = -16.0418$ | | | |
| | $d_{11} = 4.5488$ | | |
| $r_{12} = \infty$ | | | |
| | $d_{12} = 8.6000$ | $n_{06} = 1.51633$ | $\nu_{06} = 64.15$ |
| $r_{13} = \infty$ | | | |
| | $d_{13} = 1.0000$ | $n_{07} = 1.51633$ | $\nu_{07} = 64.15$ |
| $r_{14} = \infty$ | | | |
| | $d_{14} = 4.0000$ | $n_{08} = 1.54771$ | $\nu_{08} = 62.83$ |
| $r_{15} = \infty$ | | | |
| | $d_{15} = 0.8000$ | | |
| $r_{16} = \infty$ | | | |
| | $d_{16} = 1.7000$ | $n_{09} = 1.51633$ | $\nu_{09} = 64.15$ |
| $r_{17} = \infty$ | | | |

| $f$ | 9.27 | 15.58 | 26.19 |
|---|---|---|---|
| $D_1$ | 0.600 | 7.813 | 13.804 |
| $D_2$ | 0.788 | 1.223 | 0.807 |
| $D_3$ | 14.555 | 6.908 | 1.332 |

| | $n_0$ | $n_1$ | $n_2$ |
|---|---|---|---|
| $n_{01d}(r)$ | 1.69700 | $-0.14138 \times 10^{-3}$ | $-0.18334 \times 10^{-6}$ |
| $n_{01g}(r)$ | 1.71513 | $-0.79091 \times 10^{-4}$ | $0.38942 \times 10^{-7}$ |
| $n_{05d}(r)$ | 1.74950 | $-0.49877 \times 10^{-3}$ | $0.39332 \times 10^{-5}$ |
| $n_{05g}(r)$ | 1.77702 | $-0.41670 \times 10^{-3}$ | $0.48222 \times 10^{-5}$ |

$f_w^2 \cdot n_1(1) = -1.2145 \times 10^{-2}$
$\{n_g(0) - n_d(0)\}/\{n_g(r) - n_d(r)\} = 0.6457$
$f_w^2 \cdot n_1(4) = -4.2846 \times 10^{-2}$
$H/f_w = 3.5178$, $E/f_w = 1.9385$
$f_2/f_w = -0.6297$ $D_{2w} - D_{2T}/\sqrt{f_W \cdot f_T} = -1.2196 \times 10^{-3}$

| Embodiment 22 |
|---|
| $f = 9-27$, $F/2.8$ |

| | | | |
|---|---|---|---|
| $r_1 = 32.1086$ | | | |
| | $d_1 = 5.4001$ | $n_{01}$ (GRIN lens) | |
| $r_2 = -166.7961$ | | | |
| | $d_2 = D_1$ (variable) | | |
| $r_3 = -35.2692$ | | | |
| | $d_3 = 1.72221$ | $n_{02}$ (GRIN lens) | |
| $r_4 = 7.9990$ | | | |
| | $d_4 = D_2$ (variable) | | |
| $r_5 = 12.7223$ | | | |
| | $d_5 = 1.1182$ | $n_{03}$ (GRIN lens) | |
| $r_6 = 20.0000$ | | | |
| | $d_6 = D_3$ (variable) | | |
| $r_7 = \infty$ (stop) | | | |
| | $d_7 = 1.5000$ | | |
| $r_8 = 64.3946$ | | | |
| | $d_8 = 20.6374$ | $n_{04}$ (GRIN lens) | |
| $r_9 = -21.1318$ | | | |
| | $d_9 = 4.0371$ | | |
| $r_{10} = \infty$ | | | |
| | $d_{10} = 8.6000$ | $n_{05} = 1.51633$ | $\nu_{05} = 64.15$ |
| $r_{11} = \infty$ | | | |
| | $d_{11} = 1.0000$ | $n_{06} = 1.51633$ | $\nu_{06} = 64.15$ |
| $r_{12} = \infty$ | | | |
| | $d_{12} = 4.0000$ | $n_{07} = 1.54771$ | $\nu_{07} = 62.83$ |
| $r_{13} = \infty$ | | | |
| | $d_{13} = 0.8000$ | | |
| $r_{14} = \infty$ | | | |
| | $d_{14} = 1.7000$ | $n_{08} = 1.51633$ | $\nu_{08} = 64.15$ |
| $r_{15} = \infty$ | | | |

| $f$ | 9.27 | 15.59 | 26.18 |
|---|---|---|---|
| $D_1$ | 1.249 | 8.717 | 14.634 |
| $D_2$ | 2.522 | 4.365 | 2.507 |
| $D_3$ | 14.702 | 5.391 | 1.332 |
| (GRIN lens) | | | |

| | $n_0$ | $n_1$ | $n_2$ |
|---|---|---|---|
| $n_{01d}(r)$ | 1.65844 | $-0.25489 \times 10^{-3}$ | $-0.44254 \times 10^{-6}$ |
| $n_{01g}(r)$ | 1.67471 | $-0.20251 \times 10^{-3}$ | $-0.38094 \times 10^{-6}$ |
| $n_{02d}(r)$ | 1.72916 | $-0.13080 \times 10^{-2}$ | $-0.39883 \times 10^{-5}$ |
| $n_{02g}(r)$ | 1.74570 | $-0.14620 \times 10^{-2}$ | $-0.65157 \times 10^{-5}$ |
| $n_{03d}(r)$ | 1.71736 | $-0.75575 \times 10^{-3}$ | $-0.29600 \times 10^{-4}$ |
| $n_{03g}(r)$ | 1.74915 | $-0.99045 \times 10^{-3}$ | $-0.12303 \times 10^{-4}$ |
| $n_{04d}(r)$ | 1.75500 | $-0.99530 \times 10^{-3}$ | $0.91162 \times 10^{-6}$ |
| $n_{04g}(r)$ | 1.77296 | $-0.97698 \times 10^{-3}$ | $0.11575 \times 10^{-5}$ |

$f_w^2 \cdot n_1(1) = -2.1906 \times 10^{-2}$
$\{n_g(0) - n_d(0)\}/\{n_g(r) - n_d(r)\} = 0.7080$
$f_w^2 \cdot n_1(4) = -8.5540 \times 10^{-2}$
$H/f_w = 3.7404$, $E/f_w = 1.8939$
$f_2/f_w = -0.9900$ $D_{2w} - D_{2T}/\sqrt{f_W \cdot f_T} = 9.6290 \times 10^{-4}$

| Embodiment 23 |
|---|
| $f = 9.03-49.99$ mm, $F/2.0$ |
| $2\omega = 50.0°-9.6°$ |

| | | | |
|---|---|---|---|
| $r_1 = 49.3751$ | | | |
| | $d_1 = 1.9000$ | $n_1 = 1.80518$ | $\nu_1 = 25.43$ |
| $r_2 = 32.0610$ | | | |
| | $d_2 = 1.3558$ | | |
| $r_3 = 33.9112$ | | | |
| | $d_3 = 10.0000$ | $n_2 = 1.69680$ | $\nu_2 = 55.52$ |
| $r_4 = -1341.8259$ | | | |
| | $d_4 = D_1$ (variable) | | |
| $r_5 = 238.1045$ | | | |
| | $d_5 = 1.5300$ | $n_3 = 1.48749$ | $\nu_3 = 70.20$ |
| $r_6 = 15.3165$ | | | |
| | $d_6 = 6.1200$ | | |
| $r_7 = -33.9198$ | | | |
| | $d_7 = 1.5300$ | $n_4 = 1.48749$ | $\nu_4 = 70.20$ |
| $r_8 = 47.4871$ | | | |
| | $d_8 = D_2$ (variable) | | |
| $r_9 = 57.8704$ | | | |
| | $d_9 = 2.6800$ | $n_5 = 1.84666$ | $\nu_5 = 23.88$ |
| $r_{10} = 165.2504$ | | | |
| | $d_{10} = D_3$ (variable) | | |
| $r_{11} = \infty$ (stop) | | | |
| | $d_{11} = 0.5344$ | | |
| $r_{12} = 15.5559$ (aspherical surface) | | | |
| | $d_{12} = 5.3688$ | $n_6 = 1.71300$ | $\nu_6 = 53.84$ |
| $r_{13} = -59.5659$ (aspherical surface) | | | |
| | $d_{13} = 4.1627$ | | |
| $r_{14} = -14.6363$ | | | |
| | $d_{14} = 1.5000$ | $n_7 = 1.69895$ | $\nu_7 = 30.12$ |
| $r_{15} = 12.3428$ | | | |

-continued
Embodiment 23

| | | | |
|---|---|---|---|
| $r_{16} = 13.2176$ | | | |
| | $d_{15} = 0.3931$ | | |
| $r_{17} = -12.7471$ | $d_{16} = 5.0166$ | $n_8 = 1.69680$ | $\nu_8 = 55.52$ |
| | (aspherical surface) | | |
| | $d_{17} = 1.0000$ | | |
| $r_{18} = \infty$ | | | |
| | $d_{18} = 5.3000$ | $n_9 = 1.51633$ | $\nu_9 = 64.15$ |
| $r_{19} = \infty$ | | | |

| | W | S | T |
|---|---|---|---|
| $D_1$ | 0.200 | 25.682 | 40.757 |
| $D_2$ | 0.800 | 12.199 | 0.800 |
| $D_3$ | 44.526 | 7.645 | 3.969 |

(Aspherical coefficient)

$(r_{12})\ P = 1.0798,\ A_2 = 0$
$A_4 = -0.18381 \times 10^{-4},\ A_6 = -0.54335 \times 10^{-6}$
$A_8 = 0.27831 \times 10^{-8}$
$(r_{13})\ P = 4.3655,\ A_2 = 0$
$A_4 = -0.77400 \times 10^{-6},\ A_6 = -0.50130 \times 10^{-6}$
$A_8 = -0.69081 \times 10^{-9}$
$(r_{17})\ P = -0.4297,\ A_2 = 0$
$A_4 = 0.48521 \times 10^{-4},\ A_6 = -0.26079 \times 10^{-5}$
$A_8 = 0.77605 \times 10^{-7}$ $(D_{2max} - D_{2min})/(Z^2 \sqrt{f_W \cdot f_T}) = 0.01774$
$f_W^{0.25} \times f_T^{0.75} = 32.591,\ F_{D3min} = 35.0$ $f_T = 49.994,\ |f_{II\ III}|/\sqrt{f_W \cdot f_T} = 0.99191$ $f_{III}/|f_{II\ III}| = 4.93486,\ \nu_{II} - \nu_{III} = 46.32$ $\sqrt{f_W \cdot f_T}/F_{I\ II\ III} = -0.6236$

Embodiment 24
$f = 9.00$–$50.00$ mm, F/2.0
$2\omega = 50.0°$–$9.6°$

| | | | |
|---|---|---|---|
| $r_1 = 50.5344$ | | | |
| | $d_1 = 1.9000$ | $n_1 = 1.78472$ | $\nu_1 = 25.71$ |
| $r_2 = 32.3183$ | | | |
| | $d_2 = 1.2000$ | | |
| $r_3 = 33.8648$ | | | |
| | $d_3 = 11.0000$ | $n_2 = 1.69680$ | $\nu_2 = 55.52$ |
| $r_4 = -1865.6796$ | | | |
| | $d_4 = D_1$ (variable) | | |
| $r_5 = 130.1436$ | | | |
| | $d_5 = 1.5300$ | $n_3 = 1.51633$ | $\nu_3 = 64.15$ |
| $r_6 = 14.1888$ | | | |
| | $d_6 = 6.1200$ | | |
| $r_7 = -21.8168$ | | | |
| | $d_7 = 1.5300$ | $n_4 = 1.51633$ | $\nu_4 = 64.15$ |
| $r_8 = 986.8691$ | | | |
| | $d_8 = D_2$ (variable) | | |
| $r_9 = 79.8279$ | | | |
| | $d_9 = 2.6800$ | $n_5 = 1.84666$ | $\nu_5 = 23.88$ |
| $r_{10} = 1469.7618$ | | | |
| | $d_{10} = D_3$ (variable) | | |
| $r_{11} = \infty$ (stop) | | | |
| | $d_{11} = 0.5344$ | | |
| $r_{12} = 18.2634$ | | | |
| | $d_{12} = 4.8530$ | $n_6 = 1.83400$ | $\nu_6 = 37.16$ |
| $r_{13} = -79.1152$ (aspherical surface) | | | |
| | $d_{13} = 4.0255$ | | |
| $r_{14} = -16.9639$ | | | |
| | $d_{14} = 1.5000$ | $n_7 = 1.76182$ | $\nu_7 = 26.55$ |
| $r_{15} = 12.1418$ | | | |
| | $d_{15} = 0.4003$ | | |
| $r_{16} = 13.8101$ (aspherical surface) | | | |
| | $d_{16} = 4.8887$ | $n_8 = 1.69680$ | $\nu_8 = 55.52$ |
| $r_{17} = -11.9902$ | | | |
| | $d_{17} = 1.0000$ | | |
| $r_{18} = \infty$ | | | |
| | $d_{18} = 5.3000$ | $n_9 = 1.51633$ | $\nu_9 = 64.15$ |
| $r_{19} = \infty$ | | | |

-continued
Embodiment 24

| | W | S | T |
|---|---|---|---|
| $D_1$ | 0.200 | 25.880 | 41.094 |
| $D_2$ | 0.800 | 11.899 | 2.139 |
| $D_3$ | 45.163 | 8.384 | 2.930 |

Aspherical coefficient $(r_{13})\ P = -83.0968,\ A_2 = 0$
$A_4 = 0.15136 \times 10^{-4},\ A_6 = -0.38724 \times 10^{-8}$
$A_8 = -0.37223 \times 10^{-8}$
$(r_{16})\ P = 0.3442,\ A_2 = 0$
$A_4 = -0.42179 \times 10^{-4},\ A_6 = -0.25964 \times 10^{-6}$
$A_8 = 0.69289 \times 10^{-8}$ $(D_{2max} - D_{2min})/(Z^2 \sqrt{f_W \cdot f_T}) = 0.01711$ $f_W^{0.25} \times f_T^{0.75} = 32.568,\ f_{D3min} = 37.7$ $f_T = 50.000,\ |f_{II\ III}|/\sqrt{f_W \cdot f_T} = 0.99615$ $f_{III}/|f_{II\ III}| = 4.71394,\ \nu_{II} - \nu_{III} = 40.27$ $\sqrt{f_W \cdot f_T}/F_{I\ II\ III} = -0.6364$

Embodiment 25
$f = 9.00$–$50.00$ mm, F/2.0
$2\omega = 50.0°$–$9.6°$

| | | | |
|---|---|---|---|
| $r_1 = 55.5187$ | | | |
| | $d_1 = 1.9286$ | $n_1 = 1.76182$ | $\nu_1 = 26.55$ |
| $r_2 = 32.2957$ | | | |
| | $d_2 = 1.2036$ | | |
| $r_3 = 33.9371$ | | | |
| | $d_3 = 11.0000$ | $n_2 = 1.72600$ | $\nu_2 = 53.56$ |
| $r_4 = -1560.0207$ | | | |
| | $d_4 = D_1$ (variable) | | |
| $r_5 = 61.7642$ | | | |
| | $d_5 = 1.5869$ | $n_3 = 1.51633$ | $\nu_3 = 64.15$ |
| $r_6 = 16.6743$ | | | |
| | $d_6 = 6.7000$ | | |
| $r_7 = -29.0782$ | | | |
| | $d_7 = 0.8891$ | $n_4 = 1.48749$ | $\nu_4 = 70.20$ |
| $r_8 = 32.3847$ | | | |
| | $d_8 = D_2$ (variable) | | |
| $r_9 = 53.5427$ | | | |
| | $d_9 = 2.5921$ | $n_5 = 1.84666$ | $\nu_5 = 23.88$ |
| $r_{10} = 134.3113$ | | | |
| | $d_{10} = D_3$ (variable) | | |
| $r_{11} = \infty$ (stop) | | | |
| | $d_{11} = 1.8313$ | | |
| $r_{12} = 18.3673$ (aspherical surface) | | | |
| | $d_{12} = 4.8176$ | $n_6 = 1.83400$ | $\nu_6 = 37.16$ |
| $r_{13} = -99.4260$ | | | |
| | $d_{13} = 4.0269$ | | |
| $r_{14} = -14.4882$ | | | |
| | $d_{14} = 1.3794$ | $n_7 = 1.76182$ | $\nu_7 = 26.55$ |
| $r_{15} = 12.7882$ | | | |
| | $d_{15} = 0.4010$ | | |
| $r_{16} = 13.0966$ | | | |
| | $d_{16} = 4.8312$ | $n_8 = 1.72916$ | $\nu_8 = 54.68$ |
| $r_{17} = -11.9825$ (aspherical surface) | | | |
| | $d_{17} = 1.0000$ | | |
| $r_{18} = \infty$ | | | |
| | $d_{18} = 5.3000$ | $n_9 = 1.51633$ | $\nu_9 = 64.15$ |
| $r_{19} = \infty$ | | | |

| | W | S | T |
|---|---|---|---|
| $D_1$ | 0.200 | 25.761 | 40.950 |
| $D_2$ | 1.500 | 12.990 | 1.500 |
| $D_3$ | 44.923 | 7.872 | 4.173 |

Aspherical coefficient $(r_{12})\ P = 1.3854,\ A_2 = 0$
$A_4 = -0.14150 \times 10^{-4},\ A_6 = -0.31479 \times 10^{-6}$
$A_8 = 0.54335 \times 10^{-8}$
$(r_{17})\ P = -0.2792,\ A_2 = 0$
$A_4 = 0.37765 \times 10^{-4},\ A_6 = -0.20596 \times 10^{-5}$
$A_8 = 0.61381 \times 10^{-7}$

Embodiment 25

$(D_{2max} - D_{2min})/(Z^2 \sqrt{f_W \cdot f_T}) = 0.01767$ $f_W^{0.25} \times f_T^{0.75} = 32.568$, $F_{D3min} = 35.2$ $f_T = 50.000$, $|f_{II\,III}|/\sqrt{f_W \cdot f_T} = 0.99391$ $f_{III}/|f_{II\,III}| = 4.91545$, $\nu_{II} - \nu_{III} = 43.295$ $\sqrt{f_W \cdot f_T}/f_{I\,II\,III} = -0.6105$

Embodiment 26 f = 12.510–62.542 mm, F/2.0
2ω = 49.8°–10.6°

| | | | |
|---|---|---|---|
| $r_1 = 107.9237$ | | | |
| | $d_1 = 2.2000$ | $n_1 = 1.80518$ | $\nu_1 = 25.43$ |
| $r_2 = 58.0932$ | | | |
| | $d_2 = 11.5000$ | $n_2 = 1.60311$ | $\nu_2 = 60.70$ |
| $r_3 = -210.5191$ | | | |
| | $d_3 = 0.1500$ | | |
| $r_4 = 50.5120$ | | | |
| | $d_4 = 4.0000$ | $n_3 = 1.69680$ | $\nu_3 = 55.52$ |
| $r_5 = 78.9778$ | | | |
| | $d_5 = D_1$ (variable) | | |
| $r_6 = 43.9146$ | | | |
| | $d_6 = 1.0000$ | $n_4 = 1.77250$ | $\nu_4 = 49.66$ |
| $r_7 = 19.0917$ | | | |
| | $d_7 = 6.0000$ | | |
| $r_8 = -28.6378$ | | | |
| | $d_8 = 1.0000$ | $n_5 = 1.69680$ | $\nu_5 = 55.52$ |
| $r_9 = 64.7065$ | | | |
| | $d_9 = D_2$ (variable) | | |
| $r_{10} = 41.5028$ | | | |
| | $d_{10} = 2.2000$ | $n_6 = 1.84666$ | $\nu_6 = 23.78$ |
| $r_{11} = 147.4678$ | | | |
| | $d_{11} = D_3$ (variable) | | |
| $r_{12} = \infty$ (stop) | | | |
| | $d_{12} = 10.0000$ | | |
| $r_{13} = 24.0942$ | | | |
| | $d_{13} = 3.0000$ | $n_7 = 1.77250$ | $\nu_7 = 49.66$ |
| $r_{14} = 46.1095$ (aspherical surface) | | | |
| | $d_{14} = 17.8082$ | | |
| $r_{15} = 662.2276$ | | | |
| | $d_{15} = 3.7000$ | $n_8 = 1.78590$ | $\nu_8 = 44.18$ |
| $r_{16} = -52.2952$ | | | |
| | $d_{16} = 0.1500$ | | |
| $r_{17} = 40.7902$ | | | |
| | $d_{17} = 6.0000$ | $n_9 = 1.65160$ | $\nu_9 = 58.52$ |
| $r_{18} = -17.3469$ | | | |
| | $d_{18} = 1.2000$ | $n_{10} = 1.80518$ | $\nu_{10} = 25.43$ |
| $r_{19} = -84.4448$ | | | |
| | $d_{19} = 2.0000$ | | |
| $r_{20} = \infty$ | | | |
| | $d_{20} = 9.8000$ | $n_{11} = 1.51633$ | $\nu_{11} = 64.15$ |
| $r_{21} = \infty$ | | | |
| | $d_{21} = 7.3500$ | $n_{12} = 1.54771$ | $\nu_{12} = 62.83$ |
| $r_{22} = \infty$ | | | |
| | $d_{22} = 1.0000$ | $n_{13} = 1.51633$ | $\nu_{13} = 64.15$ |
| $r_{23} = \infty$ | | | |
| | $d_{23} = 0.3000$ | | |
| $r_{24} = \infty$ | | | |
| | $d_{24} = 6.2000$ | $n_{14} = 1.60311$ | $\nu_{14} = 60.70$ |
| $r_{25} = \infty$ | | | |
| | $d_{25} = 0.9000$ | | |
| $r_{26} = \infty$ | | | |
| | $d_{26} = 1.7000$ | $n_{15} = 1.51633$ | $\nu_{15} = 64.15$ |
| $r_{27} = \infty$ | | | |

Aspherical coefficient
P = 1.0000, $A_2 = 0$, $A_4 = 0.65593 \times 10^{-5}$
$A_6 = 0.61420 \times 10^{-7}$, $A_8 = 0.16792 \times 10^{-9}$
$A_{10} = -0.73747 \times 10^{-11}$

| f | 12.510 | 27.986 | 62.542 |
|---|---|---|---|
| $D_1$ | 1.000 | 24.422 | 40.854 |
| $D_2$ | 1.000 | 7.141 | 0.800 |

Embodiment 26 (continued)

| $D_3$ | 42.654 | 13.091 | 3.000 |
|---|---|---|---|

$|\beta 2S| = 0.508$, $|\beta 23S| = 1.003$ $|f_{II\,III}|/\sqrt{f_W \cdot f_T} = 0.7966$, $f_{III}/|f_{II\,III}| = 3.0326$ $\nu_{II} - \nu_{III} = 28.81$, $\sqrt{f_W \cdot f_T}/f_{I\,II\,III} = -0.7440$

Embodiment 27 f = 12.50–62.50 mm, F/2.0
2ω = 49.8°–10.6°

| | | | |
|---|---|---|---|
| $r_1 = 92.7365$ | | | |
| | $d_1 = 2.2000$ | $n_1 = 1.80518$ | $\nu_1 = 25.43$ |
| $r_2 = 60.2967$ | | | |
| | $d_2 = 0.1100$ | | |
| $r_3 = 60.9794$ | | | |
| | $d_3 = 10.6000$ | $n_2 = 1.60311$ | $\nu_2 = 60.70$ |
| $r_4 = -472.8215$ | | | |
| | $d_4 = 0.1500$ | | |
| $r_5 = 63.5129$ | | | |
| | $d_5 = 3.6000$ | $n_3 = 1.69680$ | $\nu_3 = 55.52$ |
| $r_6 = 97.2342$ | | | |
| | $d_6 = D_1$ (variable) | | |
| $r_7 = 44.5902$ | | | |
| | $d_7 = 1.0000$ | $n_4 = 1.78590$ | $\nu_4 = 44.18$ |
| $r_8 = 18.9648$ | | | |
| | $d_8 = 6.0000$ | | |
| $r_9 = -29.5488$ | | | |
| | $d_9 = 1.0000$ | $n_5 = 1.77250$ | $\nu_5 = 49.66$ |
| $r_{10} = 66.4946$ | | | |
| | $d_{10} = D_2$ (variable) | | |
| $r_{11} = 53.4995$ | | | |
| | $d_{11} = 3.3000$ | $n_6 = 1.84666$ | $\nu_6 = 23.78$ |
| $r_{12} = -114.1554$ | | | |
| | $d_{12} = D_3$ (variable) | | |
| $r_{13} = \infty$ (stop) | | | |
| | $d_{13} = 9.0000$ | | |
| $r_{14} = 19.4606$ | | | |
| | $d_{14} = 6.0000$ | $n_7 = 1.78590$ | $\nu_7 = 44.18$ |
| $r_{15} = -75.1103$ | | | |
| | $d_{15} = 0.6400$ | | |
| $r_{16} = -33.8034$ | | | |
| | $d_{16} = 1.2000$ | $n_8 = 1.85026$ | $\nu_8 = 32.28$ |
| $r_{17} = 21.5338$ | | | |
| | $d_{17} = 7.5431$ | | |
| $r_{18} = -6552.5276$ | | | |
| | $d_{18} = 3.9000$ | $n_9 = 1.69680$ | $\nu_9 = 55.52$ |
| $r_{19} = -25.5156$ | | | |
| | $d_{19} = 0.1500$ | | |
| $r_{20} = 35.4568$ | | | |
| | $d_{20} = 5.8000$ | $n_{10} = 1.69680$ | $\nu_{10} = 55.52$ |
| $r_{21} = -30.0000$ | | | |
| | $d_{21} = 1.0000$ | $n_{11} = 1.69895$ | $\nu_{11} = 30.12$ |
| $r_{22} = -430.3189$ | | | |
| | $d_{22} = 2.0000$ | | |
| $r_{23} = \infty$ | | | |
| | $d_{23} = 9.8000$ | $n_{12} = 1.51633$ | $\nu_{12} = 64.15$ |
| $r_{24} = \infty$ | | | |
| | $d_{24} = 7.3500$ | $n_{13} = 1.54771$ | $\nu_{13} = 62.83$ |
| $r_{25} = \infty$ | | | |
| | $d_{25} = 1.0000$ | $n_{14} = 1.51633$ | $\nu_{14} = 64.15$ |
| $r_{26} = \infty$ | | | |
| | $d_{26} = 0.3000$ | | |
| $r_{27} = \infty$ | | | |
| | $d_{27} = 6.2000$ | $n_{15} = 1.60311$ | $\nu_{15} = 60.70$ |
| $r_{28} = \infty$ | | | |
| | $d_{28} = 0.9000$ | | |
| $r_{29} = \infty$ | | | |
| | $d_{29} = 1.7000$ | $n_{16} = 1.51633$ | $\nu_{16} = 64.15$ |
| $r_{30} = \infty$ | | | |

| f | 12.50 | 27.95 | 62.50 |
|---|---|---|---|
| $D_1$ | 0.700 | 28.113 | 48.280 |
| $D_2$ | 1.000 | 4.166 | 0.800 |

-continued

Embodiment 27

| | | | |
|---|---|---|---|
| D₃ | 48.880 | 18.300 | 1.500 |

$|\beta_{2S}| = 0.366, |\beta_{23S}| = 1.012$ $|f_{II\,III}|/\sqrt{f_W \cdot f_T} = 0.9512, f_{III}/|f_{II\,III}| = 1.6330$ $\nu_{II}-\nu_{III} = 23.14, \sqrt{f_W \cdot f_T}/f_{I\,II\,III} = -0.6405$

Embodiment 28
f = 9.00–27.00 mm, F/2.0
2ω = 50.0°–17.6°

| | | | |
|---|---|---|---|
| r₁ = 56.4152 | d₁ = 1.2000 | n₁ = 1.84666 | ν₁ = 23.78 |
| r₂ = 31.6580 | d₂ = 0.1600 | | |
| r₃ = 33.0169 | d₃ = 4.5000 | n₂ = 1.69680 | ν₂ = 55.52 |
| r₄ = 1026.5610 | d₄ = 0.1500 | | |
| r₅ = 29.0380 | d₅ = 3.6000 | n₃ = 1.69680 | ν₃ = 55.52 |
| r₆ = 145.8291 | d₆ = D₁ (variable) | | |
| r₇ = 45.6729 | d₇ = 0.9000 | n₄ = 1.69680 | ν₄ = 55.52 |
| r₈ = 8.9724 | d₈ = 4.0000 | | |
| r₉ = −13.1350 | d₉ = 0.9000 | n₅ = 1.69680 | ν₅ = 55.52 |
| r₁₀ = 40.3800 | d₁₀ = D₂ (variable) | | |
| r₁₁ = 21.6314 | d₁₁ = 2.2000 | n₆ = 1.84666 | ν₆ = 23.78 |
| r₁₂ = −275.4637 | d₁₂ = D₃ (variable) | | |
| r₁₃ = ∞ (stop) | d₁₃ = 3.5000 | | |
| r₁₄ = 17.7187 | d₁₄ = 7.3750 | n₇ = 1.83400 | ν₇ = 37.16 |
| r₁₅ = −53.8381 | d₁₅ = 0.6000 | | |
| r₁₆ = −14.9212 | d₁₆ = 7.1201 | n₈ = 1.84666 | ν₈ = 23.78 |
| r₁₇ = 23.4647 | d₁₇ = 0.5000 | | |
| r₁₈ = 65.1755 | d₁₈ = 3.8000 | n₉ = 1.69680 | ν₉ = 55.52 |
| r₁₉ = −16.8916 | d₁₉ = 0.1500 | | |
| r₂₀ = 21.9062 | d₂₀ = 4.2000 | n₁₀ = 1.69680 | ν₁₀ = 55.52 |
| r₂₁ = −42.6375 | d₂₁ = 5.0000 | | |
| r₂₂ = ∞ | d₂₂ = 7.9000 | n₁₁ = 1.51633 | ν₁₁ = 64.15 |
| r₂₃ = ∞ | d₂₃ = 5.1000 | n₁₂ = 1.54771 | ν₁₂ = 62.83 |
| r₂₄ = ∞ | d₂₄ = 1.2000 | n₁₃ = 1.51633 | ν₁₃ = 64.15 |
| r₂₅ = ∞ | d₂₅ = 0.9000 | | |
| r₂₆ = ∞ | d₂₆ = 0.7000 | n₁₄ = 1.51633 | ν₁₄ = 64.15 |
| r₂₇ = ∞ | d₂₇ = 0.3100 | | |
| r₂₈ = ∞ | d₂₈ = 0.6000 | n₁₅ = 1.48749 | ν₁₅ = 70.20 |
| r₂₉ = ∞ | | | |

| f | 9.00 | 15.59 | 27.00 |
|---|---|---|---|
| D₁ | 0.719 | 7.951 | 13.624 |
| D₂ | 0.800 | 1.683 | 0.800 |
| D₃ | 15.063 | 6.948 | 2.158 |

-continued

Embodiment 28

$|\beta_{2S}| = 0.437, |\beta_{23S}| = 1.001$ $|f_{II\,III}|/\sqrt{f_W \cdot f_T} = 0.7169, f_{III}/|f_{II\,III}| = 2.1269$ $\nu_{II}-\nu_{III} = 31.74, \sqrt{f_W \cdot f_T}/f_{I\,II\,III} = -0.7476$

Embodiment 29
f = 9.00–27.00 mm, F/2.0
2ω = 50.0°–17.6°

| | | | |
|---|---|---|---|
| r₁ = 56.5996 | d₁ = 1.2000 | n₁ = 1.84666 | ν₁ = 23.78 |
| r₂ = 31.9263 | d₂ = 0.1400 | | |
| r₃ = 33.1041 | d₃ = 4.5000 | n₂ = 1.69680 | ν₂ = 55.52 |
| r₄ = 680.2278 | d₄ = 0.1500 | | |
| r₅ = 28.6763 | d₅ = 3.6000 | n₃ = 1.69680 | ν₃ = 55.52 |
| r₆ = 140.1400 | d₆ = D₁ (variable) | | |
| r₇ = 42.0080 | d₇ = 0.9000 | n₄ = 1.69680 | ν₄ = 55.52 |
| r₈ = 8.9088 | d₈ = 4.0000 | | |
| r₉ = −13.2258 | d₉ = 0.9000 | n₅ = 1.69680 | ν₅ = 55.52 |
| r₁₀ = 41.2699 | d₁₀ = D₂ (variable) | | |
| r₁₁ = 21.3044 | d₁₁ = 2.2000 | n₆ = 1.84666 | ν₆ = 23.78 |
| r₁₂ = −591.7647 | d₁₂ = D₃ (variable) | | |
| r₁₃ = ∞ (stop) | d₁₃ = 3.5000 | | |
| r₁₄ = 18.6173 | d₁₄ = 7.3195 | n₇ = 1.83400 | ν₇ = 37.16 |
| r₁₅ = −58.9205 | d₁₅ = 0.6000 | | |
| r₁₆ = −14.3913 | d₁₆ = 1.0000 | n₈ = 1.84666 | ν₈ = 23.78 |
| r₁₇ = −183.9003 | d₁₇ = 2.8441 | | |
| r₁₈ = 293.7792 | d₁₈ = 1.0000 | n₉ = 1.84666 | ν₉ = 23.78 |
| r₁₉ = 23.4601 | d₁₉ = 0.5000 | | |
| r₂₀ = 61.8945 | d₂₀ = 3.8000 | n₁₀ = 1.69680 | ν₁₀ = 55.52 |
| r₂₁ = −17.4002 | d₂₁ = 0.1500 | | |
| r₂₂ = 23.6654 | d₂₂ = 4.2000 | n₁₁ = 1.69680 | ν₁₁ = 55.52 |
| r₂₃ = −39.1894 | d₂₃ = 5.0000 | | |
| r₂₄ = ∞ | d₂₄ = 7.9000 | n₁₂ = 1.51633 | ν₁₂ = 64.15 |
| r₂₅ = ∞ | d₂₅ = 5.1000 | n₁₃ = 1.54771 | ν₁₃ = 62.83 |
| r₂₆ = ∞ | d₂₆ = 1.2000 | n₁₄ = 1.51633 | ν₁₄ = 64.15 |
| r₂₇ = ∞ | d₂₇ = 0.9000 | | |
| r₂₈ = ∞ | d₂₈ = 0.7000 | n₁₅ = 1.51633 | ν₁₅ = 64.15 |
| r₂₉ = ∞ | d₂₉ = 0.3100 | | |
| r₃₀ = ∞ | d₃₀ = 0.6000 | n₁₆ = 1.48749 | ν₁₆ = 70.20 |
| r₃₁ = ∞ | | | |

| f | 9.00 | 15.59 | 27.00 |
|---|---|---|---|
| D₁ | 0.719 | 7.961 | 13.642 |

-continued

Embodiment 29

|  |  |  |  |
|---|---|---|---|
| $D_2$ | 0.800 | 1.717 | 0.800 |
| $D_3$ | 15.081 | 6.923 | 2.158 |

$|\beta_{2S}| = 0.443$, $|\beta_{23S}| = 1.000$ $|f_{II III}|/\sqrt{f_W \cdot f_T} = 0.7179$, $f_{III}/|f_{II III}| = 2.1739$ $\nu_{II} - \nu_{III} = 31.74$, $\sqrt{f_W \cdot f_T}/f_{I II III} = -0.7445$

Embodiment 30
$f = 9.00-54.01$ mm, $F/2.8$ $2\omega = 50.0°-8.8°$

| | | | |
|---|---|---|---|
| $r_1 = 160.7559$ | | | |
| | $d_1 = 2.0000$ | $n_1 = 1.80518$ | $\nu_1 = 25.43$ |
| $r_2 = 53.1230$ | | | |
| | $d_2 = 6.8798$ | $n_2 = 1.56965$ | $\nu_2 = 49.33$ |
| $r_3 = -159.5377$ | | | |
| | $d_3 = 0.1525$ | | |
| $r_4 = 40.0188$ | | | |
| | $d_4 = 3.7500$ | $n_3 = 1.69350$ | $\nu_3 = 53.23$ |
| $r_5 = 110.2089$ | | | |
| | $d_5 = D_1$ (variable) | | |
| $r_6 = 64.7382$ | | | |
| | $d_6 = 0.7001$ | $n_4 = 1.88300$ | $\nu_4 = 40.78$ |
| $r_7 = 16.7474$ | | | |
| | $d_7 = 5.4998$ | | |
| $r_8 = -20.8535$ | | | |
| | $d_8 = 2.4046$ | $n_5 = 1.69680$ | $\nu_5 = 55.52$ |
| $r_9 = -378.9036$ | | | |
| | $d_9 = D_2$ (variable) | | |
| $r_{10} = -69.3141$ | | | |
| | $d_{10} = 2.0000$ | $n_6 = 1.84666$ | $\nu_6 = 23.78$ |
| $r_{11} = -35.6896$ | | | |
| | $d_{11} = D_3$ (variable) | | |
| $r_{12} = \infty$ (stop) | | | |
| | $d_{12} = 3.4528$ | | |
| $r_{13} = 8.7239$ | | | |
| | $d_{13} = 7.2235$ | $n_7 = 1.74950$ | $\nu_7 = 35.27$ |
| $r_{14} = -42.6034$ | | | |
| | $d_{14} = 0.4864$ | | |
| $r_{15} = -19.0714$ | | | |
| | $d_{15} = 0.3200$ | $n_8 = 1.84666$ | $\nu_8 = 23.78$ |
| $r_{16} = 7.2279$ | | | |
| | $d_{16} = 1.5491$ | | |
| $r_{17} = 8.3551$ | | | |
| | $d_{17} = 2.2000$ | $n_9 = 1.60311$ | $\nu_9 = 60.70$ |
| $r_{18} = -57.2729$ (aspherical surface) | | | |
| | $d_{18} = 0.4380$ | | |
| $r_{19} = \infty$ | | | |
| | $d_{19} = 23.8190$ | $n_{10} = 1.51633$ | $\nu_{10} = 64.15$ |
| $r_{20} = \infty$ | | | |

Aspherical coefficient
$P = -81.1789$, $A_2 = 0$, $A_4 = 0.28241 \times 10^{-3}$
$A_6 = 0.97555 \times 10^{-5}$, $A_8 = -0.12876 \times 10^{-6}$

| f | 9.00 | 22.00 | 54.01 |
|---|---|---|---|
| $D_1$ | 1.486 | 24.028 | 36.755 |
| $D_2$ | 9.199 | 13.840 | 3.265 |
| $D_3$ | 36.030 | 8.848 | 6.694 |

$|\beta_{2S}| = 0.601$, $|\beta_{23S}| = 1.169$ $|f_{II III}|/\sqrt{f_W \cdot f_T} = 0.8068$, $f_{III}/|f_{II III}| = 4.7555$ $\nu_{II} - \nu_{III} = 24.37$, $\sqrt{f_W \cdot f_T}/f_{I II III} = -0.7096$ wherein the reference symbols $r_1$, $r_2$, ... represent radii of curvature on the respective lens surfaces, the reference symbols $d_1$, $d_2$, ... designate thicknesses of the respective lens elements and airspaces reserved therebetween, the reference symbols $n_1$, $n_2$, ... denote refractive indices of the respective lens elements, and the reference symbols $\nu_1$, $\nu_2$, ... represent Abbe's numbers of the respective lens elements.

In the Embodiments described above, the first lens unit comprises a negative lens element and a positive lens element, the second lens unit comprises two negative lens elements, the third lens unit comprises a single positive lens element, and the fourth lens unit comprises a positive lens element, a negative lens element, a positive lens element and a positive lens element, i.e., the zoom lens system as a whole comprises nine lens elements. Any of these embodiments are so designed as to satisfy the conditions (3), (4) and (5).

Figure 29:
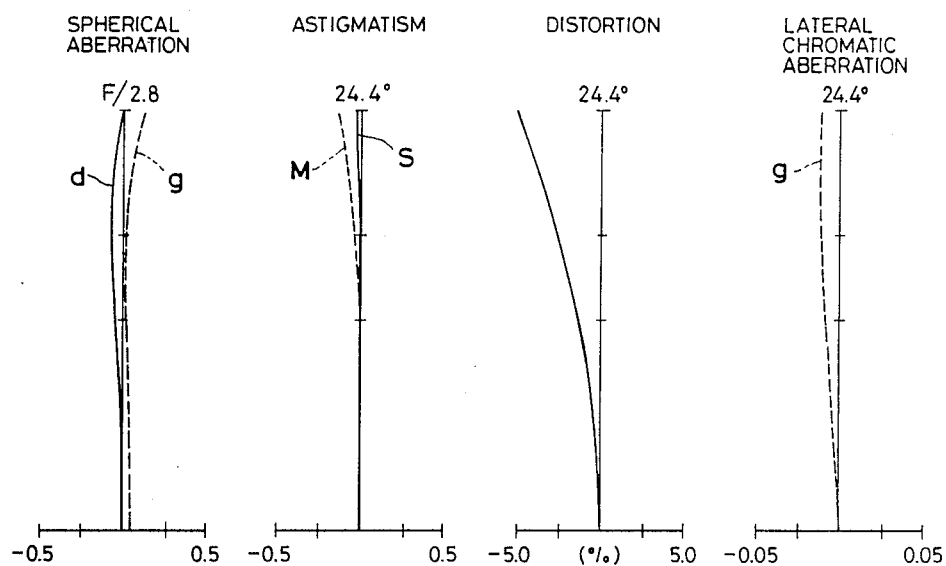
FIGS. 29 through 31 show curves illustrating aberration characteristics of the Embodiment 1.
Figure 30:
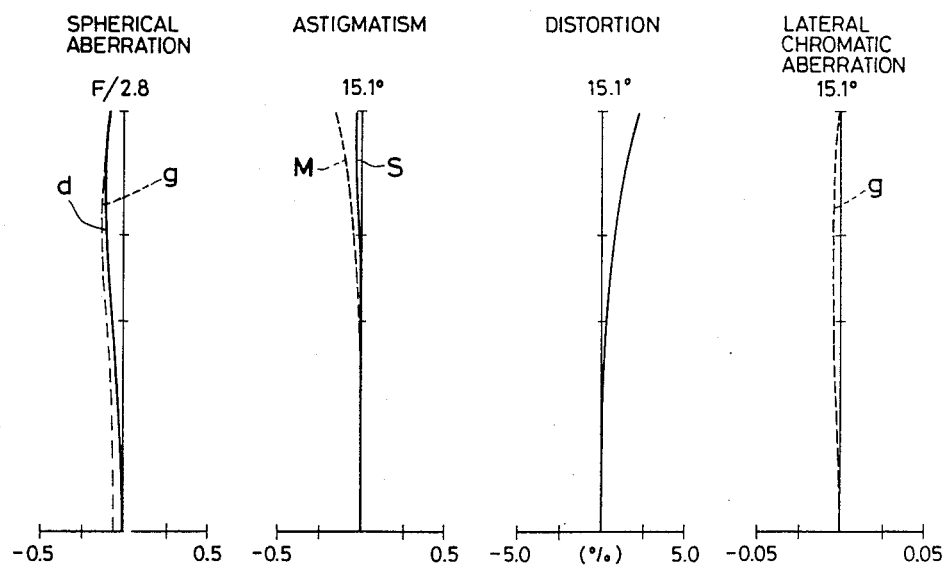
Figure 31:
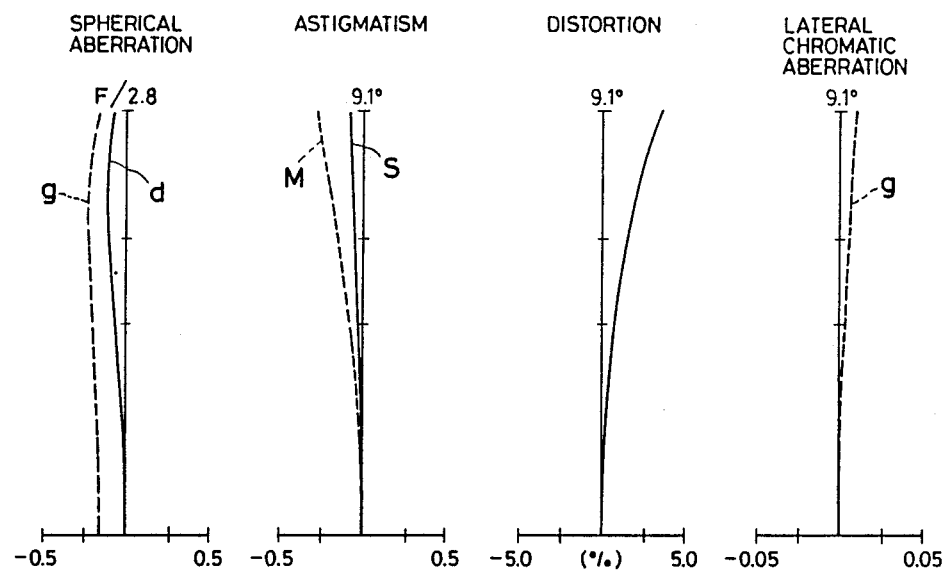
Figure 32:
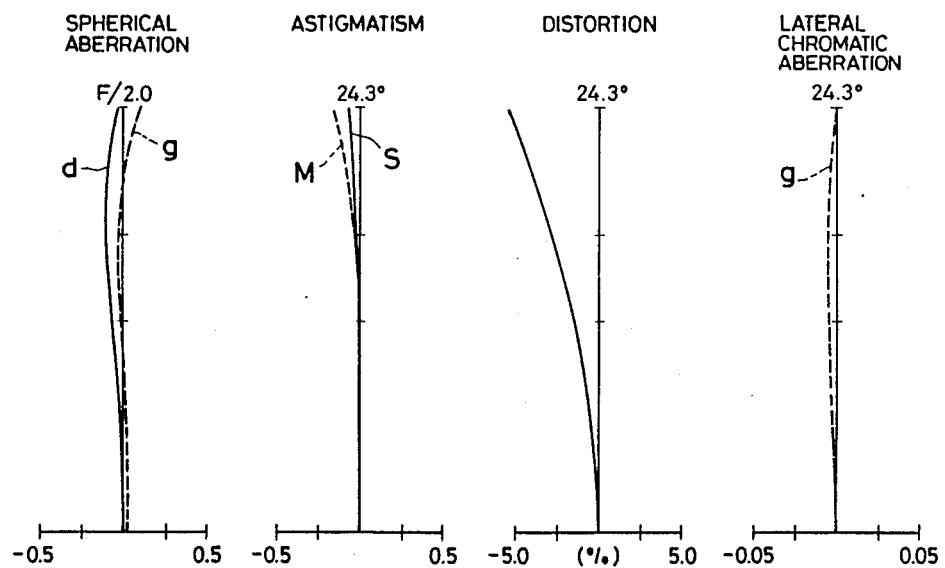
FIGS. 32 through 34 show curves illustrating aberration characteristics of the Embodiment 2.
Figure 33:
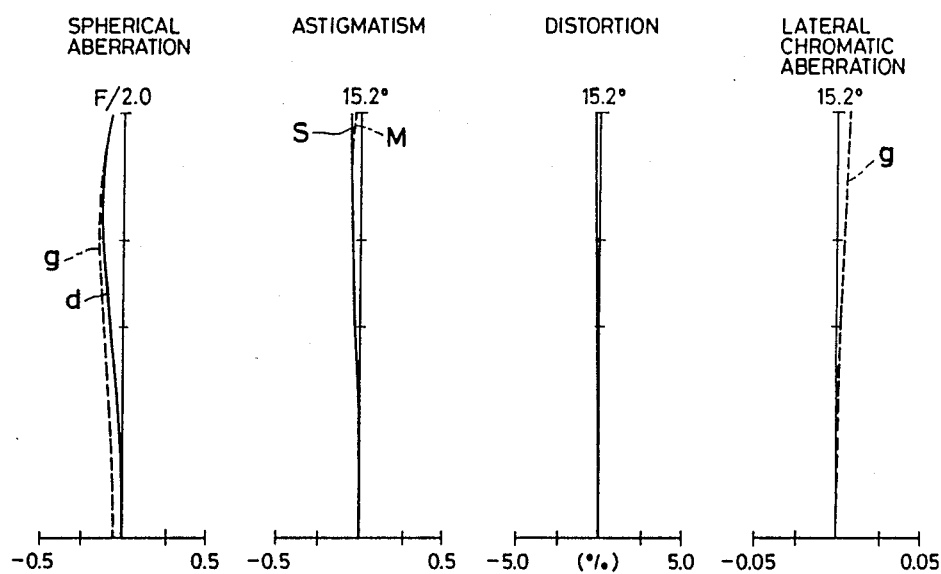
Figure 34:
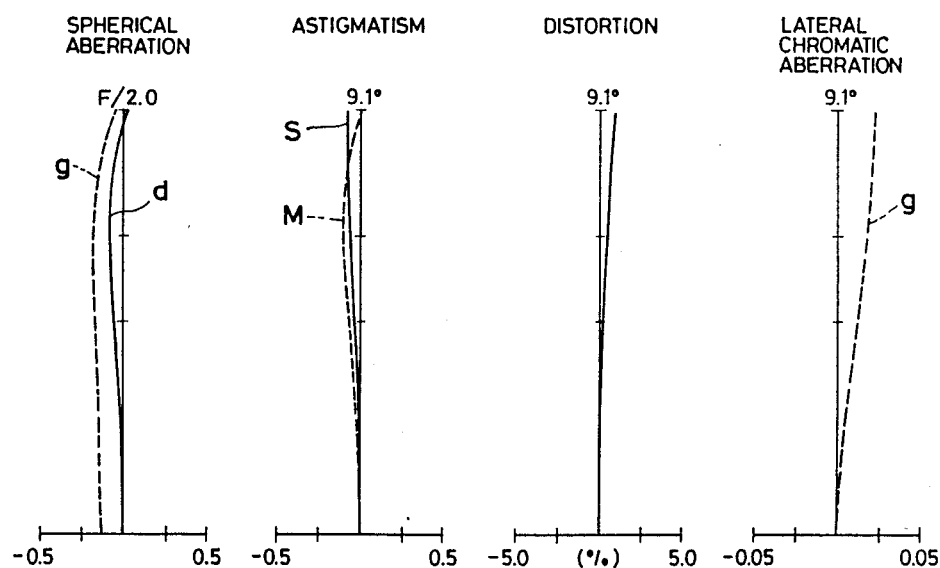

Aberration characteristics of the Embodiment 1 at the focal lengths of $f_W$, $f_S$ and $f_T$ are illustrated in FIG. 29, FIG. 30 and FIG. 31 respectively. Aberration characteristics of the Embodiment 2 at $f_W$, $f_S$ and $f_T$ are shown in FIG. 32, FIG. 33 and FIG. 34 respectively. The Embodiment 3 through 6 have the compositions illustrated in FIG. 3 through FIG. 6, and each embodiment comprises nine lens elements in total. In these embodiment, the fourth lens unit is designed basically as a triplet. Further, the Embodiments 4 and 6 adopt aspherical surfaces.

Figure 35:
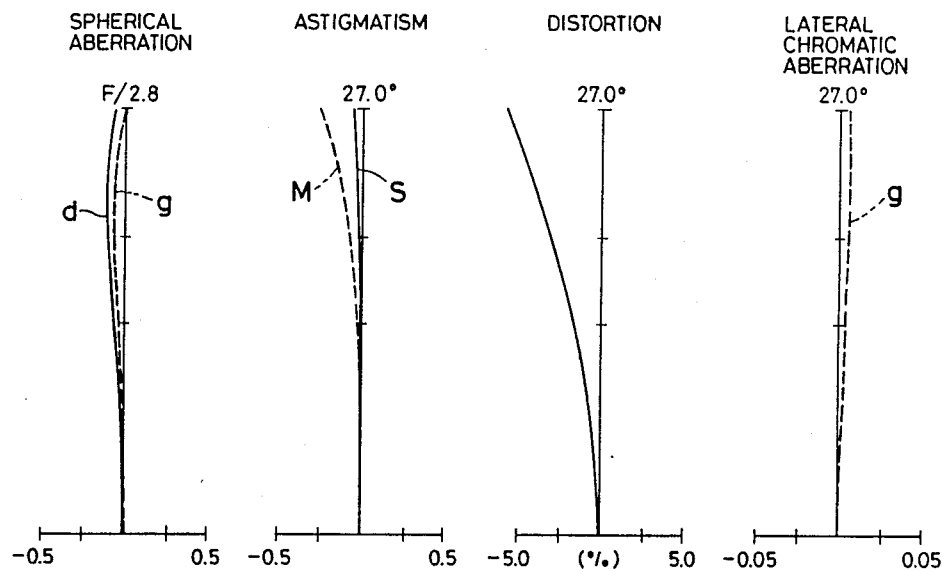
FIGS. 35 through 37 show curves illustrating aberration characteristics of the Embodiment 3.
Figure 36:
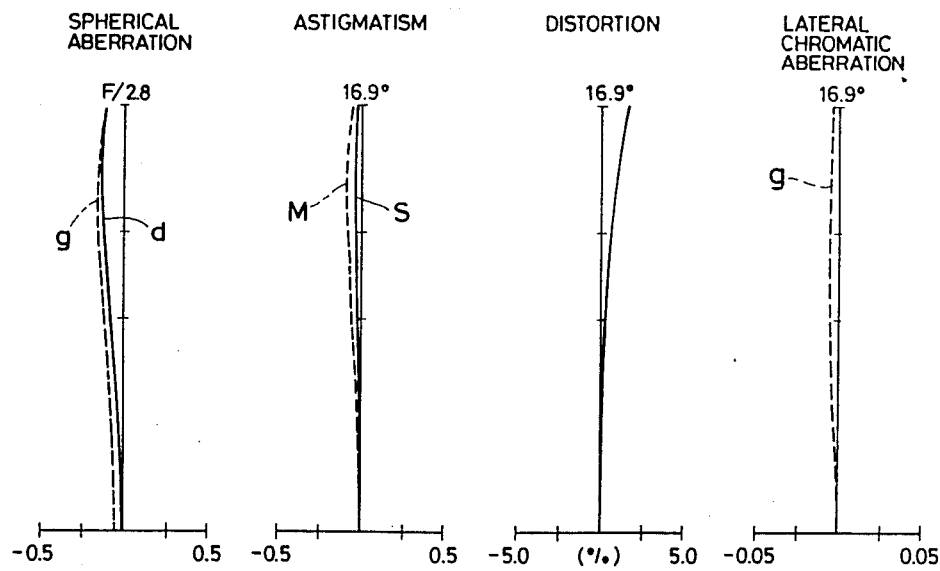
Figure 37:
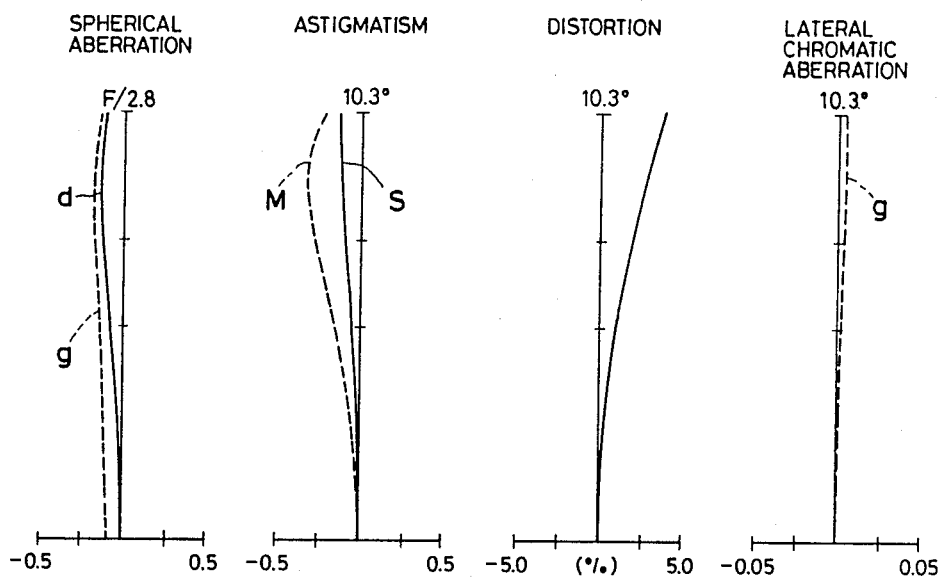
Figure 38:
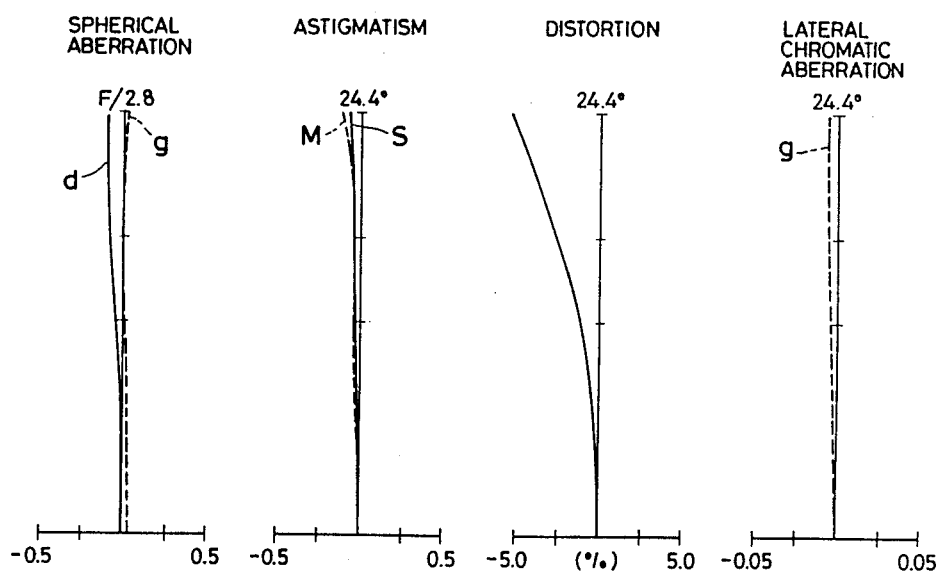
FIGS. 38 through 40 show graphs illustrating aberration characteristics of the Embodiment 4.
Figure 39:
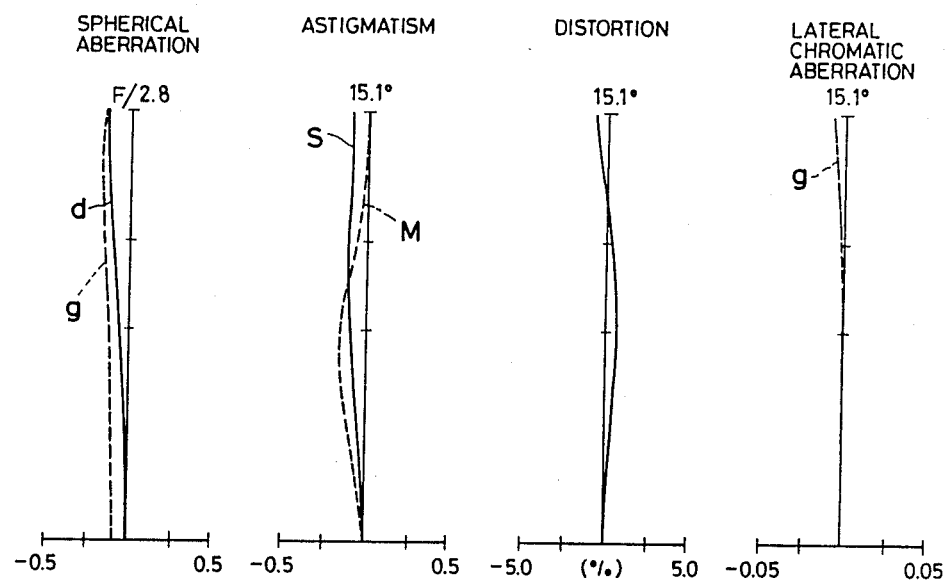
Figure 40:
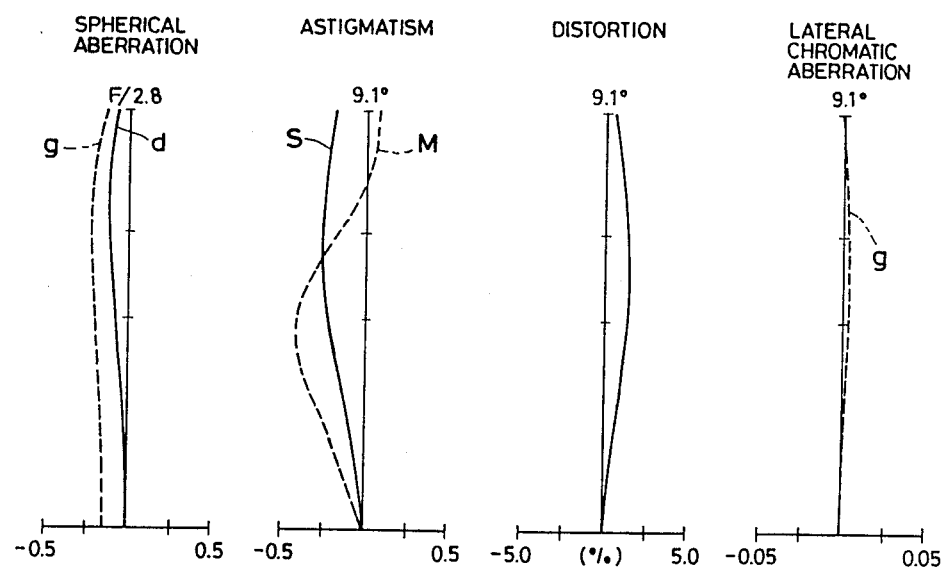
Figure 41:
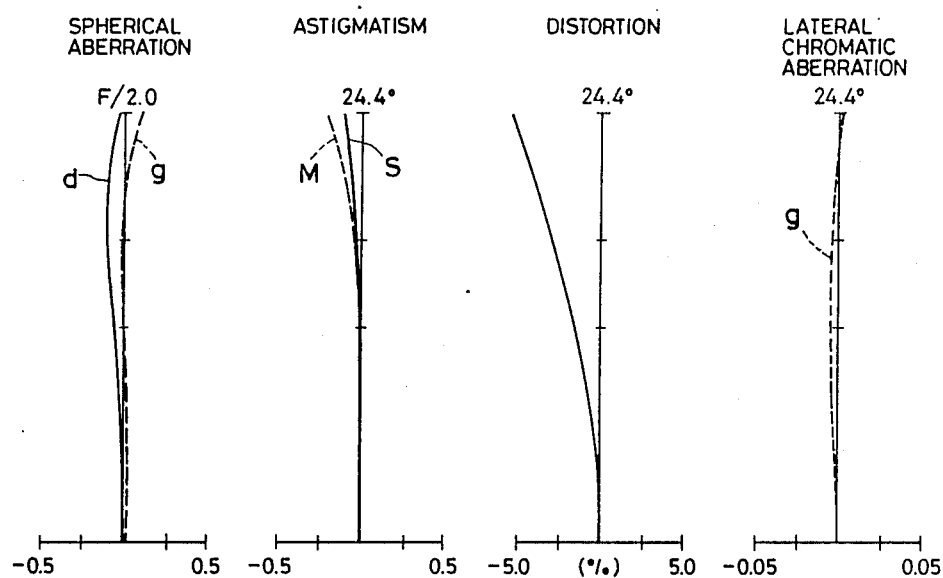
FIGS. 41 through 43 show curves illustrating aberration characteristics of the Embodiment 5.
Figure 42:
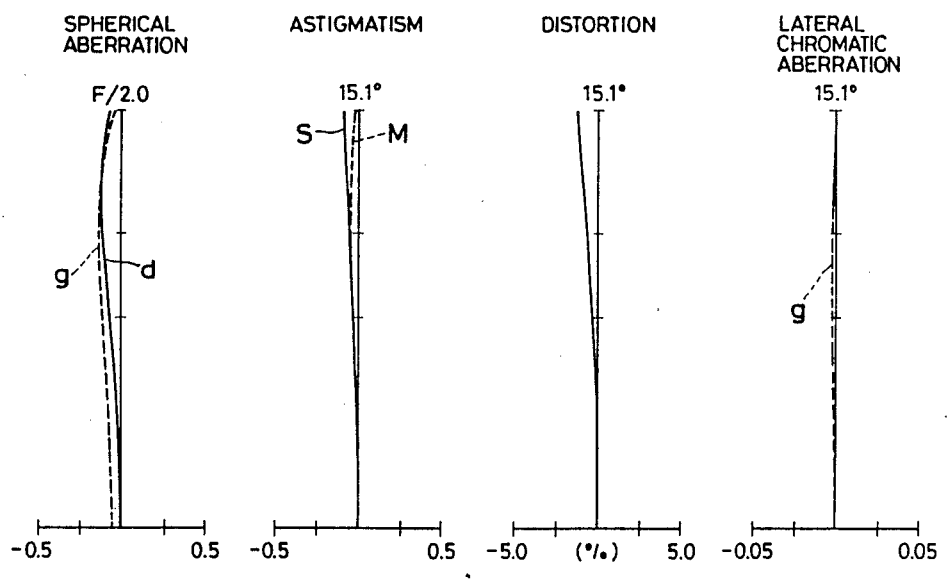
Figure 43:
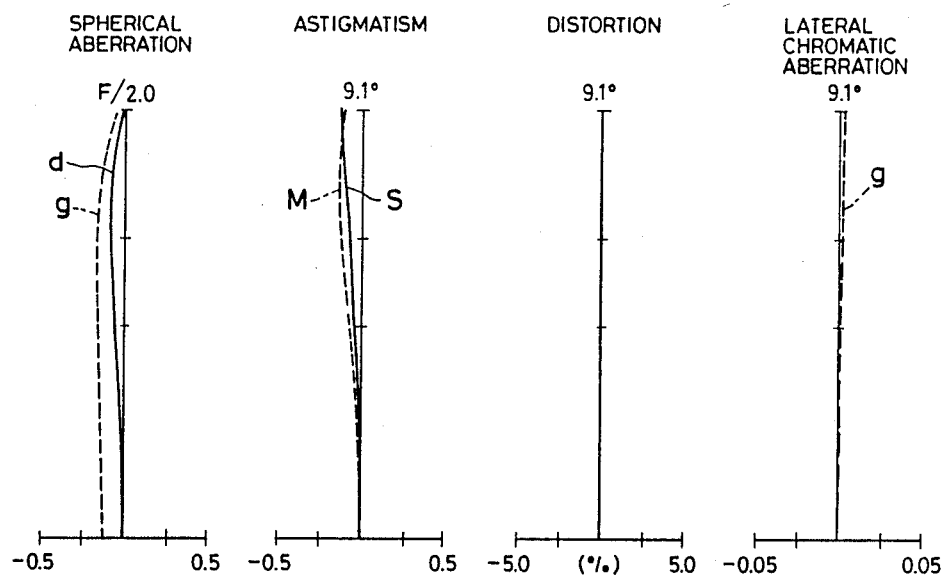
Figure 44:
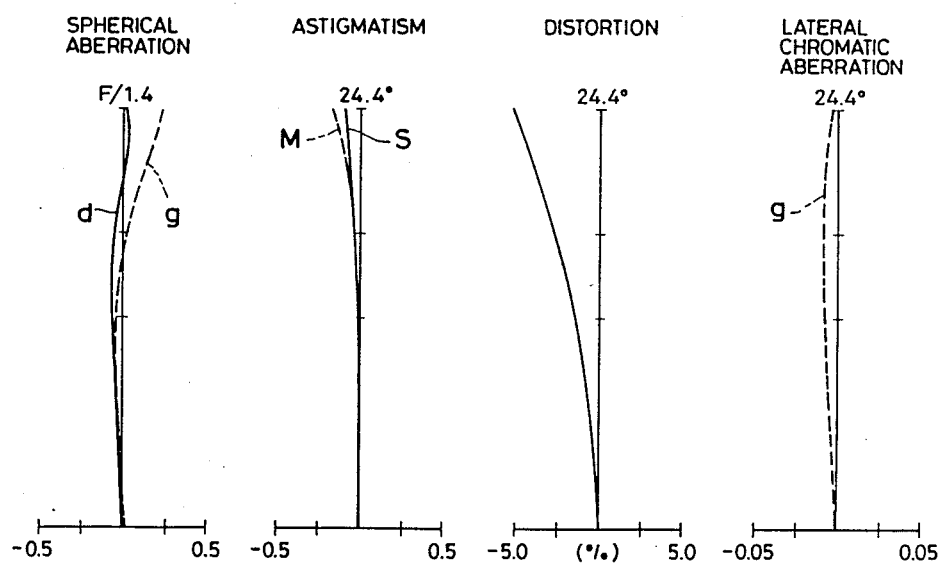
FIGS. 44 through 46 show graphs illustrating aberration characteristics of the Embodiment 6.
Figure 45:
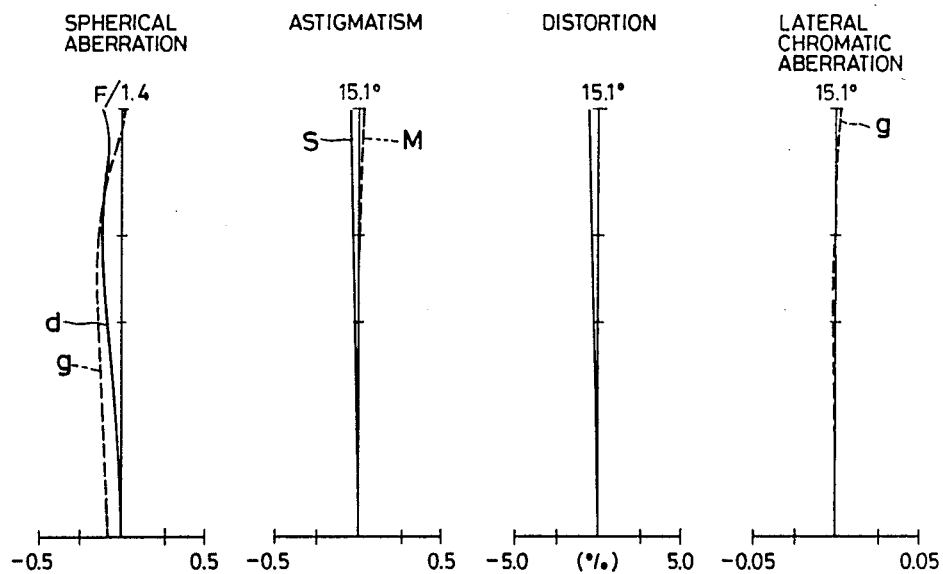
Figure 46:
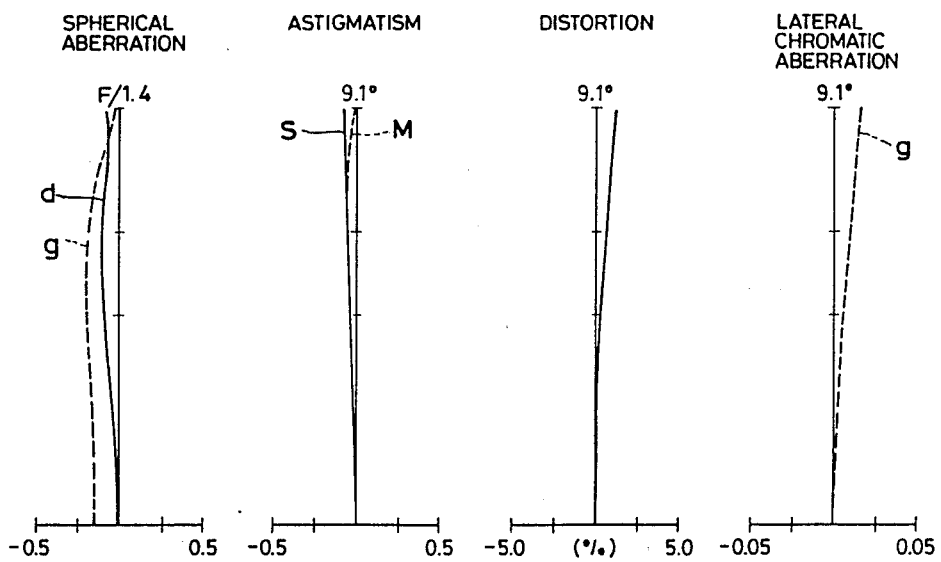

Aberration characteristics of the Embodiment 3 at $f_W$, $f_S$ and $f_T$ are illustrated in FIG. 35, FIG. 36 and FIG. 37 respectively. Aberration characteristics of the Embodiment 4 at $f_W$, $f_S$ and $f_T$ are shown in FIG. 38, FIG. 39 and FIG. 40 respectively, whereas aberration characteristics of the Embodiment 5 at $f_W$, $f_S$ and $f_T$ are illustrated in FIG. 41, FIG. 42 and FIG. 43 respectively, and aberration characteristics of the Embodiment 6 at $f_W$, $f_S$ and $f_T$ are visualized in FIG. 44, FIG. 45 and FIG. 46 respectively.

Figure 7:
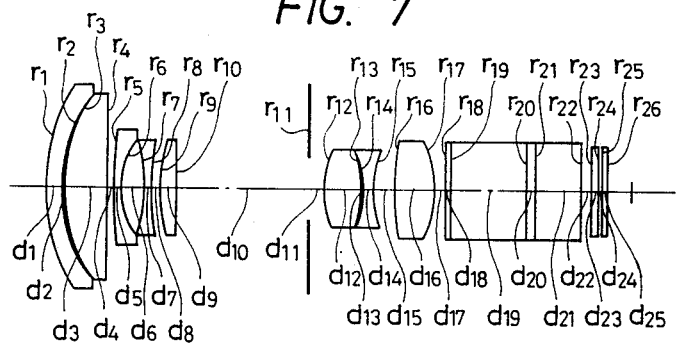
Figure 8:
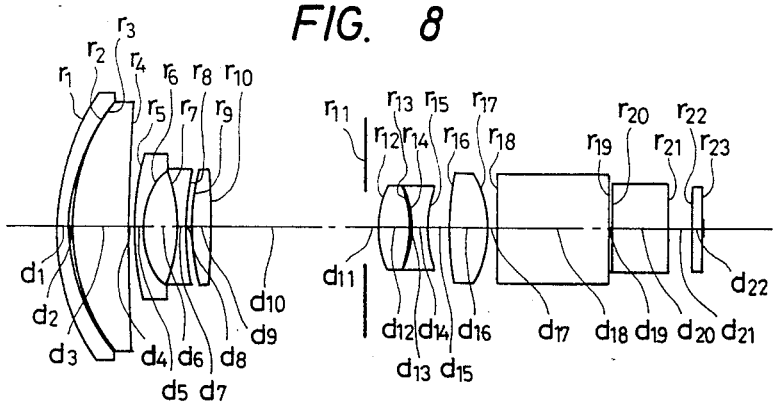
Figure 47:
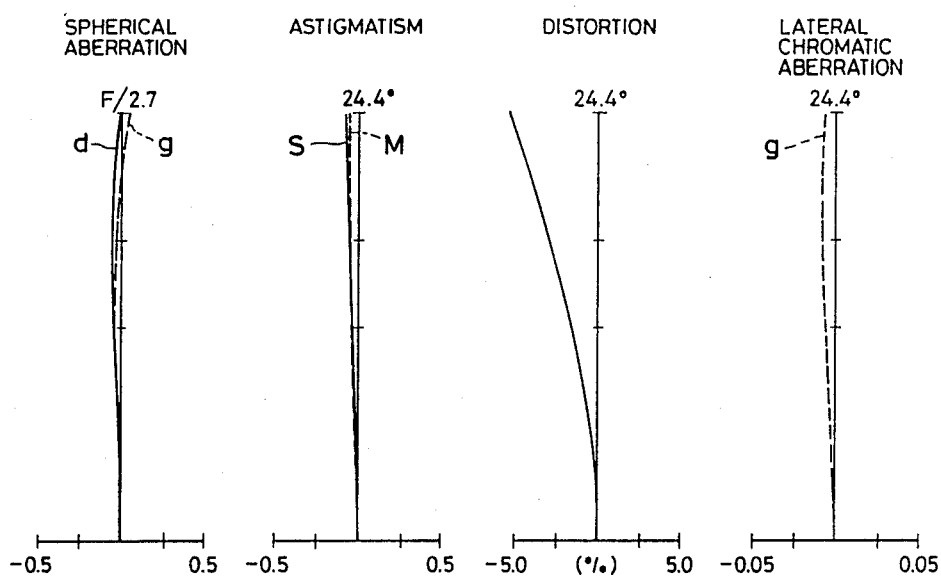
FIGS. 47 through 49 show curves illustrating aberration characteristics of the Embodiment 7.
Figure 48:
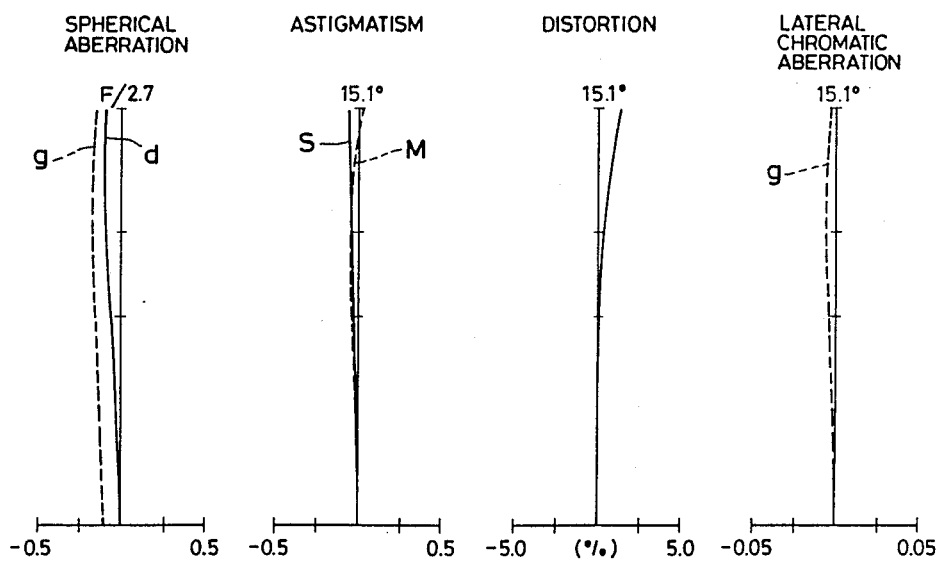
Figure 49:
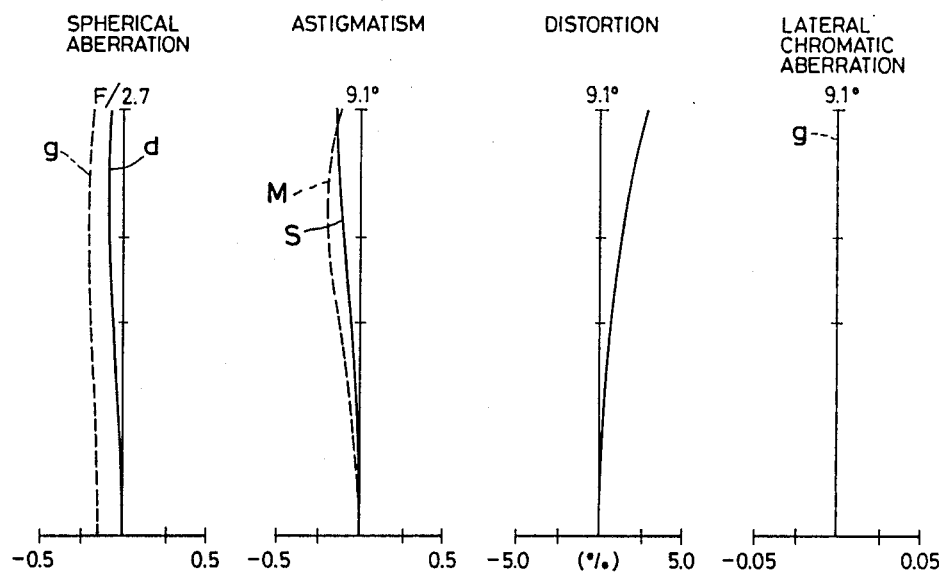
Figure 50:
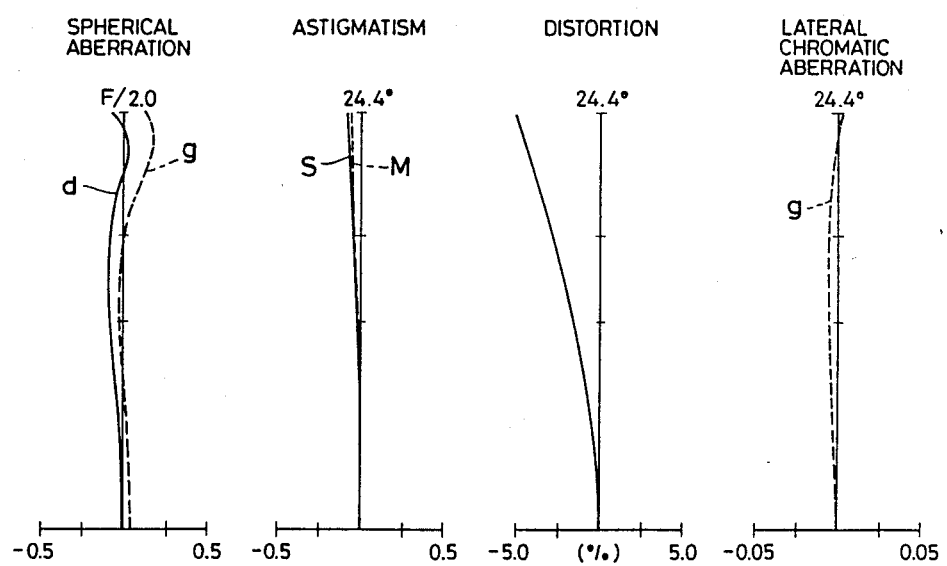
FIGS. 50 through 52 show curves illustrating aberration characteristics of the Embodiment 8.
Figure 51:
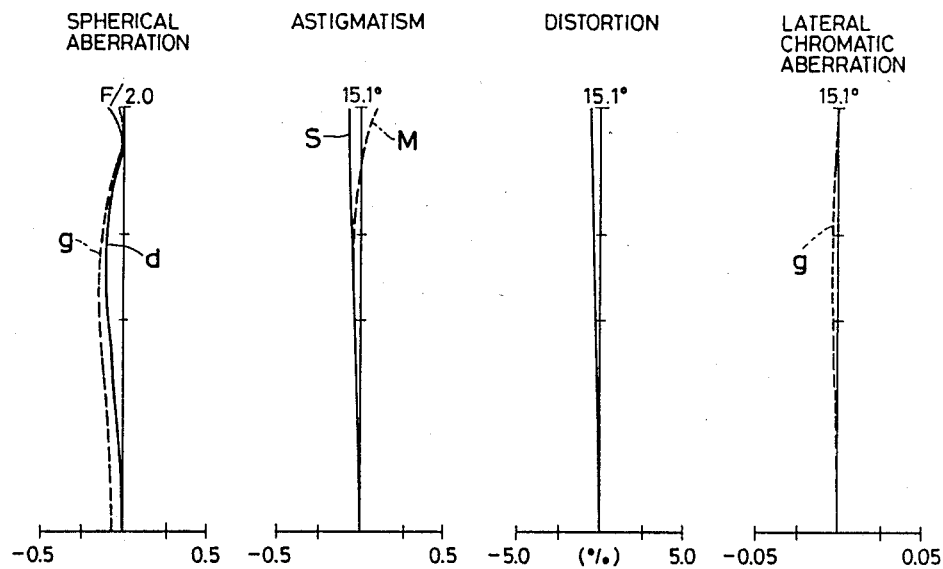
Figure 52:
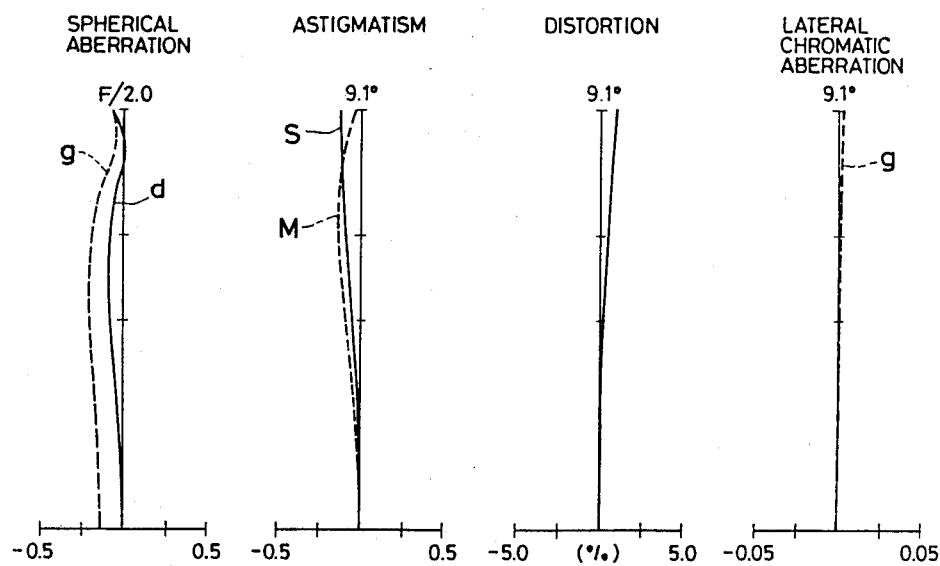

The Embodiments 7 and 8 have the compositions illustrated in FIG. 7 and FIG. 8 respectively wherein the fourth lens unit is designed as a triplet comprising a positive lens element, a negative lens element and a positive lens element, and the zoom lens system as a whole comprises eight lens elements in total. Both of these embodiments adopt aspherical surfaces. Aberration characteristics of the Embodiment 7 at $f_W$, $f_S$ and $f_T$ are illustrated in FIG. 47, FIG. 48 and FIG. 49 respectively, and aberration characteristics of the Embodiment 8 at $f_W$, $f_S$ and $f_T$ are visualized in FIG. 50, FIG. 51 and FIG. 52 respectively.

Figure 9:
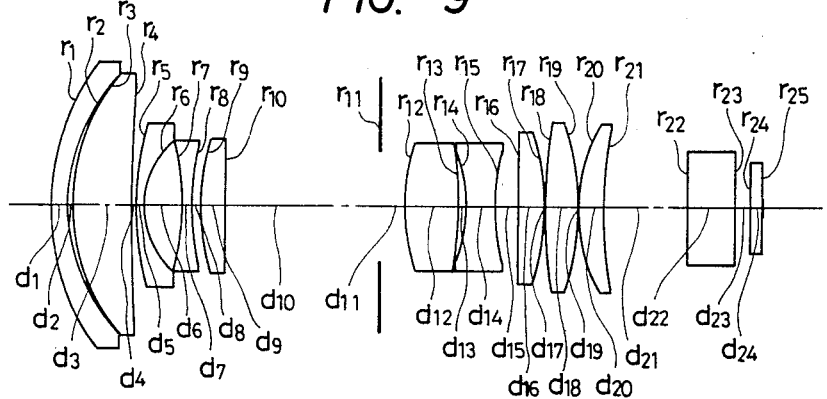

The Embodiment 9 has the composition shown in FIG. 9 wherein the fourth lens unit is designed basically as a triplet, but comprises a positive lens element, a negative lens element, a positive lens element and a positive lens element, and the zoom lens system as a whole comprises 10 lens elements in total.

Figure 53:
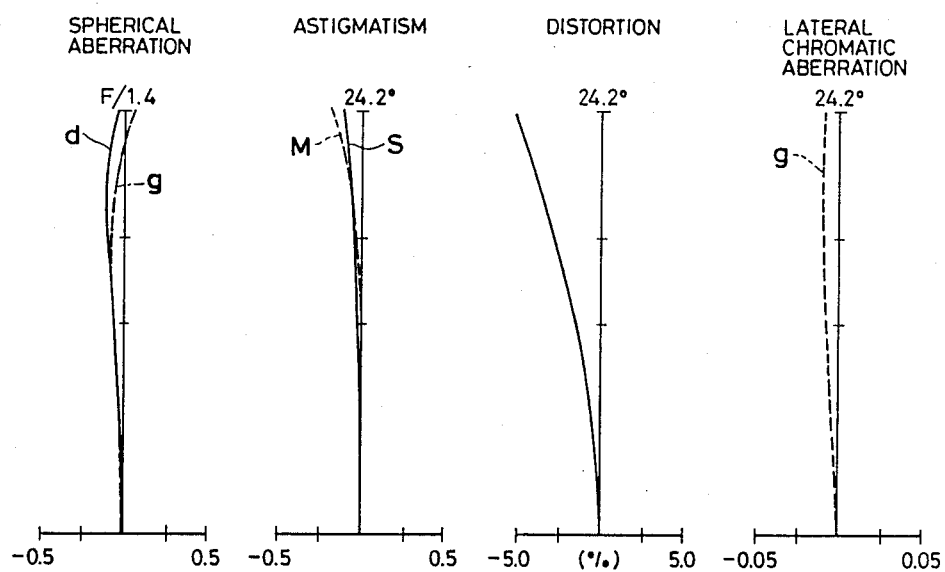
FIGS. 53 through 55 show graphs illustrating aberration characteristics of the Embodiment 9.
Figure 54:
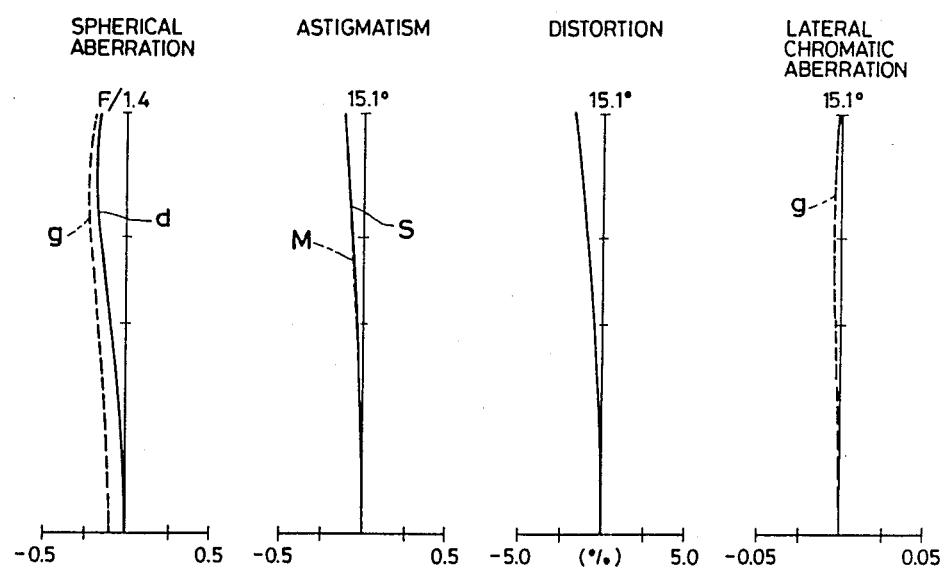
Figure 55:
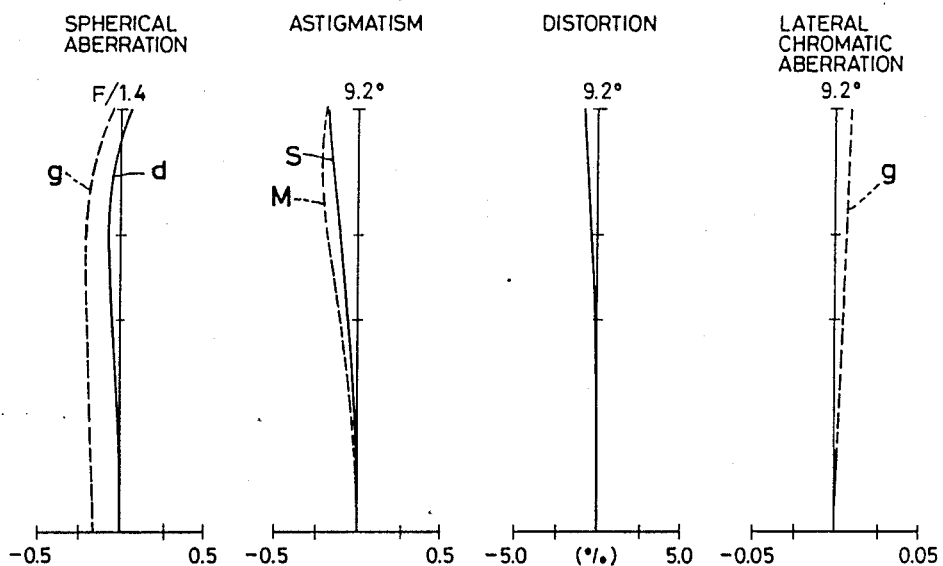
Figure 56:
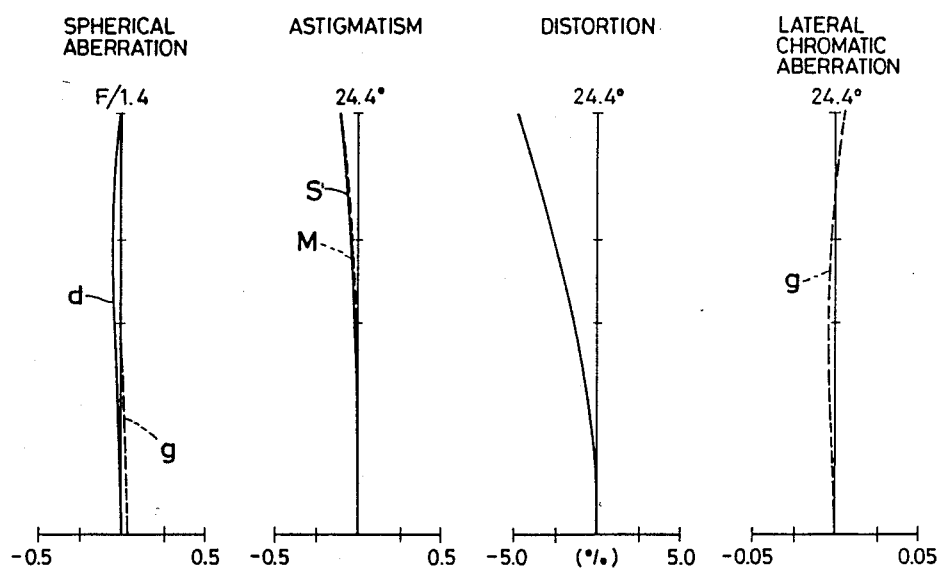
FIGS. 56 through 58 show curves illustrating aberration characteristics of the Embodiment 10.

Aberration characteristics of the Embodiment 9 at $f_W$, $f_S$ and $f_T$ are visualized in FIG. 53, FIG. 54 and FIG. 55 respectively.

Figure 10:
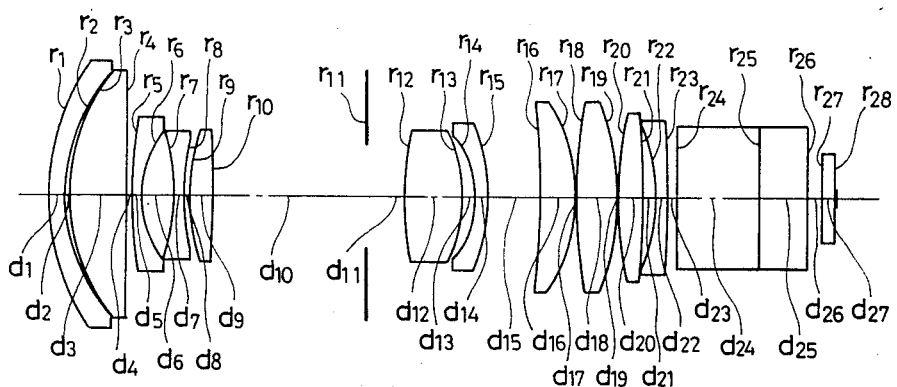

The Embodiment 10 has the composition shown in FIG. 10 wherein the fourth lens unit comprises a positive lens element, a negative lens element, a positive lens element, a positive lens element, a positive lens element and a negative lens element, and the zoom lens system as a whole comprises 11 lens elements in total.

Figure 57:
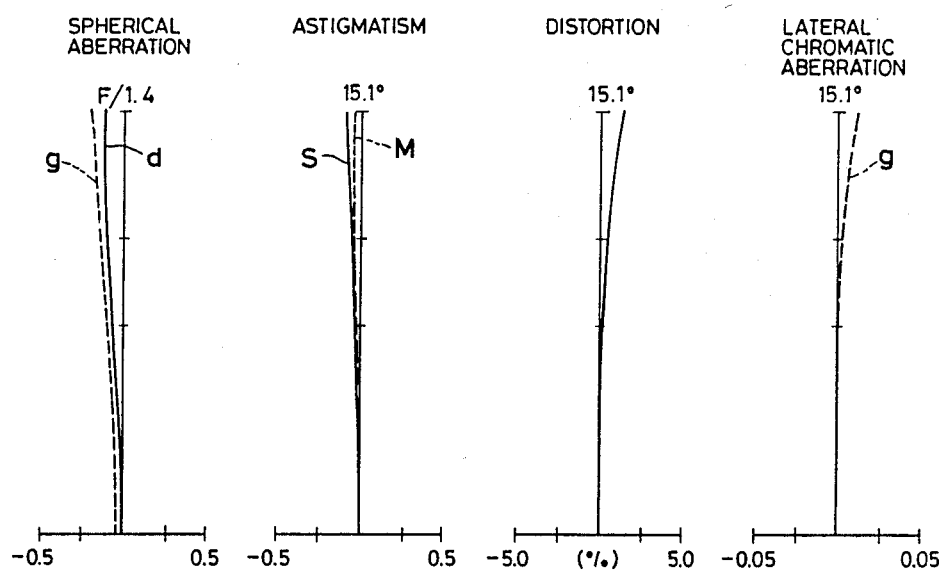
Figure 58:
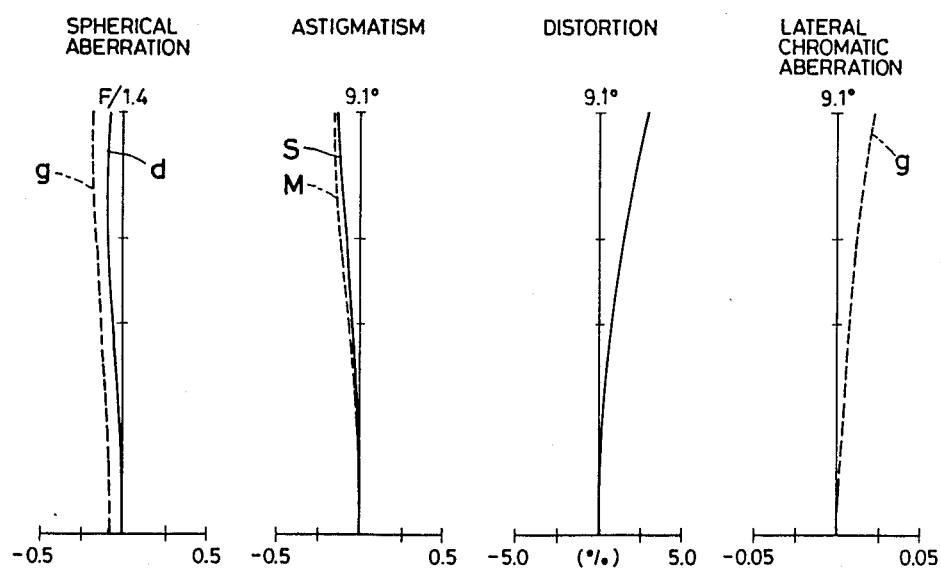
Figure 59:
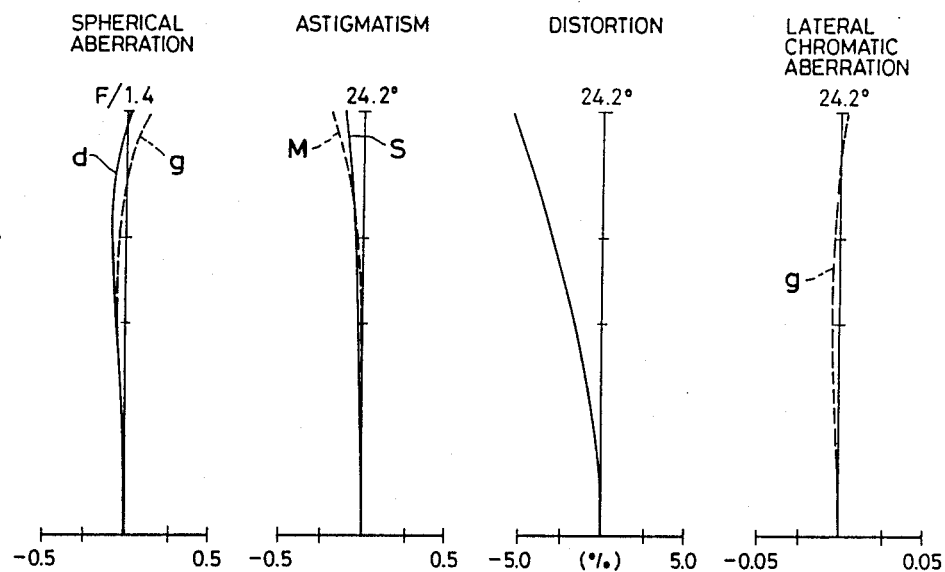
FIGS. 59 through 61 show graphs illustrating aberration characteristics of the Embodiment 11.

Aberration characteristics of the Embodiment 10 at $f_W$, $f_S$ and $f_T$ are shown in FIG. 57, FIG. 58 and FIG. 59 respectively.

Figure 11:
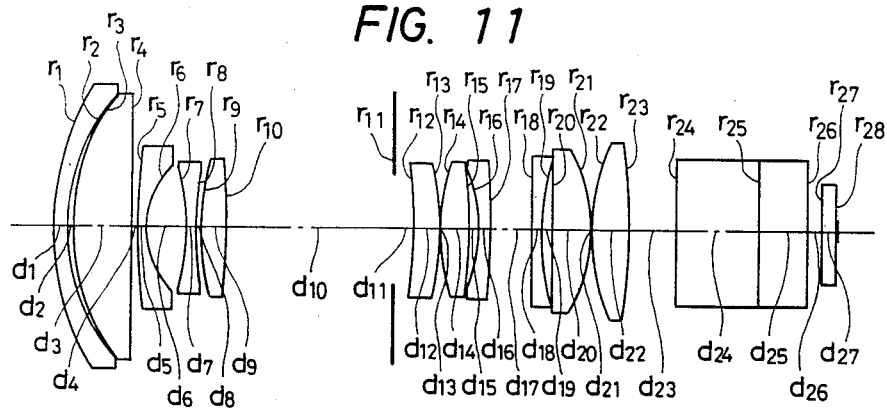

The Embodiment 11 has the composition shown in FIG. 11 wherein the fourth lens unit comprises a positive lens element, a positive lens element, a negative lens element, a negative lens element, a positive lens element and a positive lens element, and the zoom lens system as a whole comprises 11 lens elements in total.

Figure 60:
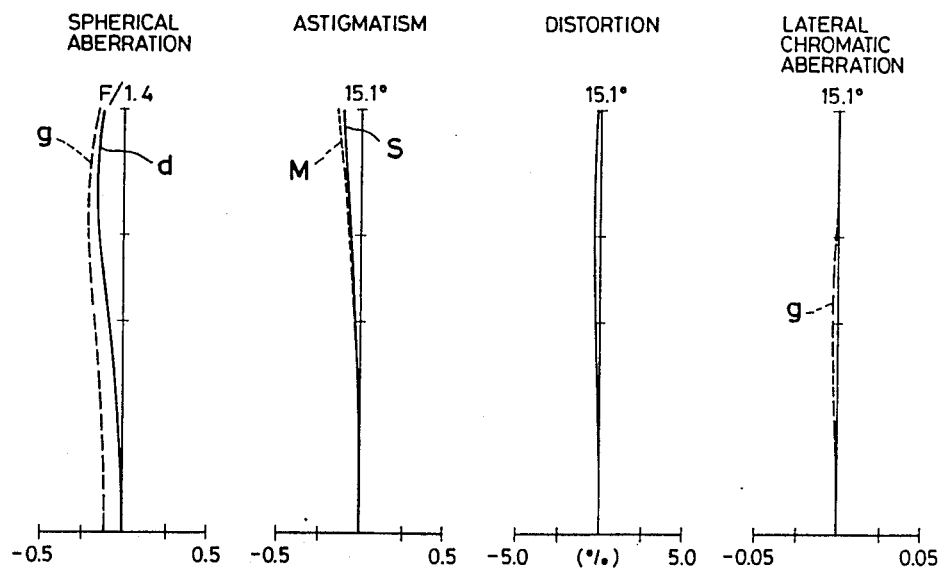
Figure 61:
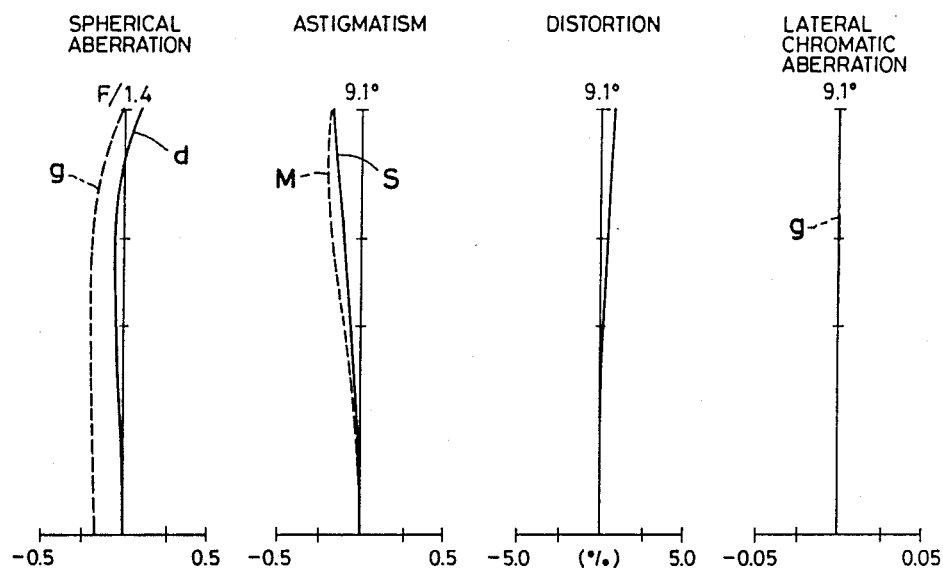

Aberration characteristics of the Embodiment 11 at $f_W$, $f_S$ and $f_T$ are illustrated in FIG. 59, FIG. 60 and FIG. 61 respetively.

Figure 12:
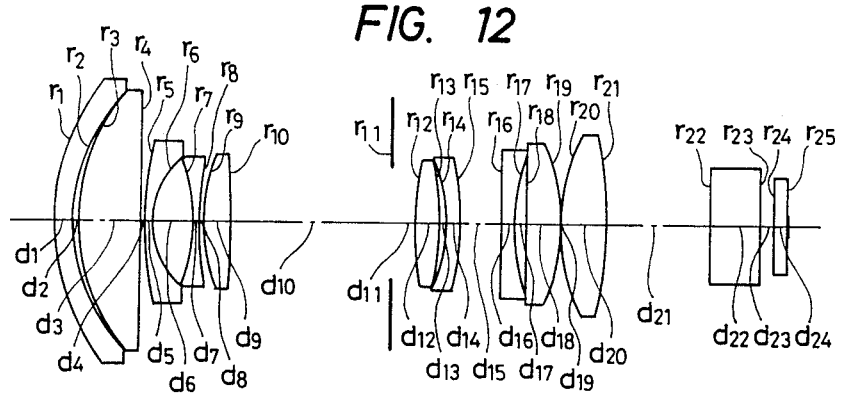

The Embodiment 12 has the composition shown in FIG. 12 wherein the fourth lens unit comprises a positive lens element, a negative lens element, a negative lens element, a positive lens element and a positive lens element, the zoom lens system as a whole comprises 10 lens elements in total.

Figure 62:
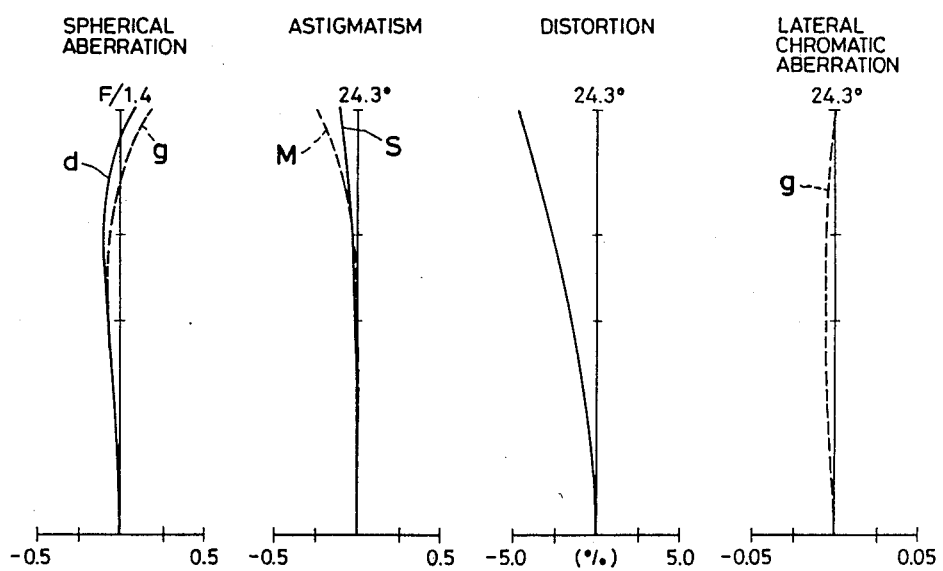
FIGS. 62 through 64 show curves illustrating aberration characteristics of the Embodiment 12.
Figure 63:
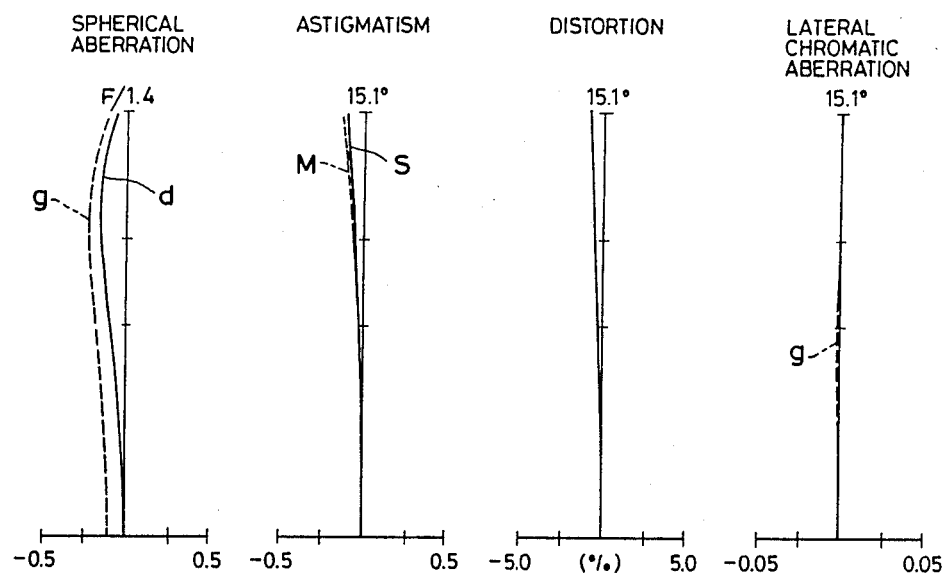
Figure 64:
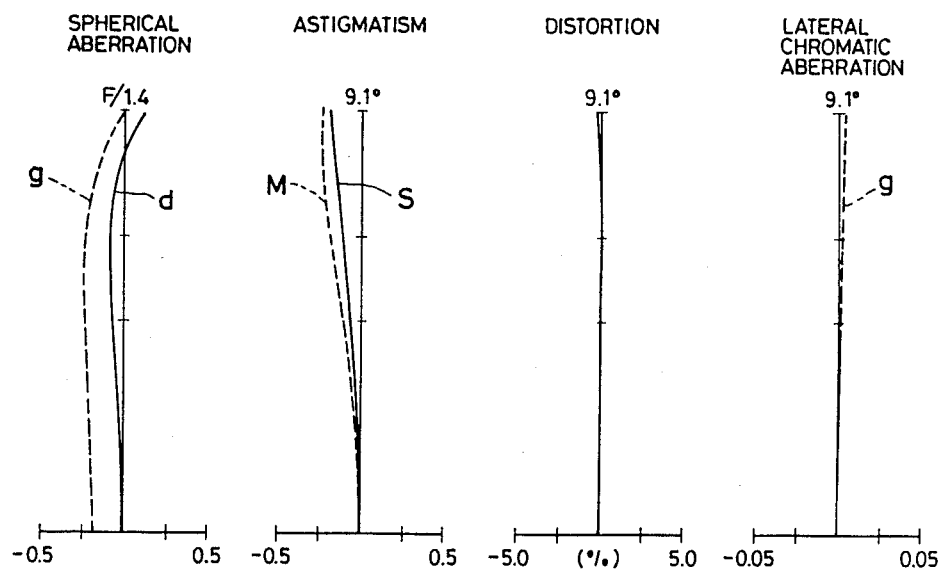

Aberration characteristics of the Embodiment 12 at $f_W$, $f_S$ and $f_T$ are shown in FIG. 62, FIG. 63 and FIG. 64 respectively.

Figure 13:
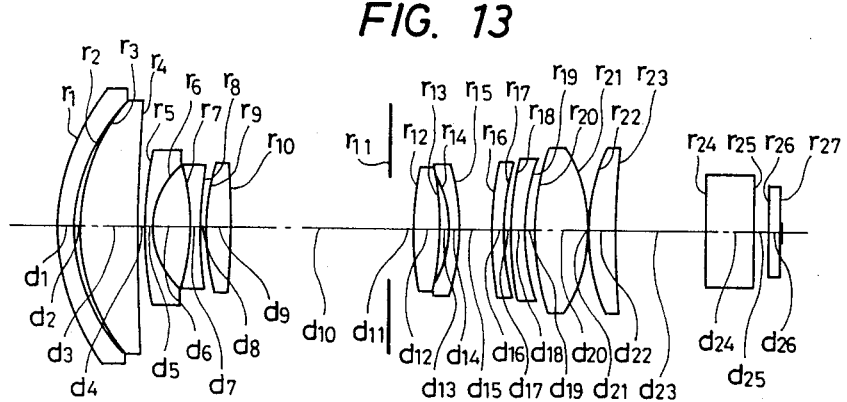

The Embodiment 13 has the composition illustrated in FIG. 13 wherein the fourth lens unit comprises a positive lens element, a negative lens element, a negative lens element, a negative lens element, a positive lens element and a positive lens element, and the zoom lens system comprises 11 lens elements in total.

Figure 65:
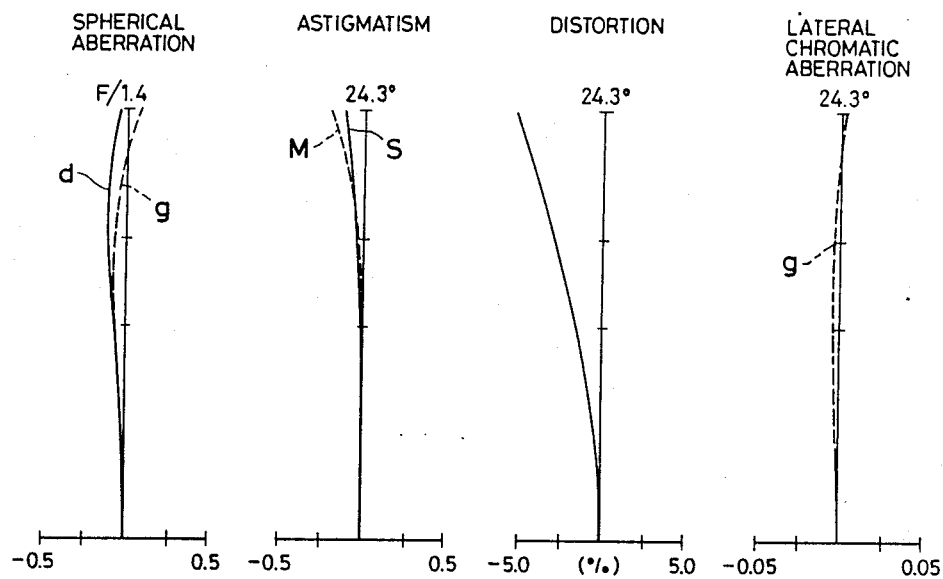
FIGS. 65 through 67 show curves illustrating aberration characteristics of the Embodiment 13.
Figure 66:
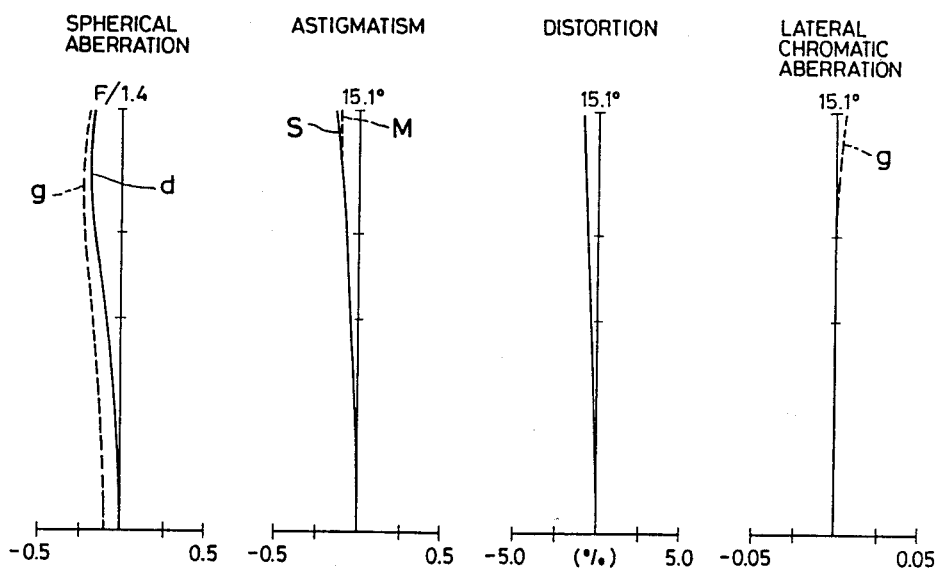
Figure 67:
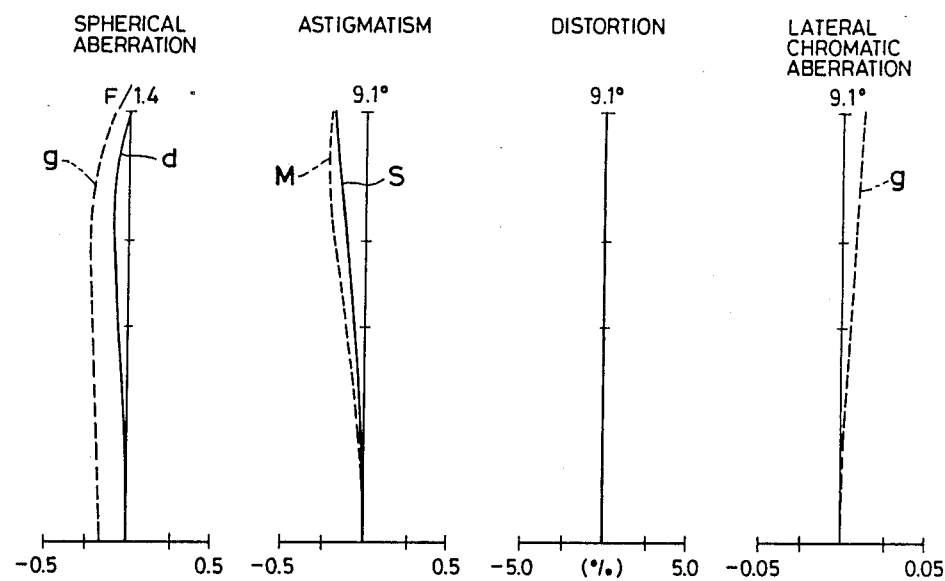

Aberration characteristics of the Embodiment 13 at $f_W$, $f_S$ and $f_T$ are visualized in FIG. 65, FIG. 66 and FIG. 67 respectively.

Figure 14:
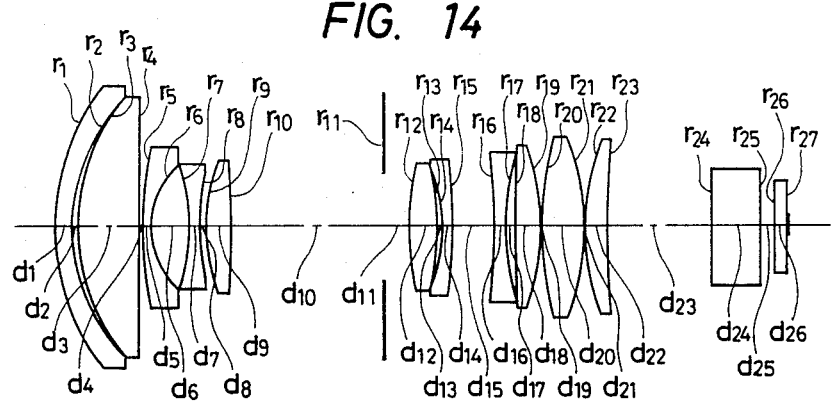

The Embodiment 14 has the composition illustrated in FIG. 14 wherein the fourth lens unit comprises a positive lens element, a negative lens element, a negative lens element, a positive lens element, a positive lens element and a positive lens element, and the zoom lens system as a whole comprises 11 lens elements.

Figure 68:
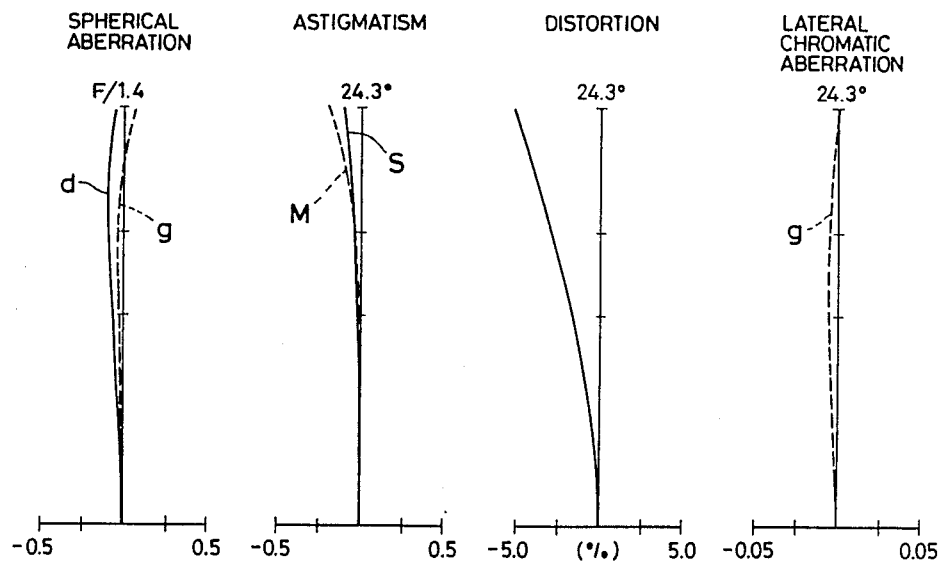
FIGS. 68 through 70 show graphs illustrating aberration characteristics of the Embodiment 14.
Figure 69:
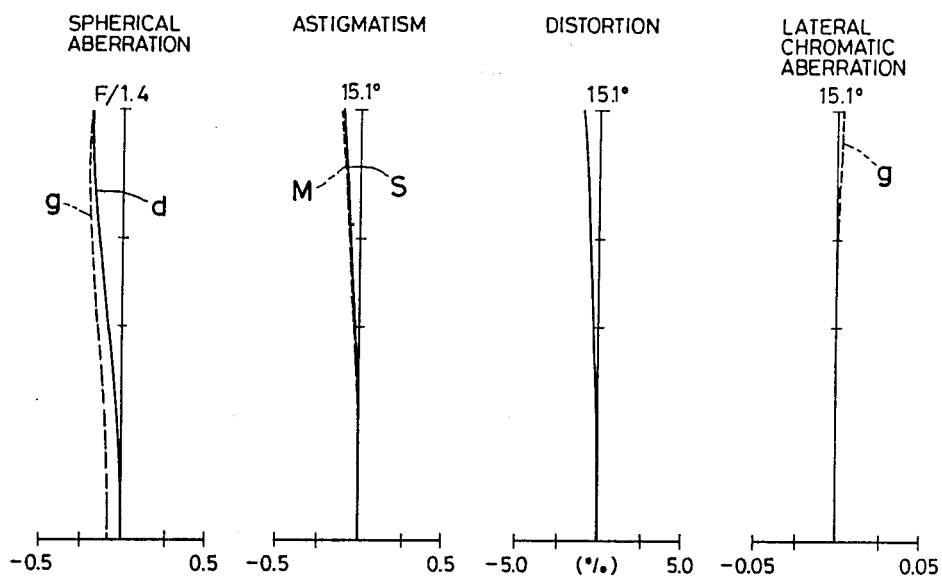
Figure 70:
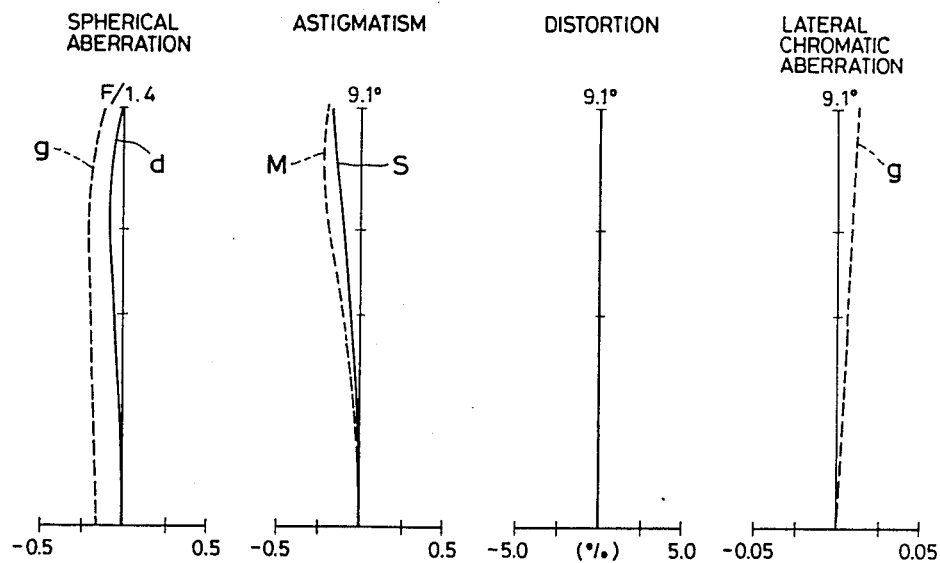

Aberration characteristics of the Embodiment 14 at $f_W$, $f_S$ and $f_T$ are illustrated in FIG. 68, FIG. 69 and FIG. 70 respectively.

Figure 15:
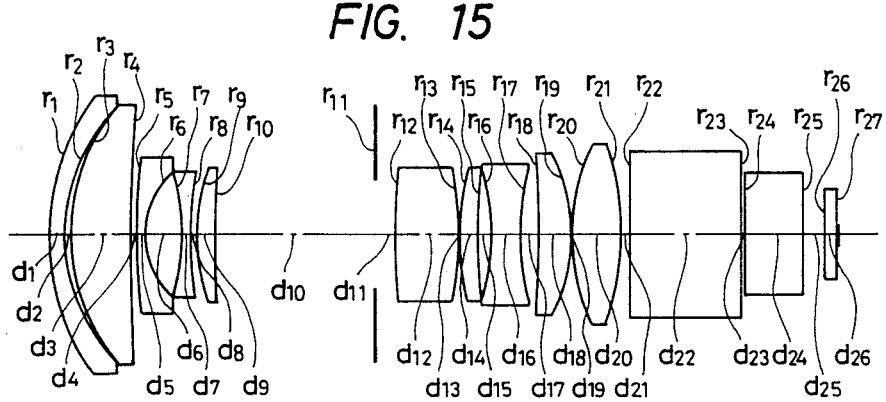

The Embodiment 15 has the composition shown in FIG. 15 wherein the fourth lens unit comprises a positive lens element, a positive lens element, a negative lens element, a positive lens element and a positive lens element, and the zoom lens system as a whole comprises 10 lens elements in total.

Figure 71:
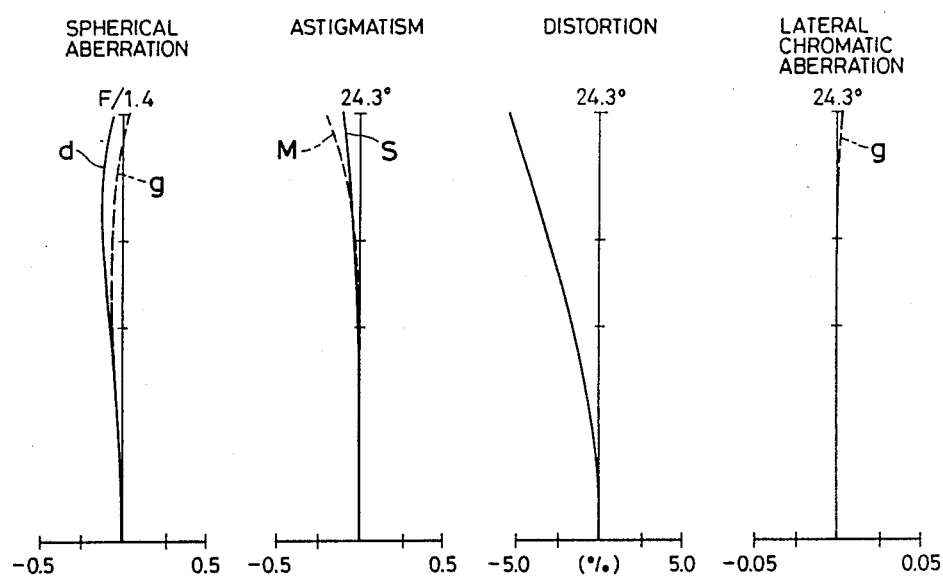
FIGS. 71 through 73 show curves illustrating aberration characteristics of the Embodiment 15.
Figure 72:
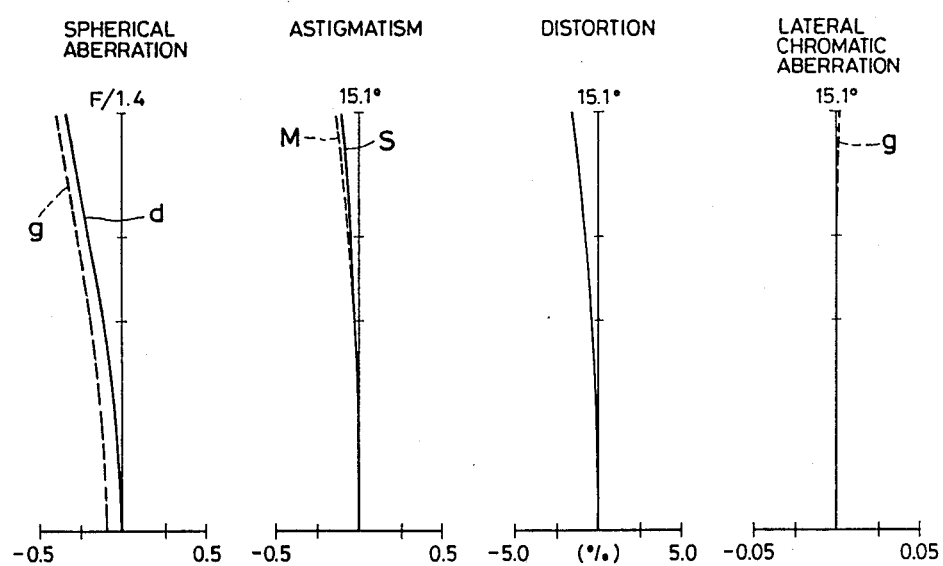
Figure 73:
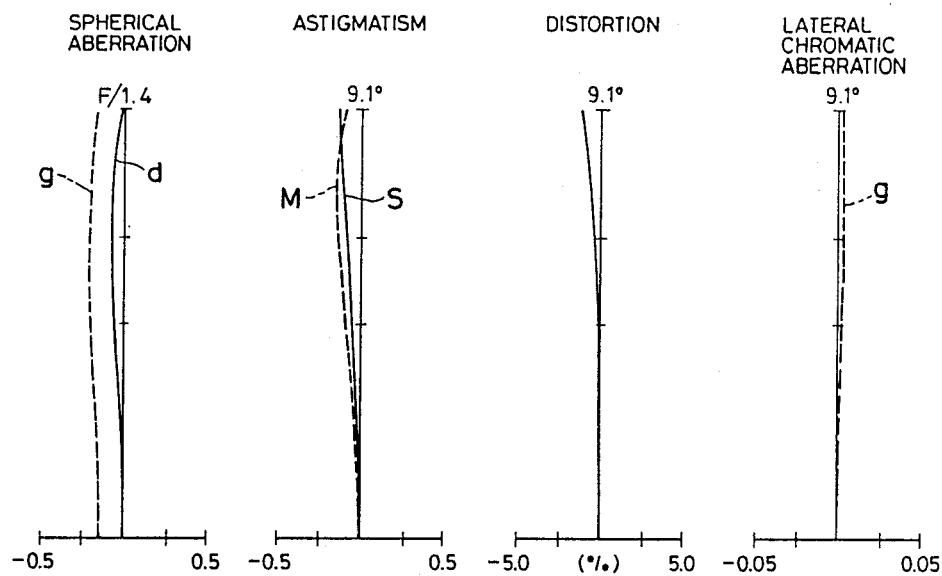

Aberration characteristics of the Embodiment 14 at $f_W$, $f_S$ and $f_T$ are shown in FIG. 71, FIG. 72 and FIG. 73 respectively.

Any of the Embodiments 3 through 20 is so designed as to satisfy the conditions (3), (4) and (5). In addition, the fourth lens unit is designed basically as a triplet in any of the Embodiments 3 through 20. The Embodiment 16 has the composition shown in FIG. 16 wherein the first lens unit comprises only a single lens element designed as a graded refractive index type of lens element (GRIN lens), and the zoom lens system as a whole comprises a smaller number of lens elements, concretely eight lens element.

Figure 74:
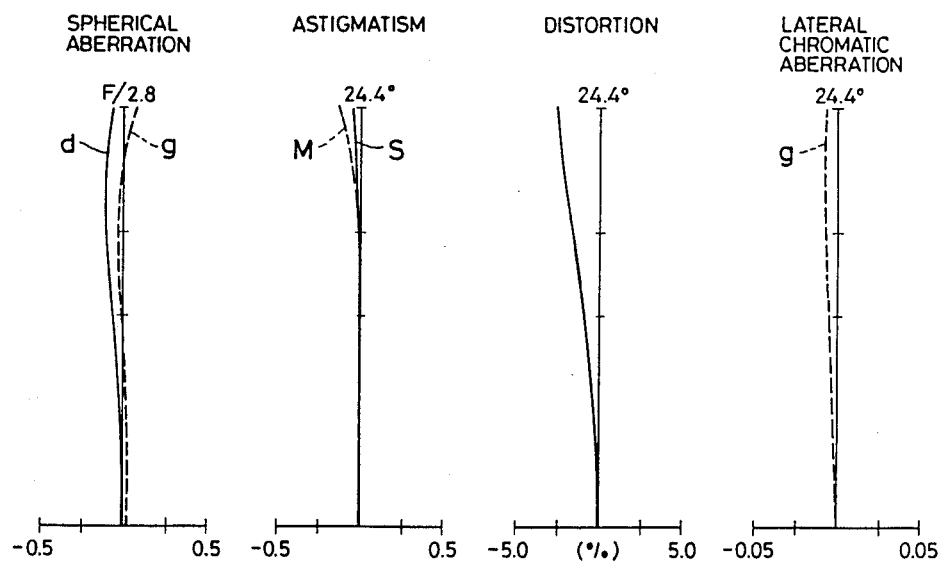
FIGS. 74 through 76 show curves illustrating aberration characteristics of the Embodiment 16.
Figure 75:
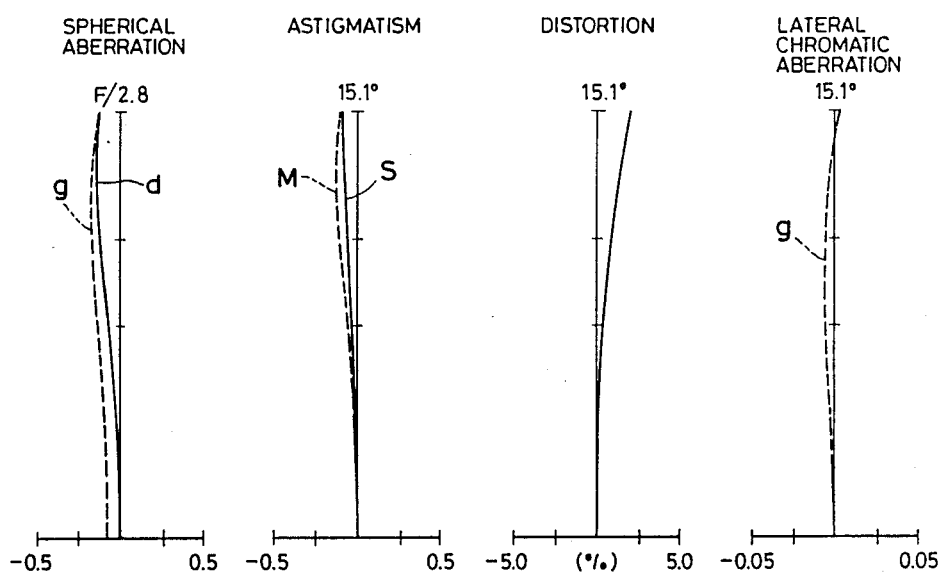
Figure 76:
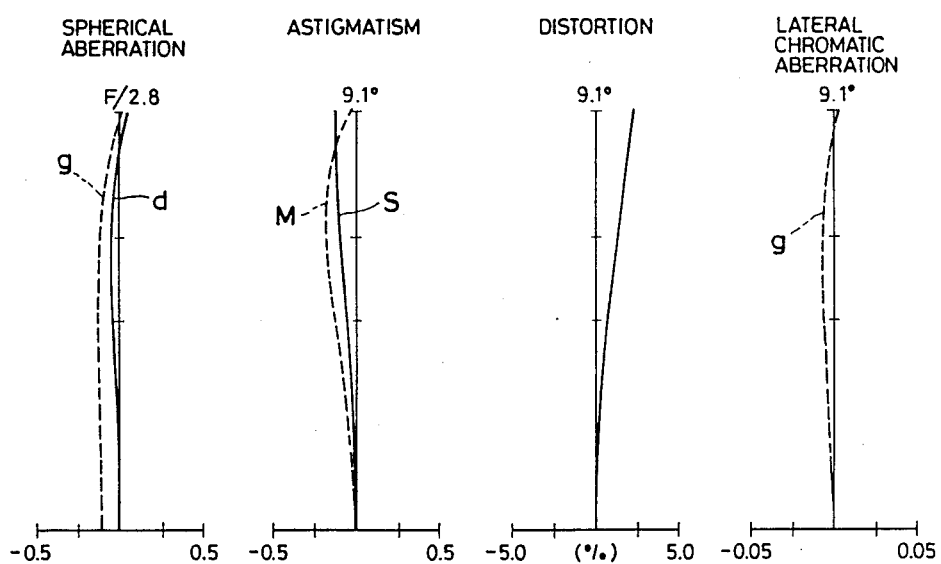

Aberration characteristics of the Embodiment 16 at $f_W$, $f_S$ and $f_T$ are illustrated in FIG. 74, FIG. 75 and FIG. 76 respectively.

The Embodiment 17 has the composition shown in FIG. 17 wherein a GRIN lens is adopted in the fourth lens unit to compose it of two lens elements, and the zoom lens system as a whole comprises 7 lens elements in total.

Figure 77:
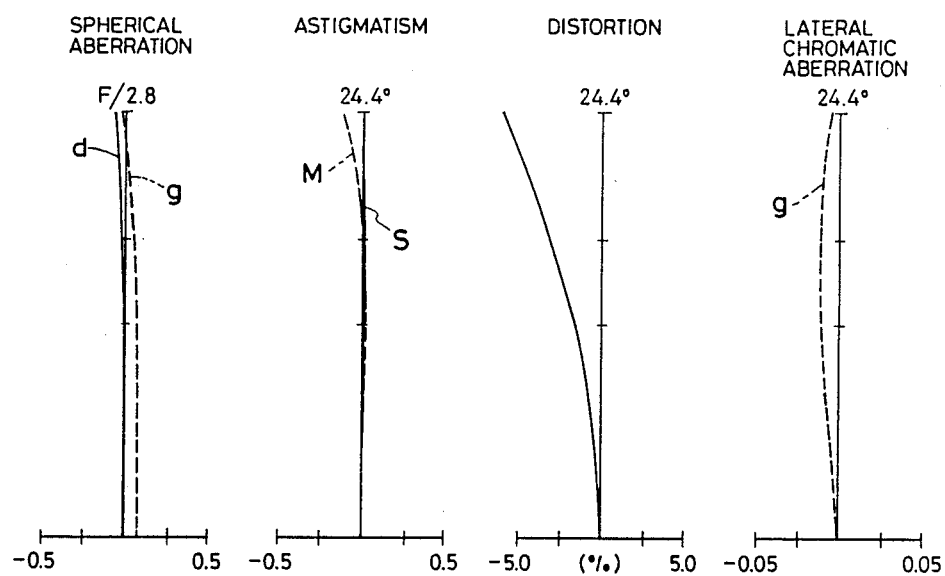
FIGS. 77 through 79 show curves illustrating aberration characteristics of the Embodiment 17.
Figure 78:
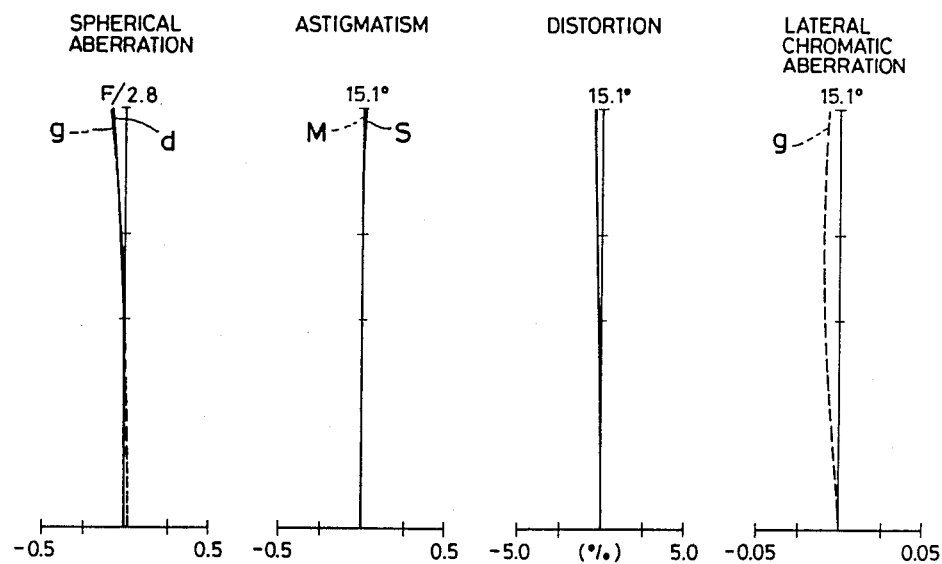
Figure 79:
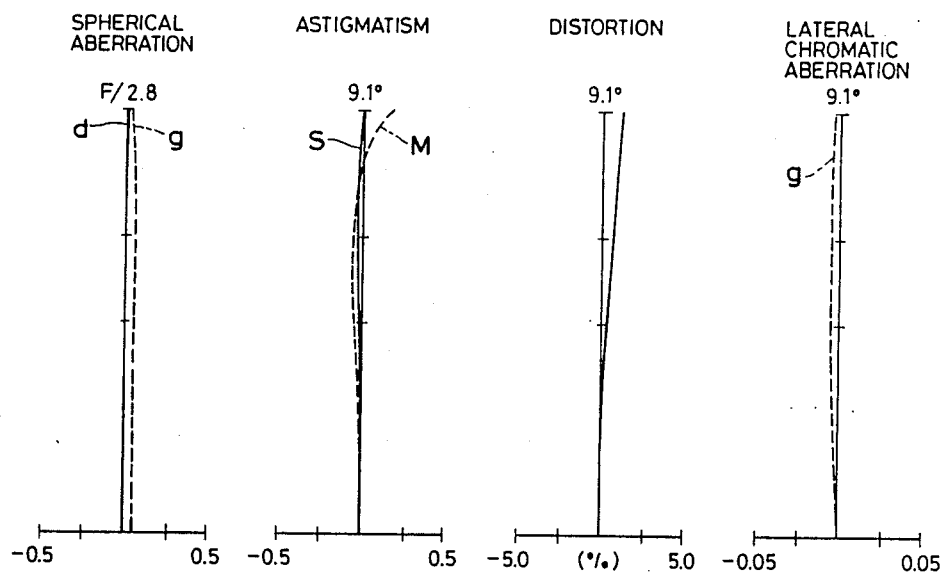

Aberration characteristics of the Embodiment 17 at $f_W$, $f_S$ and $f_T$ are visualized in FIG. 77, FIG. 78 and FIG. 79 respectively.

The Embodiments 18 and 19 have the compositions illustrated in FIG. 18 and FIG. 19 respectively wherein GRIN lenses are used in the first and fourth lens units, and the zoom lens system as a whole comprises 7 lens elements in total.

Figure 80:
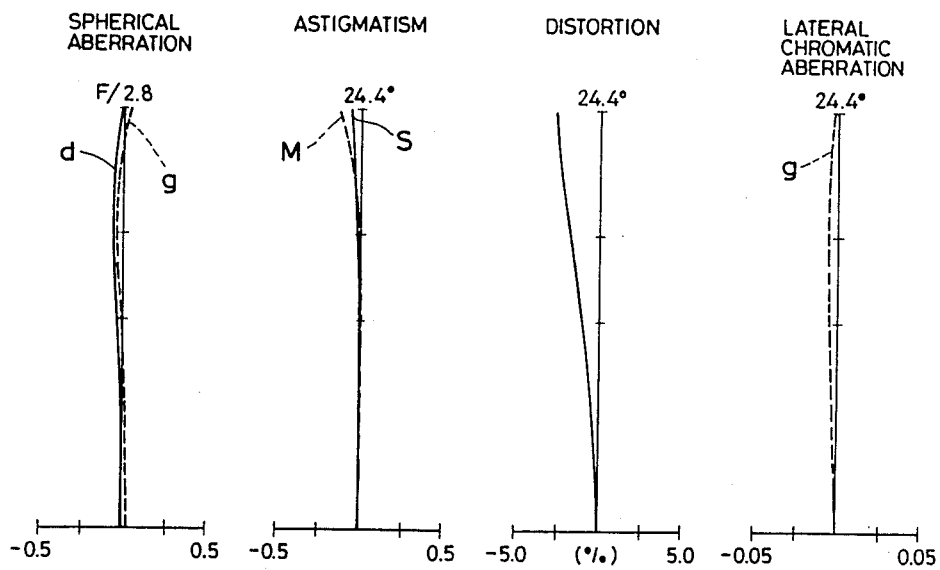
FIGS. 80 through 82 show curves illustrating aberration characteristics of the Embodiment 18.
Figure 81:
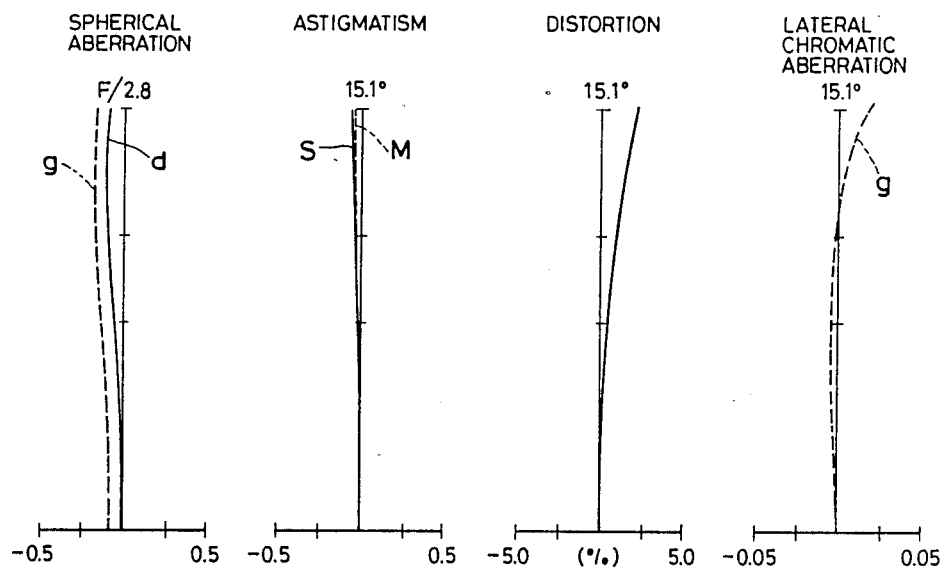
Figure 82:
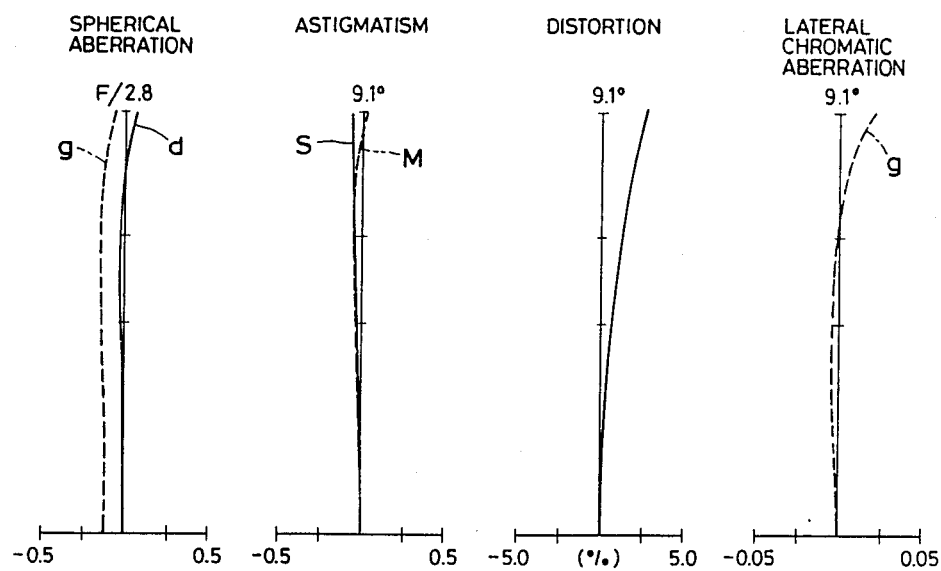
Figure 83:
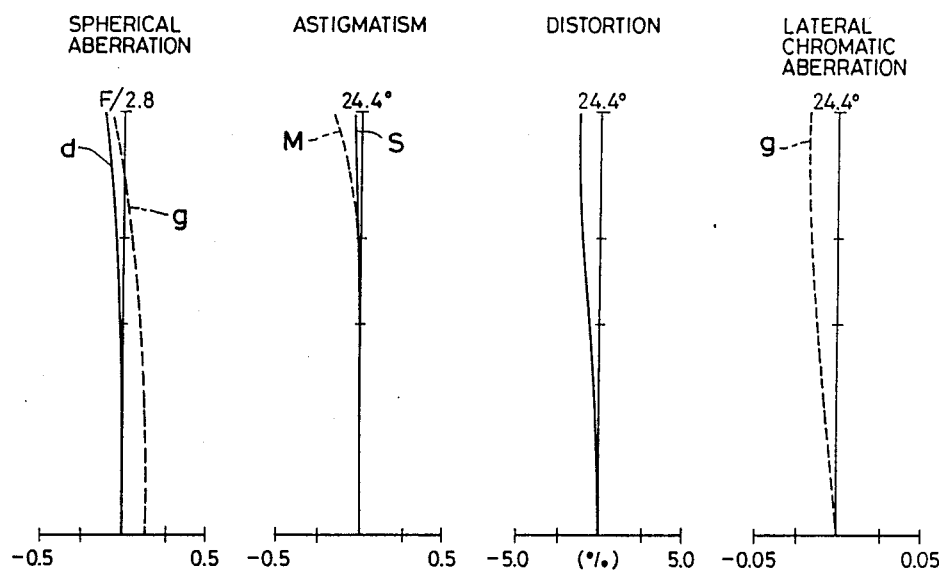
FIGS. 83 through 85 show graphs illustrating aberration characteristics of the Embodiment 19.
Figure 84:
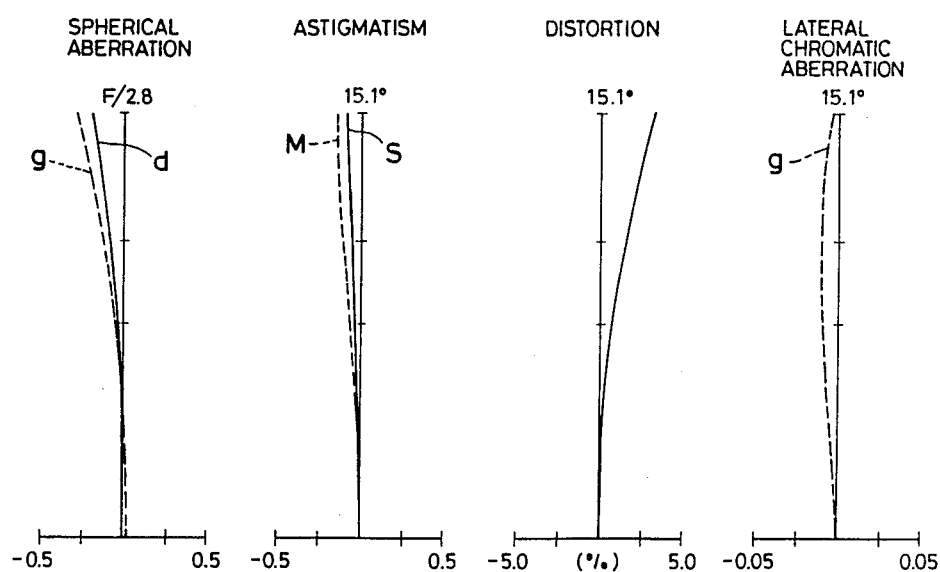
Figure 85:
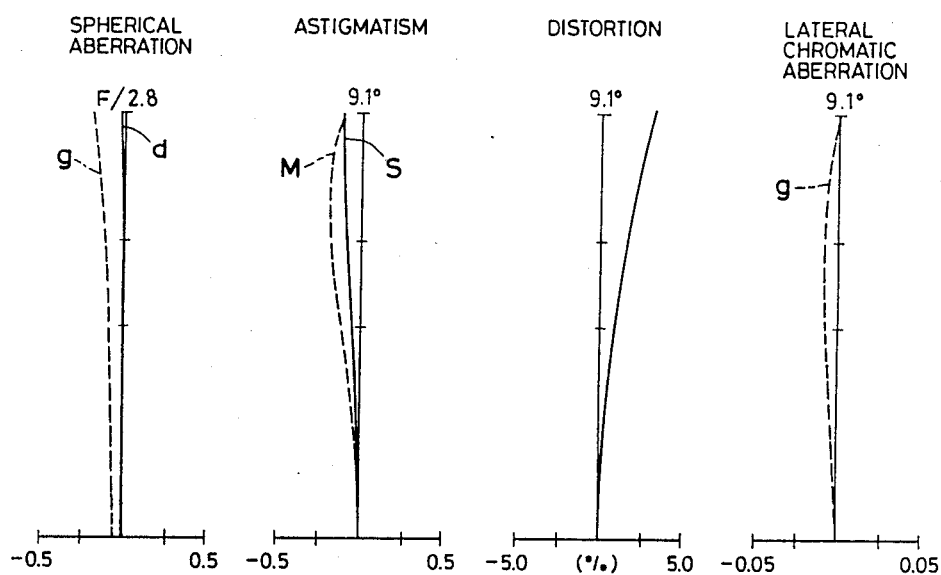

Aberration characteristics of the Embodiment 18 at $f_W$, $f_S$ and $f_T$ are shown in FIG. 80, FIG. 81 and FIG. 82 respectively, whereas aberration characteristics of the Embodiment 19 are illustrated in FIG. 83, FIG. 84 and FIG. 85.

Figure 20:
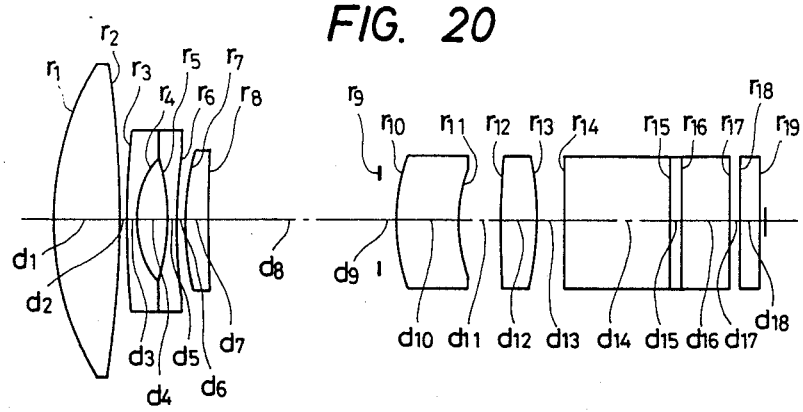

The Embodiment 20 has the composition illustrated in FIG. 20 wherein GRIN lenses are used in the first and fourth lens units, and the zoom lens system as a whole comprises 6 lens elements in total.

Figure 86:
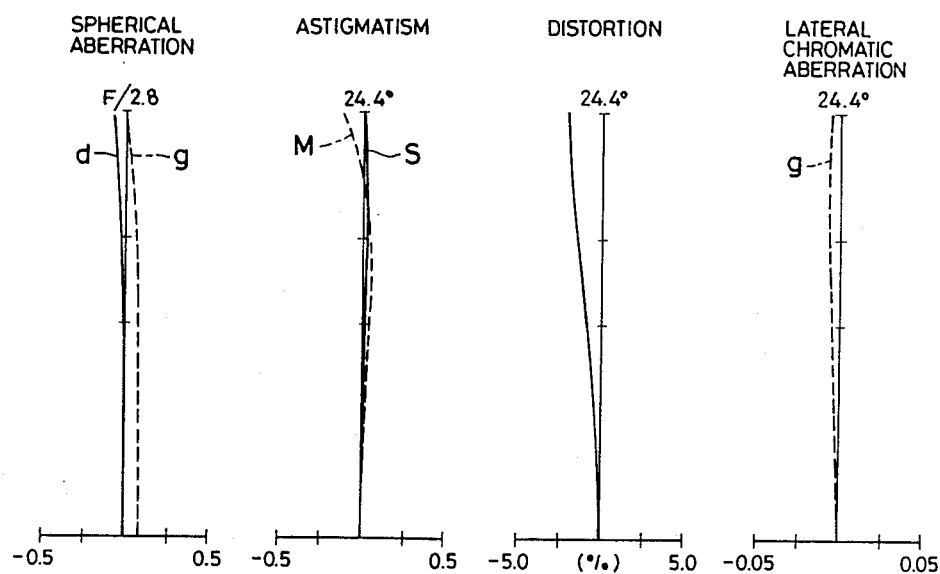
FIGS. 86 through 88 show graphs illustrating aberration characteristics of the Embodiment 20.
Figure 87:
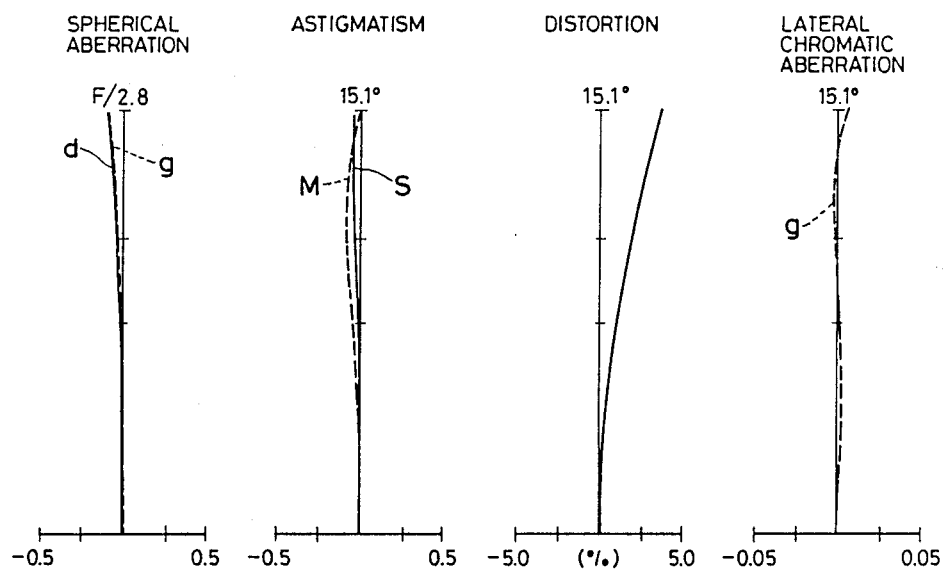
Figure 88:
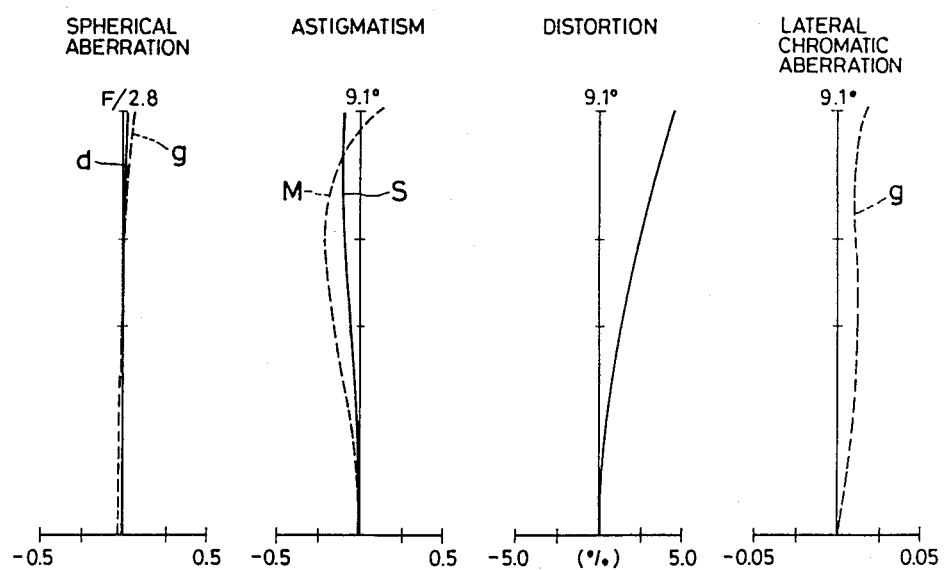

Aberration characteristics of the Embodiment 20 at $f_W$, $f_S$ and $f_T$ are shown in FIG. 86, FIG. 87 and FIG. 88 respectively.

Figure 21:
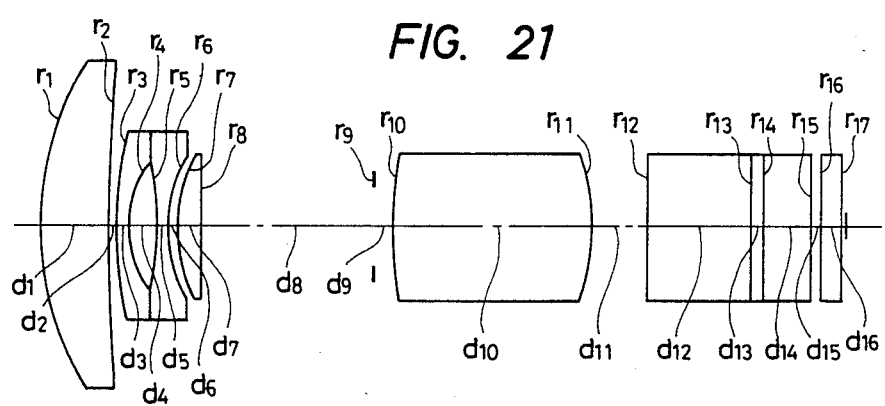

The Embodiment 21 has the composition illustrated in FIG. 21 wherein GRIN lenses are used in the first and fourth lens units, and the zoom lens system as a whole comprises five lens elements in total.

Figure 89:
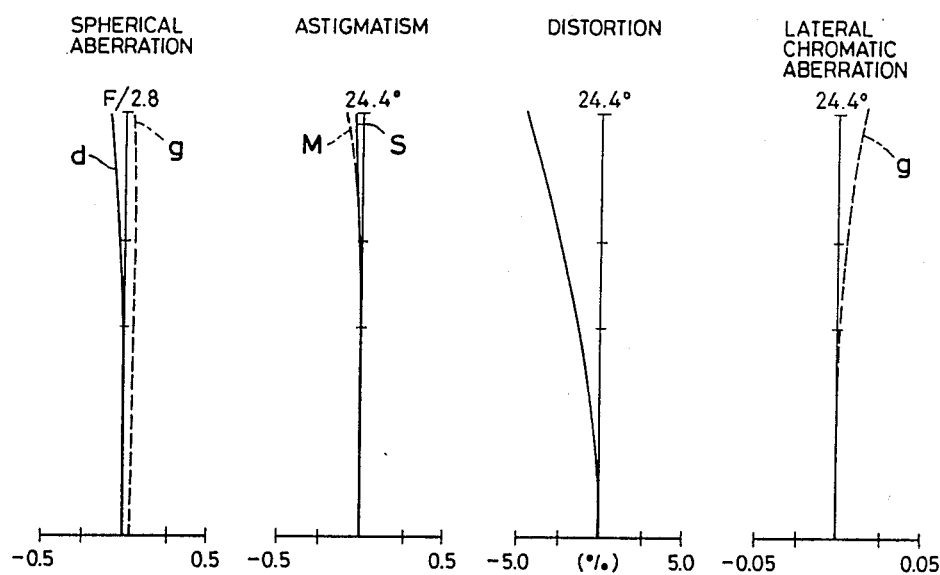
FIGS. 89 through 91 show curves illustrating aberration characteristics of the Embodiment 21.
Figure 90:
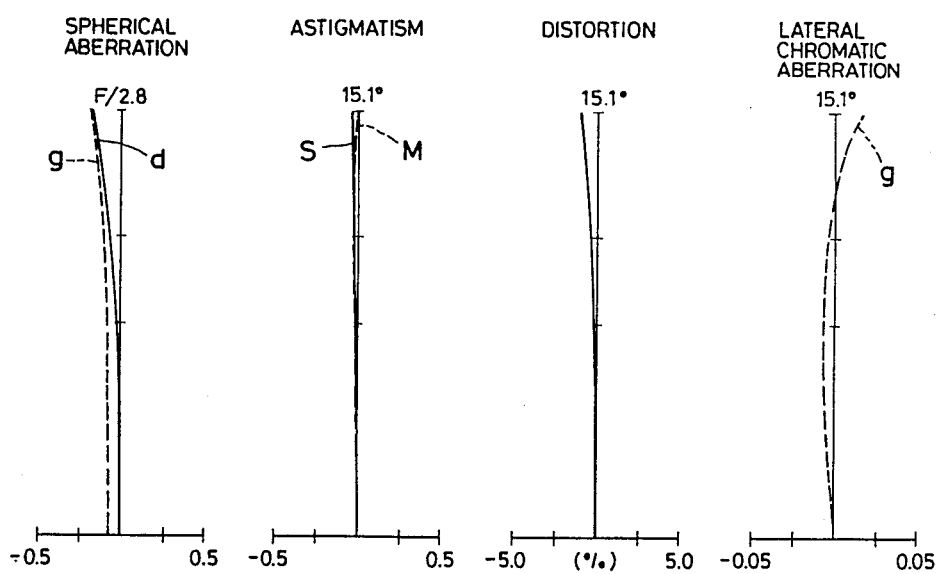
Figure 91:
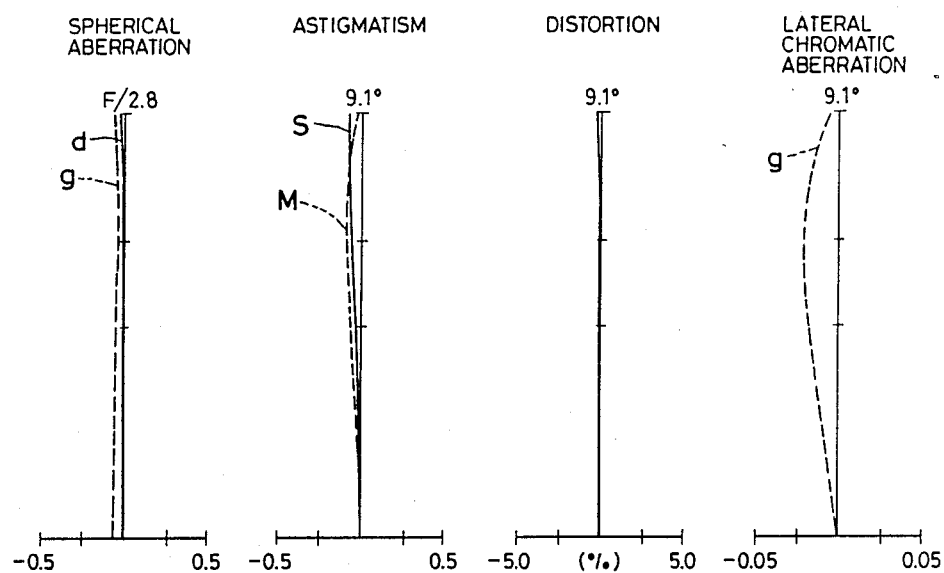

Aberration characteristics of the Embodiment 21 at $f_W$, $f_S$ and $f_T$ are visualized in FIG. 89, FIG. 90 and FIG. 91 respectively.

Figure 22:
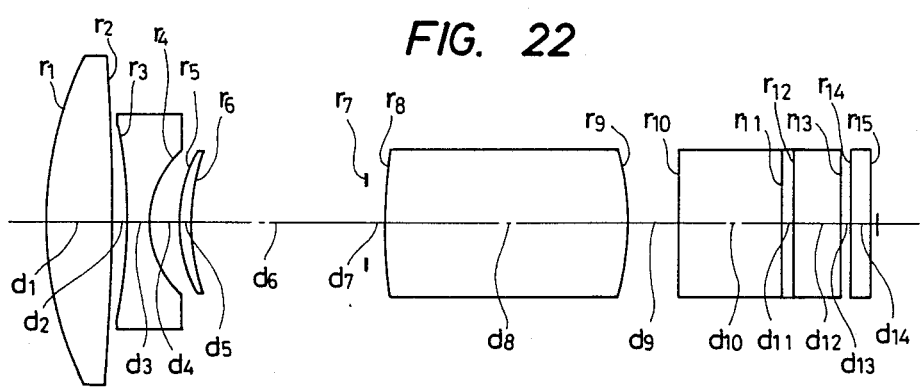

The Embodiment 22 has the composition shown in FIG. 22 wherein GRIN lenses are used in all the lens units to compose each lens unit of a single lens element, and the zoom lens system comprises four lens elements in total.

Figure 92:
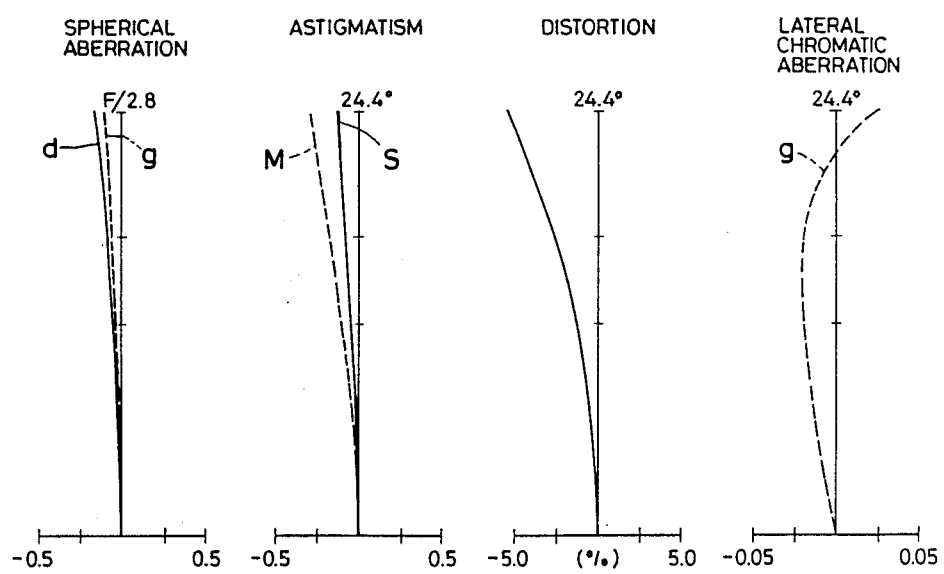
FIGS. 92 through 94 show curves illustrating aberration characteristics of the Embodiment 22.
Figure 93:
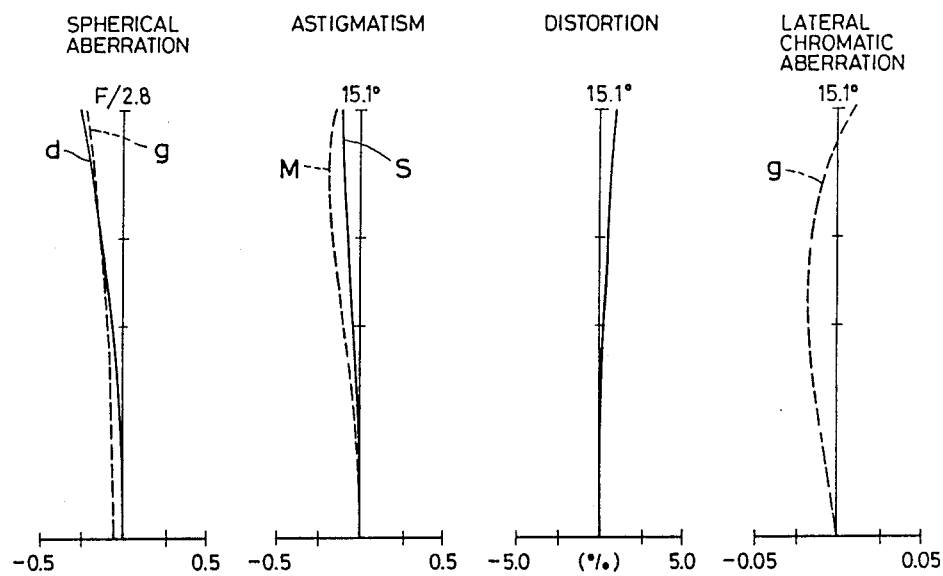
Figure 94:
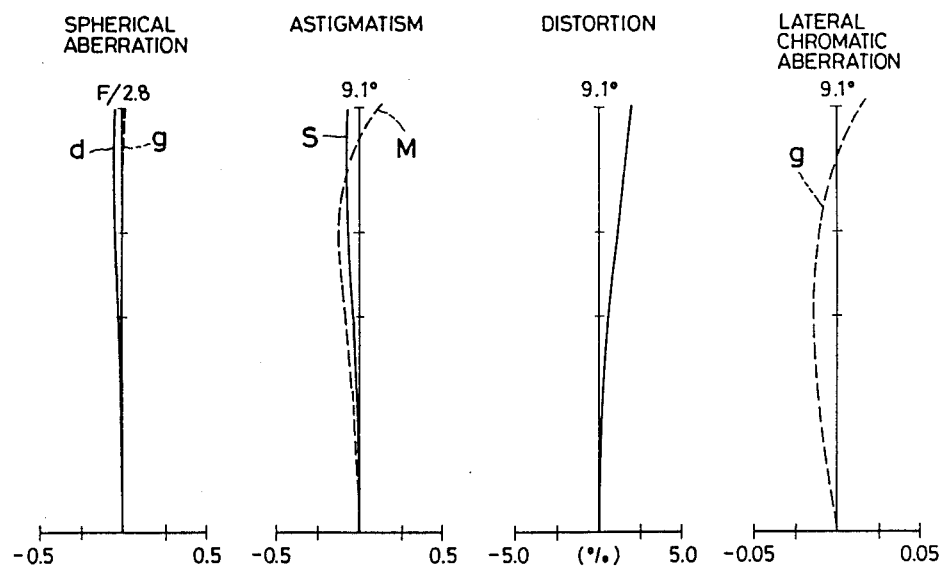

Aberration characteristics of the Embodiment 22 at $f_W$, $f_S$ and $f_T$ are illustrated in FIG. 92, FIG. 93 and FIG. 94 respectively.

In the Embodiments 16 through 22, the GRIN lenses satisfy the conditions (11) and (12) or the condition (13).

Figure 23:
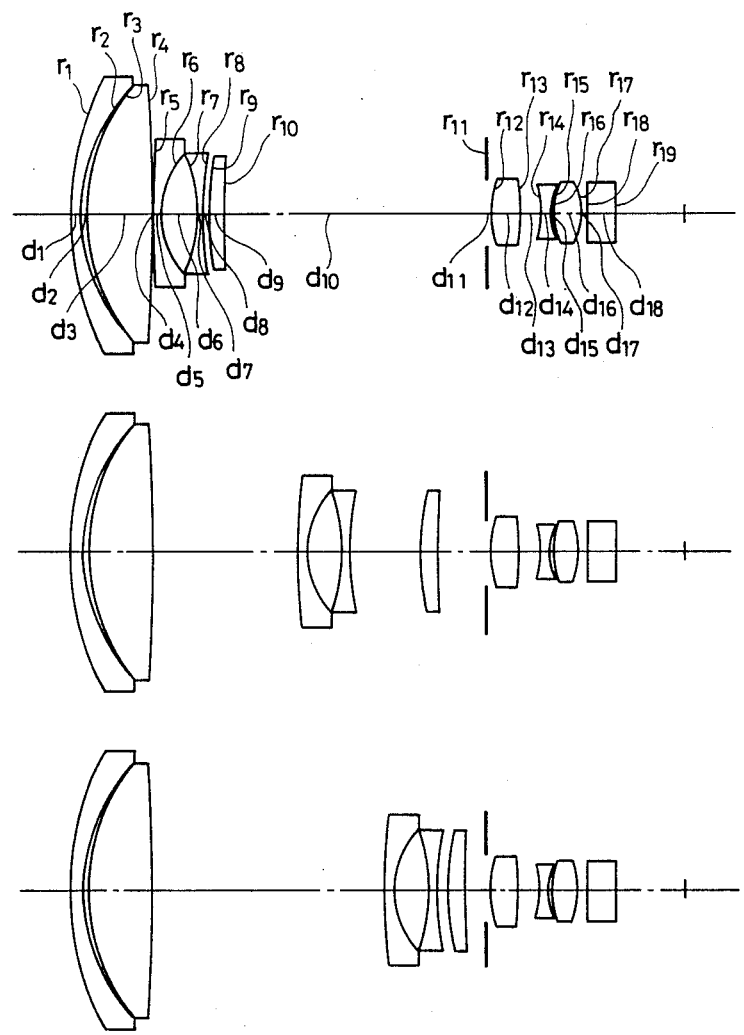
FIG. 23 shows sectional views illustrating Embodiments 23, 24 and 25 of the zoom lens system according to the present invention.

The Embodiments 23 through 25 have the composition shown in FIG. 23 wherein the zoom lens system as a whole comprises eight lens elements. Further, aspherical surfaces are used in these embodiments. Any of the Embodiments 23, 24 and 25 satisfies the conditions (1) and (2).

Figure 95:
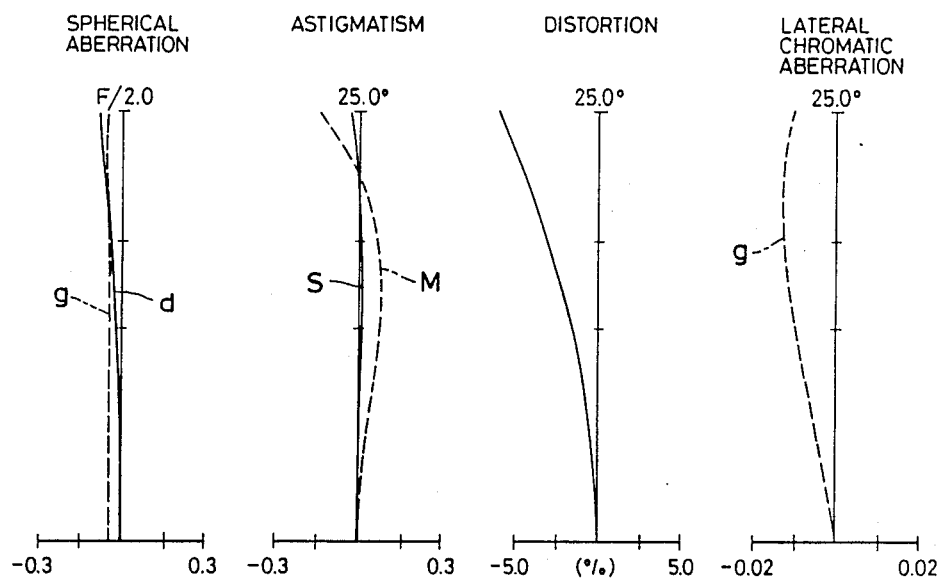
FIGS. 95 through 97 show curves illustrating aberration characteristics of the Embodiment 23.
Figure 96:
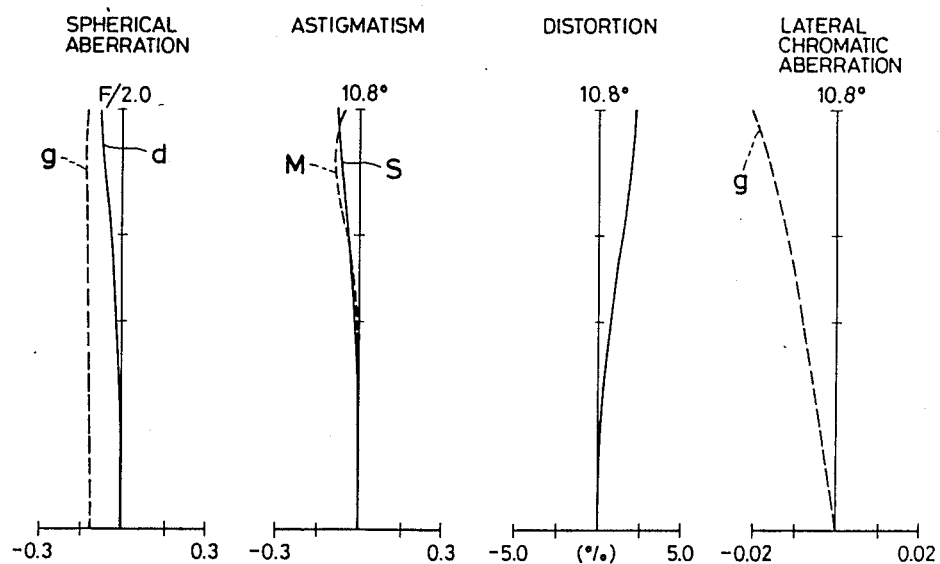
Figure 97:
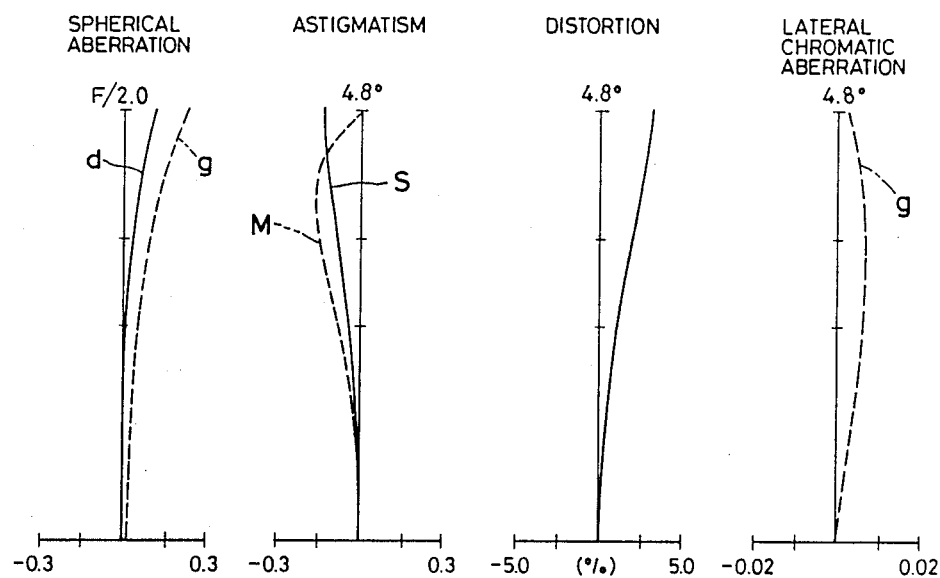
Figure 98:
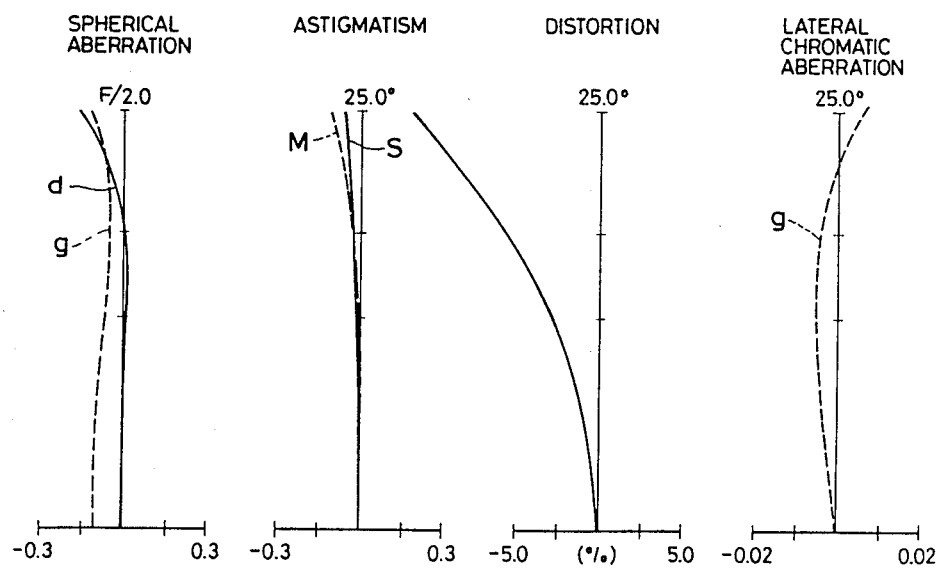
FIGS. 98 through 100 show curves illustrating aberration characteristics of the Embodiment 24.
Figure 99:
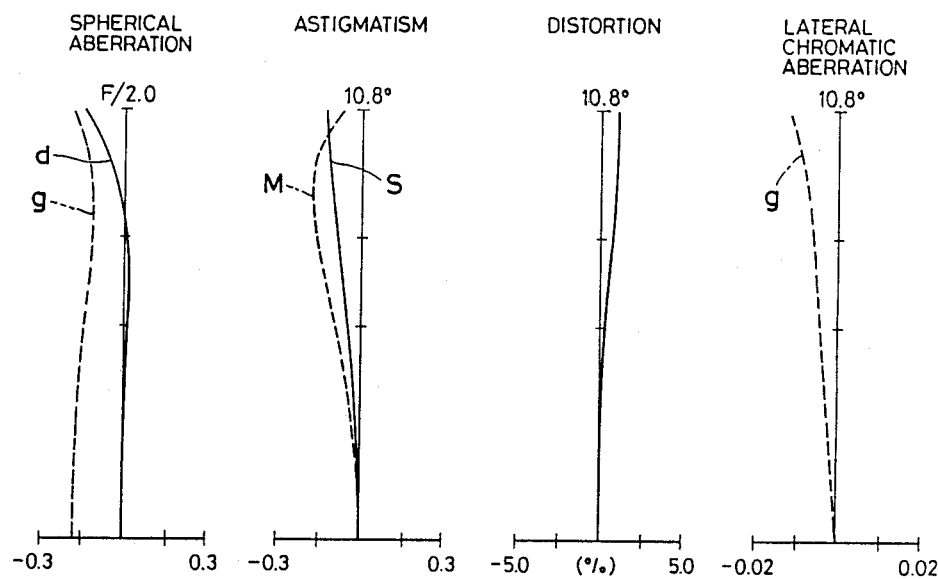
Figure 100:
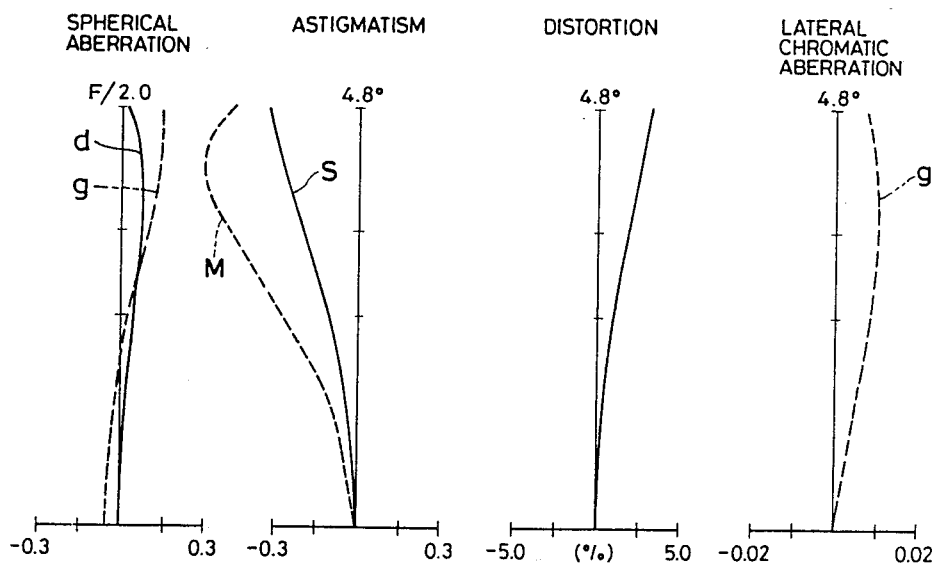
Figure 101:
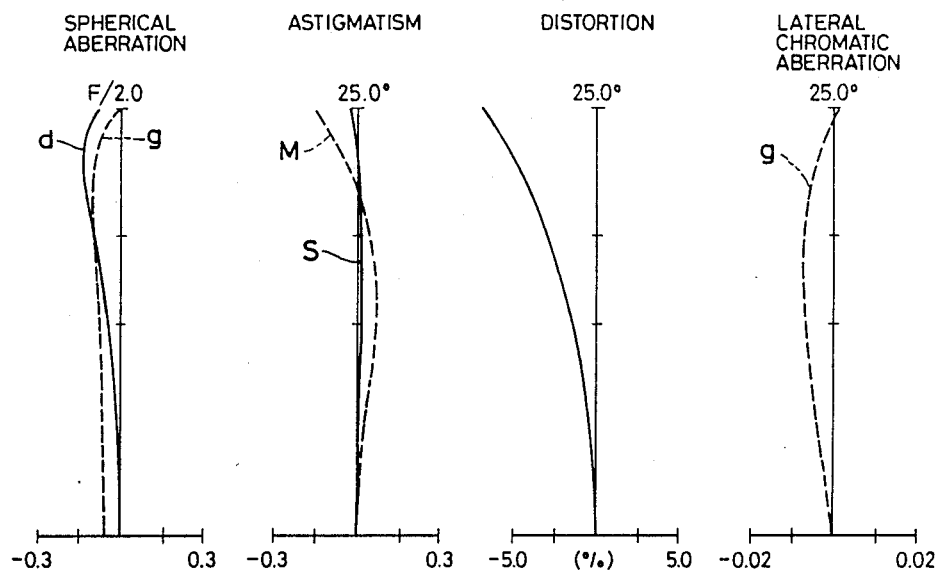
FIGS. 101 through 103 show curves illustrating aberration characteristics of the Embodiment 25.
Figure 102:
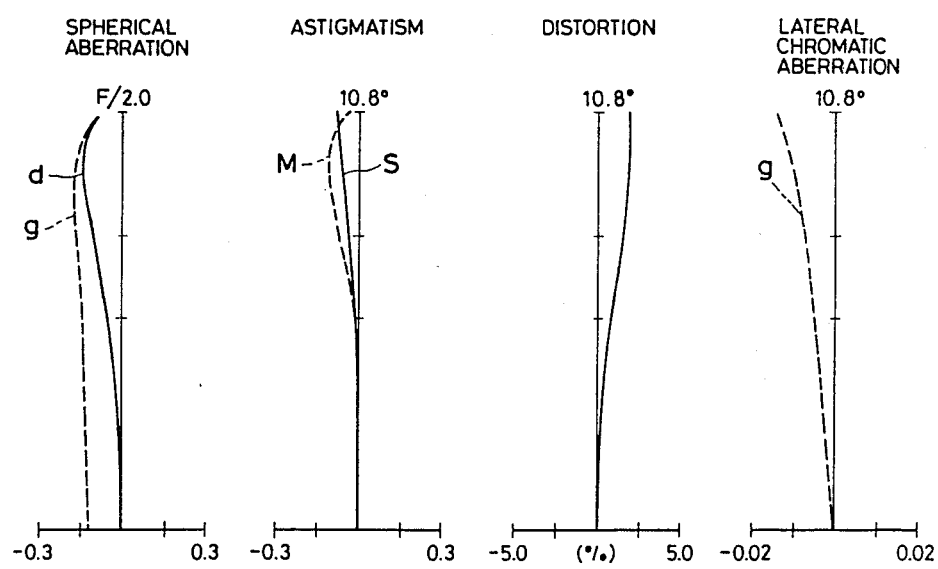
Figure 103:
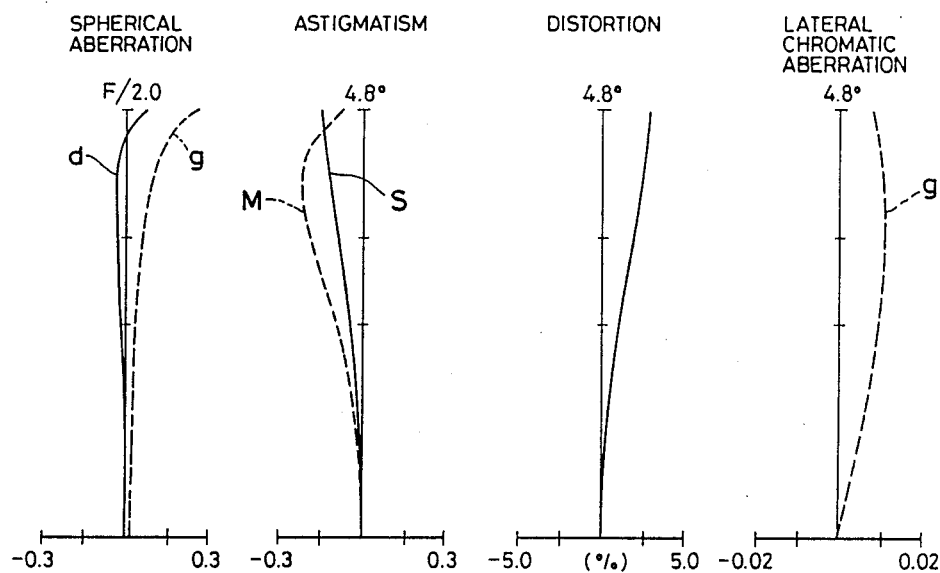

Aberration characteristics of the Embodiment 23 at $f_W$, $f_S$ and $f_T$ are illustrated in FIG. 95, FIG. 96 and FIG. 97 respectively, whereas aberration characteristics of the Embodiment 24 at $f_W$, $f_S$ and $f_T$ are shown in FIG. 98, FIG. 99 and FIG. 100 respectively, and aberration characteristics of the Embodiment 25 at $f_W$, $f_S$ and $f_T$ are visualized in FIG. 101, FIG. 102 and FIG. 103 respectively.

Figure 24:
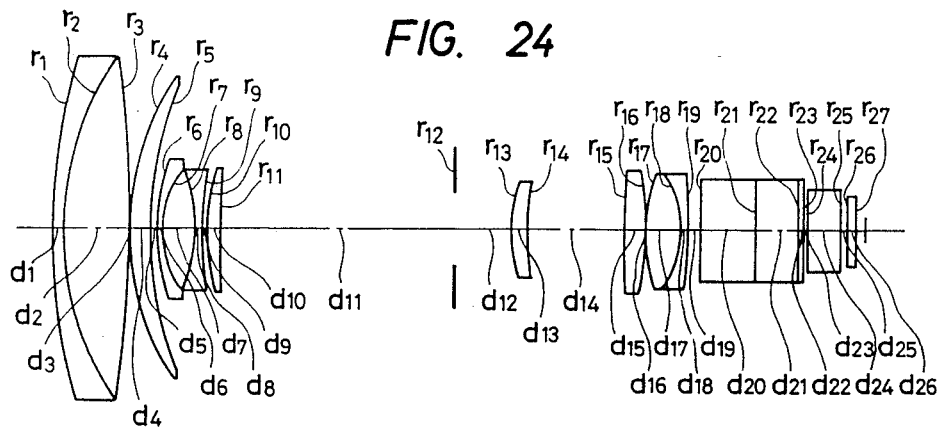
FIGS. 24 through 28 show sectional views illustrating Embodiments 26 through 30 of the zoom lens system according to the present invention.

The Embodiment 26 has the composition shown in FIG. 24 wherein the first lens unit comprises a cemented doublet and a positive lens element, and the fourth lens unit comprises a positive lens element, a positive lens element and a cemented doublet, whereby the zoom lens system as a whole comprises ten lens elements in total. Further, an aspherical surface is used in the fourth lens unit.

Figure 104:
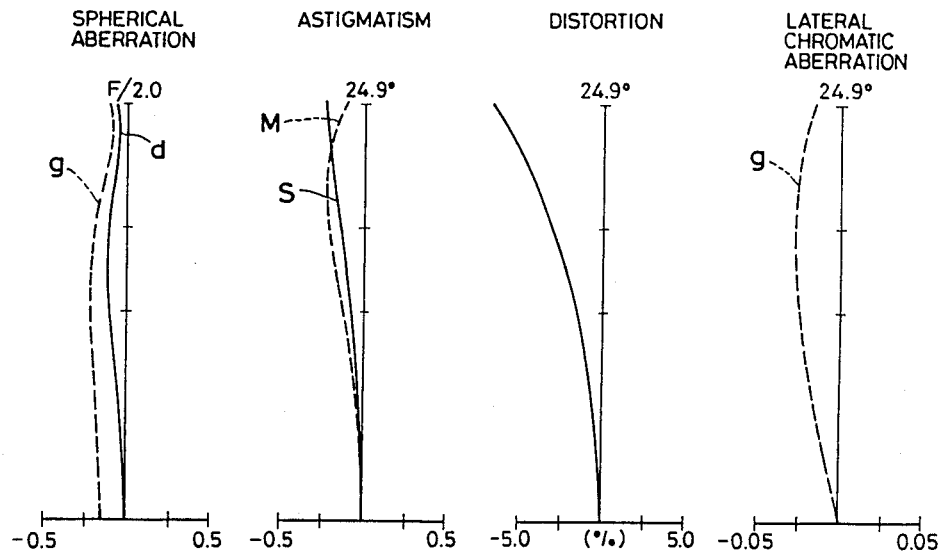
FIGS. 104 through 106 show curves illustrating aberration characteristics of the Embodiment 26.
Figure 105:
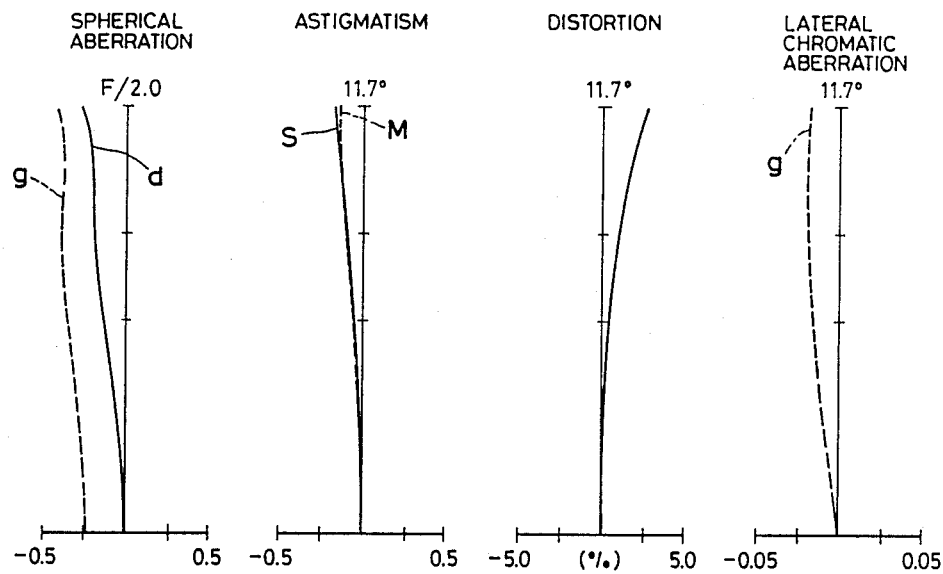
Figure 106:
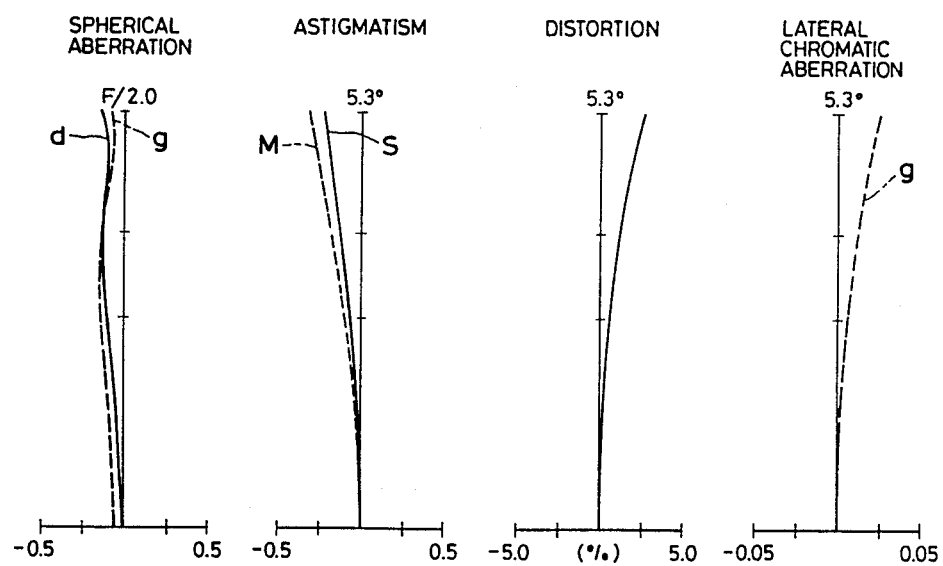

Aberration characteristics of the Embodiment at $f_W$, $f_S$ and $f_T$ are shown in FIG. 104, FIG. 105 and FIG. 106 respectively.

Figure 25:
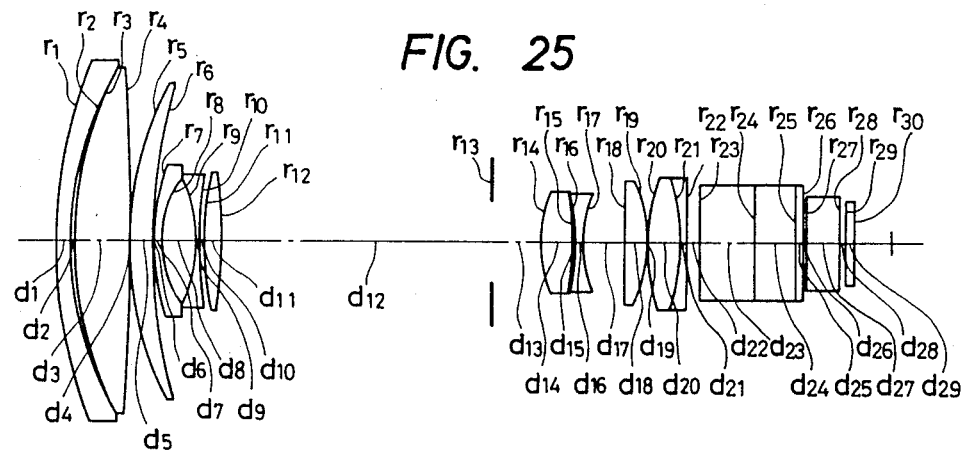

The Embodiment 27 has the composition shown in FIG. 25, wherein the first lens unit comprises a negative lens element, a positive lens element and a positive lens element, and the fourth lens unit comprises a positive lens element, a negative lens element, a positive lens element and a cemented doublet, whereby the zoom lens system as a whole comprises eleven lens elements in total.

Figure 107:
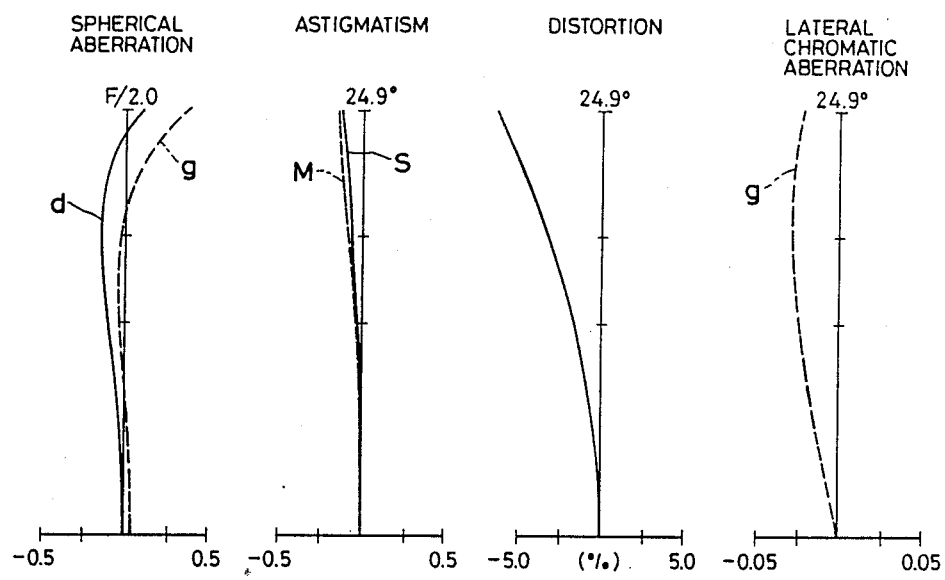
FIGS. 107 through 109 show graphs illustrating aberration characteristics of the Embodiment 27.
Figure 108:
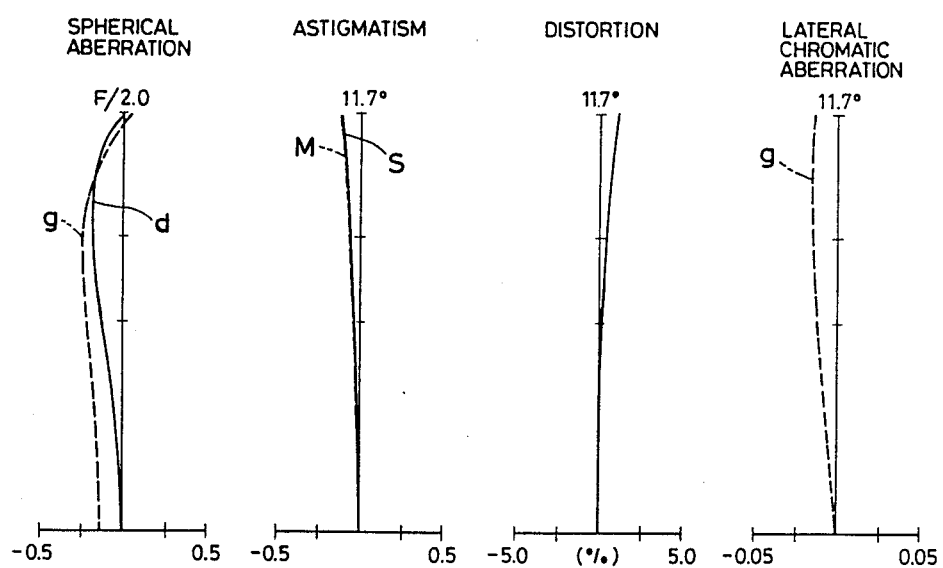
Figure 109:
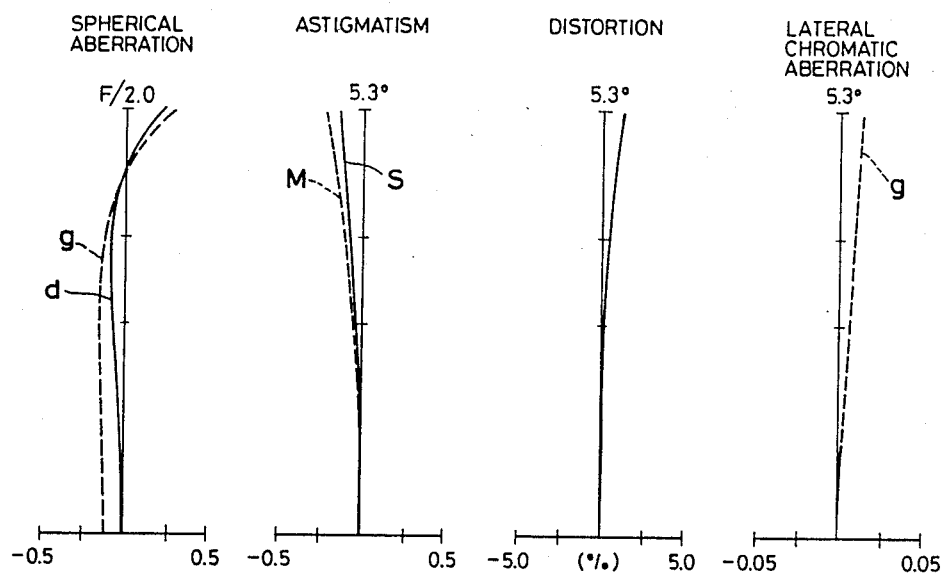

Aberration characteristics of the Embodiment 27 at $f_W$, $f_S$ and $f_T$ are illustrated in FIG. 107, FIG. 108 and FIG. 109 respectively.

Figure 26:
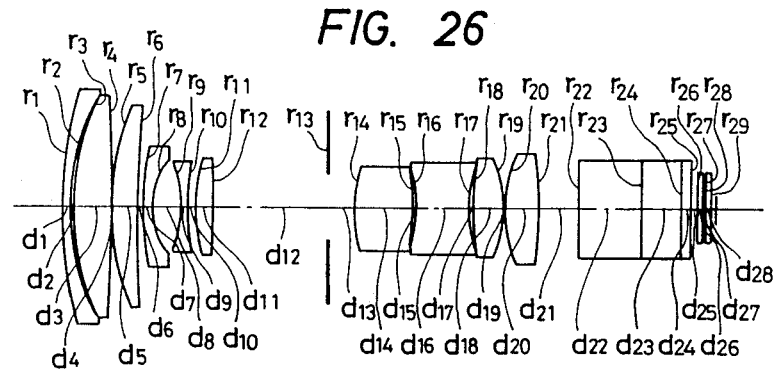

The Embodiment 28 has the composition illustrated in FIG. 26 wherein the first lens unit comprises a negative lens element, a positive lens element and a positive lens element, and the fourth lens unit comprises a positive lens element, a negative lens element, a positive lens element and a positive lens element.

Figure 110:
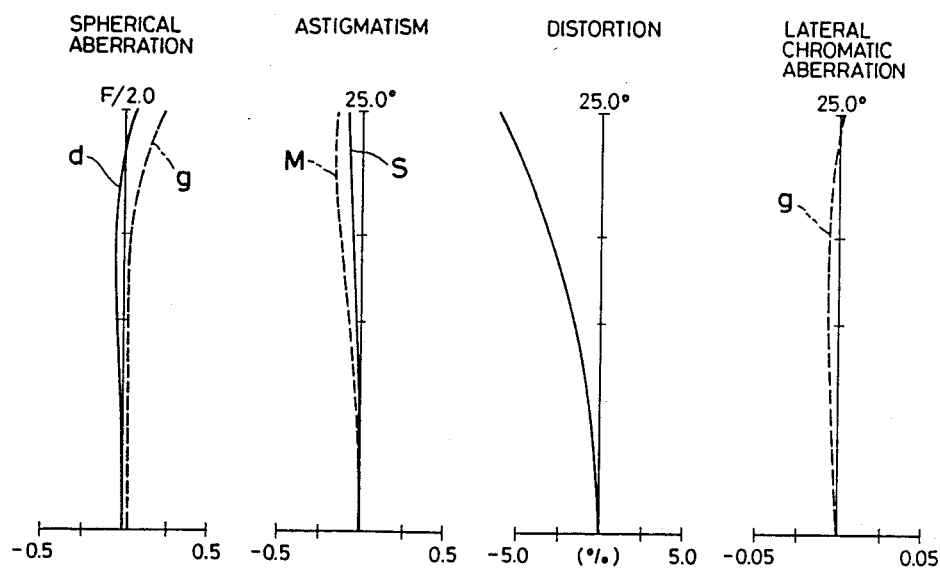
FIGS. 110 through 112 show curves illustrating aberration characteristics of the Embodiment 28.
Figure 111:
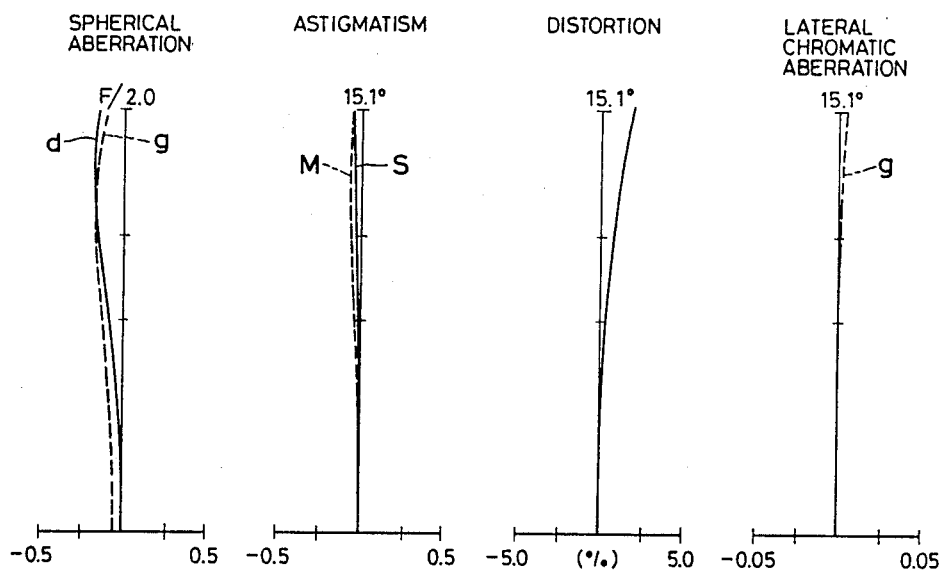
Figure 112:
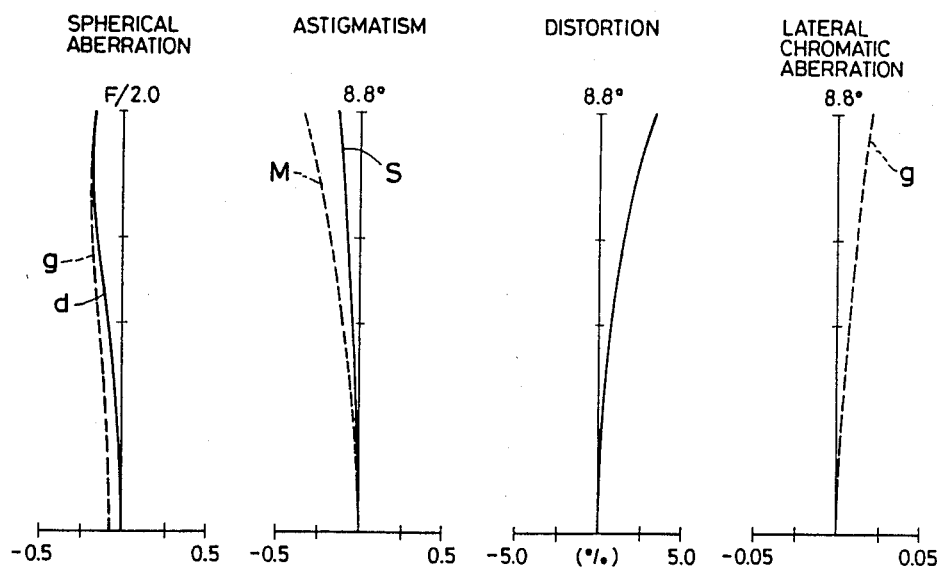

Aberration characteristics of the Embodiment 28 at $f_W$, $f_S$ and $f_T$ are shown in FIG. 110, FIG. 111 and FIG. 112 respectively.

Figure 27:
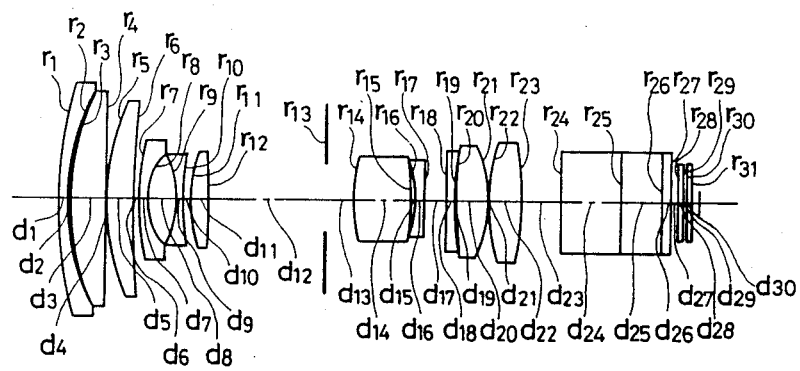

The Embodiment 29 has the composition presented in FIG. 27 wherein the first lens unit comprises a negative lens element, a positive lens element and a positive lens element, and the fourth lens unit comprises a positive lens element, a negative lens element, a negative lens element, a positive lens element and a positive lens element, whereby the zoom lens system as a whole comprises eleven lens elements in total.

Figure 113:
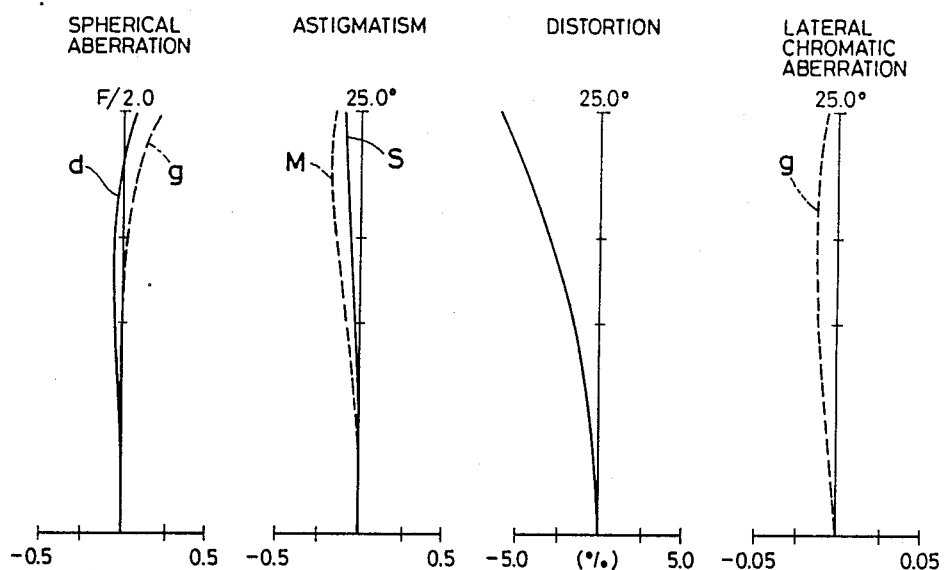
FIGS. 113 through 115 show curves illustrating aberration characteristics of the Embodiment 29.
Figure 114:
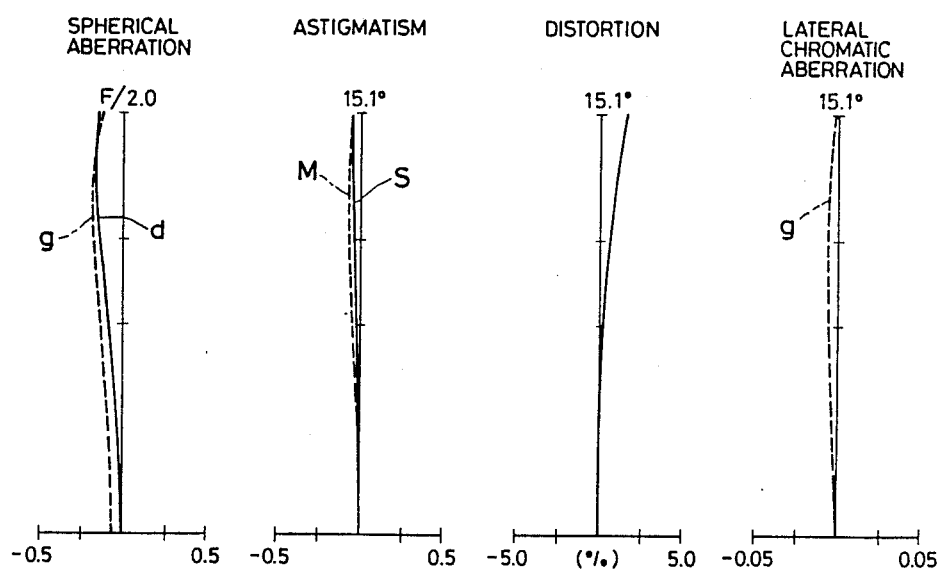
Figure 115:
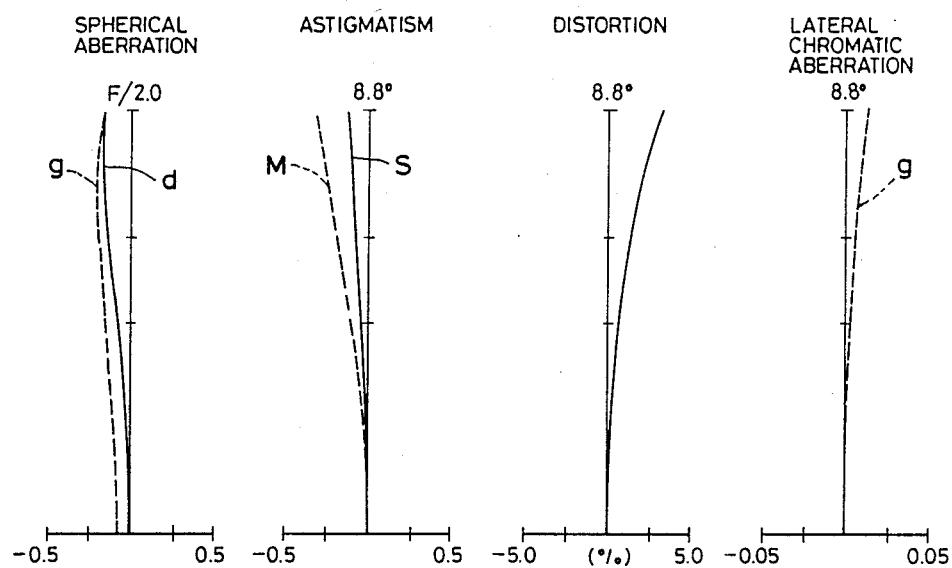

Aberration characteristics of the Embodiment 29 at $f_W$, $f_S$ and $f_T$ are visualized in FIG. 113, FIG. 114 and FIG. 115 respectively.

Figure 28:
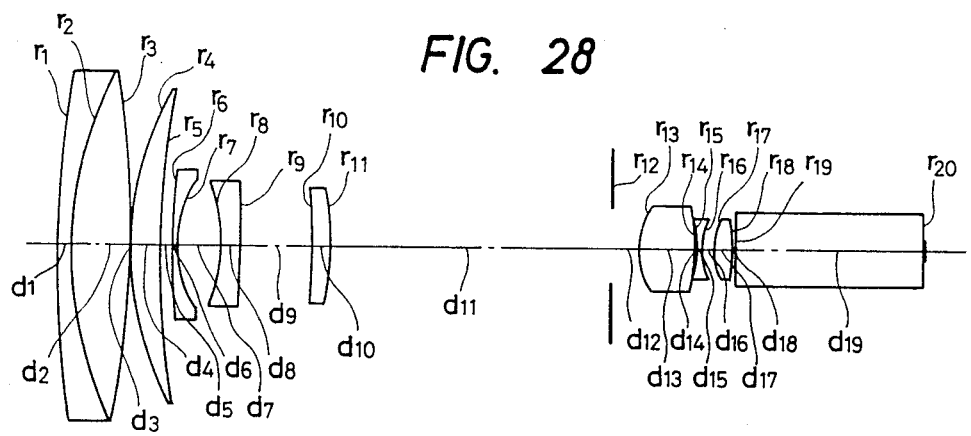

The Embodiment 30 has the composition illustrated in FIG. 28 wherein the first lens unit comprises a cemented doublet and a positive lens element, and the fourth lens unit comprises a positive lens element, a negative lens element and a positive lens element, whereby the zoom lens system as a whole comprises nine lens elements in total. Further, an aspherical surface is used in the fourth lens unit.

Figure 116:
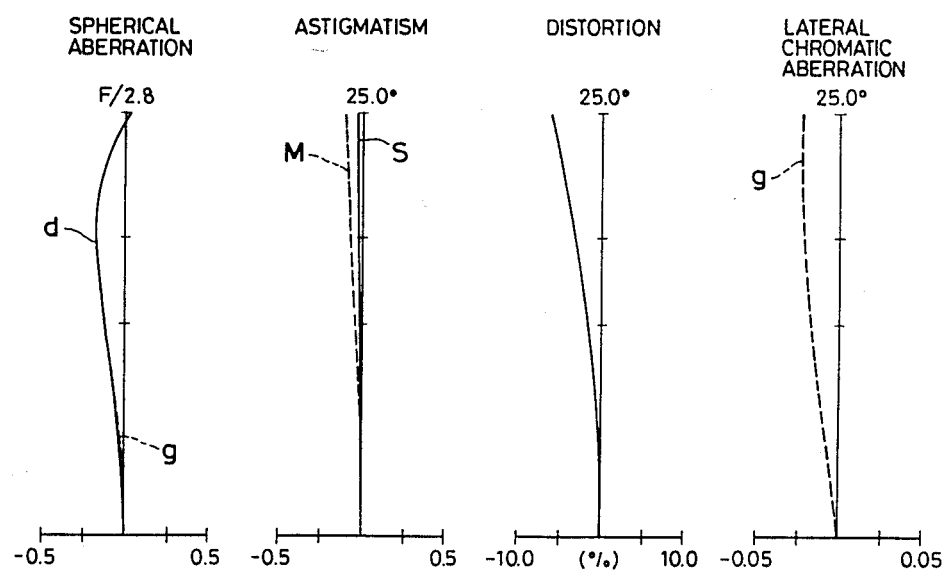
FIGS. 116 through 118 show curves illustrating aberration characteristics of the Embodiment 30.
Figure 117:
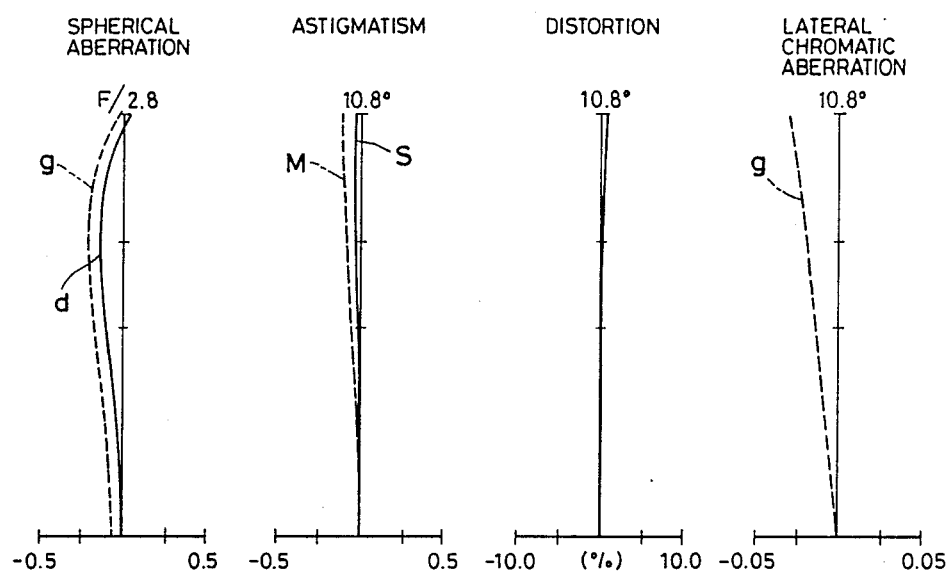
Figure 118:
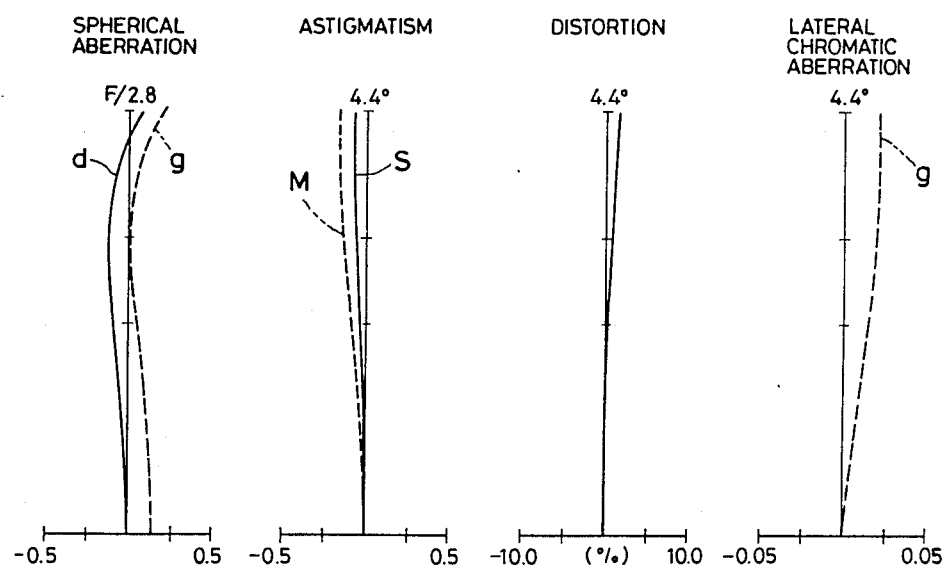

Aberration characteristics of the Embodiment 30 at $f_W$, $f_S$ and $f_T$ are shown in FIG. 116, FIG. 117 and FIG. 118 respectively. Any of these Embodiments 26 through 30 satisfies the conditions (1) and (2).

Figure 16:
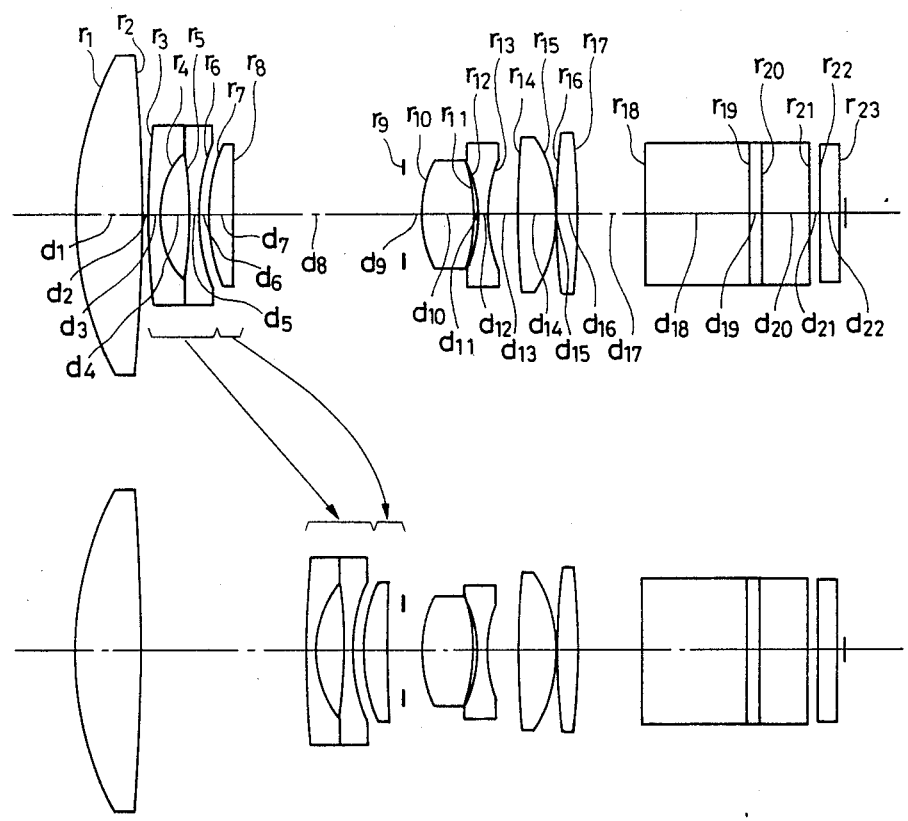

In the Embodiments 1 through 15, the lens units are shifted for zooming as illustrated in FIG. 1. In the Embodiments 16 through 22, the lens units are shifted for zooming as shown in FIG. 16. In the Embodiments 23 through 28, the lens units are shifted for zooming as shown in FIG. 23. With regard to the afore-mentioned conditions, each of the Embodiments has the values listed below:

Embodiment 1
$\beta_{2S} = -0.392$, $\beta_{23S} = -0.995$
$\Delta x_3/\Delta x_2 = 1.2\ (0.7)$, $|\beta_{IIT}| = 0.600$

Embodiment 2
$\beta_{2S} = -0.412$, $\beta_{23S} = -0.998$
$\Delta x_3/\Delta x_2 = 1.25\ (0.65)$, $|\beta_{IIT}| = 0.634$

Embodiment 3
$\beta_{2S} = -0.433$, $\beta_{23S} = -1.004$
$\Delta x_3/\Delta x_2 = 1.201\ (0.668)$, $|\beta_{IIT}| = 0.670$

Embodiment 4
$\beta_{2S} = -0.393$, $\beta_{23S} = -1.000$
$\Delta x_3/\Delta x_2 = 1.166\ (0.742)$, $|\beta_{IIT}| = 0.602$

Embodiment 5
$\beta_{2S} = -0.374$, $\beta_{23S} = -0.994$
$\Delta x_3/\Delta x_2 = 1.151\ (0.771)$, $|\beta_{IIT}| = 0.571$

Embodiment 6
$\beta_{2S} = -0.411$, $\beta_{23S} = -1.003$
$\Delta x_3/\Delta x_2 = 1.186\ (0.713)$, $|\beta_{IIT}| = 0.629$

Embodiment 7
$\beta_{2S} = -0.401$, $\beta_{23S} = -0.996$
$\Delta x_3/\Delta x_2 = 1.176\ (0.729)$, $|\beta_{IIT}| = 0.616$

Embodiment 8
$\beta_{2S} = -0.362$, $\beta_{23S} = -1.009$
$\Delta x_3/\Delta x_2 = 1.134\ (0.790)$, $|\beta_{IIT}| = 0.547$

Embodiment 9
$\beta_{2S} = -0.371$, $\beta_{23S} = -1.026$
$\Delta x_3/\Delta x_2 = 1.134\ (0.772)$, $|\beta_{IIT}| = 0.565$

Embodiment 10
$\beta_{2S} = -0.396$, $\beta_{23S} \times -1.019$
$\Delta x_3/\Delta x_2 = 1.151\ (0.732)$, $|\beta_{IIT}| = 0.607$

Embodiment 11
$\beta_{2S} = -0.415$, $\beta_{23S} = -1.026$
$\Delta x_3/\Delta x_2 = 1.171\ (0.698)$, $|\beta_{IIT}| = 0.638$ -continued

Embodiment 12
$\beta_{2S} = -0.348$, $\beta_{23S} = -0.986$
$\Delta x_3/\Delta x_2 = 1.128\ (0.805)$, $|\beta_{IIT}| = 0.531$

Embodiment 13
$\beta_{2S} = -0.366$, $\beta_{23S} = -0.990$
$\Delta x_3/\Delta x_2 = 1.149\ (0.781)$, $|\beta_{IIT}| = 0.560$

Embodiment 14
$\beta_{2S} = -0.375$, $\beta_{23S} = -0.994$
$\Delta x_3/\Delta x_2 = 1.151\ (0.770)$, $|\beta_{IIT}| = 0.573$

Embodiment 15
$\beta_{2S} = -0.375$, $\beta_{23S} = -1.0302$
$\Delta x_3/\Delta x_2 = 1.134\ (0.763)$, $|\beta_{IIT}| = 0.574$

Embodiment 16
$\beta_{2S} = -0.381$, $\beta_{23S} = -0.996$
$\Delta x_3/\Delta x_2 = 1.185\ (0.818)$, $f_W^2 \cdot n_1(1) = -1.8542 \times 10^{-2}$
$\{n_g(0) - n_d(0)\}/$
$\{n_g(r) - n_d(r)\} = 0.6960$
$|\beta_{IIT}| = 0.579$

Embodiment 17
$\beta_{2S} = -0.472$, $\beta_{23S} = -0.999$
$\Delta x_3/\Delta x_2 = 1.314\ (0.689)$, $f_W^2 \cdot n_1(4) = -0.4674, -0.1818$
$|\beta_{IIT}| = 0.735$

Embodiment 18
$\beta_{2S} = -0.405$, $\beta_{23S} = -0.997$
$\Delta x_3/\Delta x_2 = 1.214\ (0.788)$, $f_W^2 \cdot n_1(1) = -1.2349 \times 10^{-2}$
$\{n_g(0) - n_d(0)\}/$
$\{n_g(r) - n_d(r)\} = 0.6825$
$f_W^2 \cdot n_1(4) = -0.1813$, $|\beta_{IIT}| = 0.617$

Embodiment 19
$\beta_{2S} = -0.322$, $\beta_{23S} = -0.843$
$\Delta x_3/\Delta x_2 = 1.175\ (0.828)$, $f_W^2 \cdot n_1(1) = -1.9644 \times 10^{-2}$
$\{n_g(0) - n_d(0)\}/$
$\{n_g(r) - n_d(r)\} = 0.7501$
$f_W^2 \cdot n_1(4) = -4.5979 \times 10^{-2}$, $|\beta_{IIT}| = 0.458$

Embodiment 20
$\beta_{2S} = -0.493$, $\beta_{23S} = -1.000$
$\Delta x_3/\Delta x_2 = 1.351\ (0.651)$, $f_W^2 \cdot n_1(1) = -2.004 \times 10^{-2}$
$\{n_g(0) - n_d(0)\}/$
$\{n_g(r) - n_d(r)\} = 0.599$
$f_W^2 \cdot n_1(4) = -0.4552, -0.2356$
$|\beta_{IIT}| = 0.771$

Embodiment 21
$\beta_{2S} = -0.324$, $\beta_{23S} = -0.994$
$\Delta x_3/\Delta x_2 = 1.128\ (0.875)$, $f_W^2 \cdot n_1(1) = -1.2145 \times 10^{-2}$
$\{n_g(0) - n_d(0)\}/$
$\{n_g(r) - n_d(r)\} = 0.6457$
$f_W^2 \cdot n_1(4) = -4.2846 \times 10^{-2}$
$|\beta_{IIT}| = 0.486$

Embodiment 22
$\beta_{2S} = -0.576$, $\beta_{23S} = -1.000$
$\Delta x_3/\Delta x_2 = 1.548\ (0.449)$, $f_W^2 \cdot n_1(1) = -2.1906 \times 10^{-2}$
$\{n_g(0) - n_d(0)\}/$
$\{n_g(r) - n_d r\} = 0.708$
$f_W^2 \cdot n_1(4) = -8.5540 \times 10^{-2}$
$|\beta_{IIT}| = 0.916$

Embodiment 23
$\beta_{2S} = -0.618$, $\beta_{23S} = -1.046$
$\Delta x_3/\Delta x_2 = 2.048\ (-0.916)$, $|\beta_{IIT}| = 1.380$

Embodiment 24
$\beta_{2S} = -0.587$, $\beta_{23S} = -1.013$
$\Delta x_3/\Delta x_2 = 1.932\ (-0.555)$, $|\beta_{IIT}| = 1.292$

Embodiment 25
$\beta_{2S} = -0.614$, $\beta_{23S} = -1.036$
$\Delta x_3/\Delta x_2 = 2.004\ (-0.806)$, $|\beta_{IIT}| = 1.367$

Embodiment 26
$\beta_{2S} = -0.508$, $\beta_{23S} = -1.003$
$\Delta x_3/\Delta x_2 = 1.496\ (-0.046)$, $|\beta_{IIT}| = 1.057$

Embodiment 27
$\beta_{2S} = -0.366$, $\beta_{23S} = -1.012$
$\Delta x_3/\Delta x_2 = 1.220\ (+0.568)$, $|\beta_{IIT}| = 0.718$

Embodiment 28
$\beta_{2S} = -0.437$, $\beta_{23S} = -1.001$
$\Delta x_3/\Delta x_2 = 1.224\ (+0.633)$, $|\beta_{IIT}| = 0.695$

Embodiment 29
$\beta_{2S} = -0.443$, $\beta_{23S} = -1.000$
$\Delta x_3/\Delta x_2 = 1.232\ (+0.618)$, $|\beta_{IIT}| = 0.706$

Embodiment 30

-continued

| | |
|---|---|
| $\beta_{2S} = -0.601$, | $\beta_{23S} = -1.169$ |
| $\Delta x_3/\Delta x_2 = 1.848\ (-0.181)$, | $\|\beta_{IIT}\| = 1.458$ |

The zoom lens system according to the present invention can assure little variations of the chromatic aberrations and other types of aberrations as well as light weight and low manufacturing cost in spite of the fact that said lens system comprises a very small number of lens elements, i.e., one or two lens elements in the second lens unit, only one lens element in the third lens unit and a small number of lens elements in the other lens units.

We claim:

1. A zoom lens system comprising, in the order from the object side, a first lens unit having positive refractive power, a second lens unit having negative refractive power, a third lens unit having positive refractive power and a fourth lens unit having positive refractive power, said first lens unit and said fourth lens unit being fixed at the zooming time of said zoom lens system, whereas said second lens unit and said third lens unit being shifted along the optical axis while varying the airspace reserved therebetween for varying focal length and compensating shift of the imaging position, and said zoom lens system being so designed as to satisfy the following conditions (1) and (2):

$$0.2 < |\beta_{2S}| < 0.7 \quad (1)$$

$$0.9 < |\beta_{23S}| < 3.0 \quad (2)$$

wherein the reference symbols $\beta_{2S}$ and $\beta_{23S}$ represent magnification of said second lens unit, and total magnification of said second and third lens units respectively when the zoom lens system as a whole has a focal length of $f_S = \sqrt{f_W \cdot f_T}$ (the reference symbol $f_W$ designates focal length of the zoom lens system at the wide position and the reference symbol $f_T$ denotes focal length of the zoom lens system at the tele position).

2. A zoom lens system according to claim 1 wherein said second lens unit consists of, in the order from the object side, a negative meniscus lens element having a strongly concave surface on the image side and a negative lens element having a concave surface on the object side, and said third lens unit consists of a single positive lens element.

3. A zoom lens system according to claim 1 wherein magnification $\beta_{2T}$ of said second lens unit at the tele position satisfies the following condition:

$$|\beta_{2T}| < 1$$

4. A zoom lens system according to claim 1 wherein said second lens unit consists of, in the order from the object side, a negative lens element having a strongly concave surface on the image side and another negative lens element, said third lens unit consists of a single positive lens element, and magnification $\beta_{2T}$ of said second lens unit at the tele position satisfies the following condition:

$$|\beta_{2T}| < 1$$

5. A zoom lens system comprising, in the order from the object side, a first lens unit having positive refractive power, a second lens unit having negative refractive power, a third lens unit having positive refractive power and a fourth lens unit having positive refractive power, said first lens unit and said fourth lens unit being fixed at the zooming time of said zoom lens system, whereas said second lens unit and said third lens unit being shifted along the optical axis while varying the airspace reserved therebetween for varying focal length and compensating shift of the imaging position, said second lens unit consisting of, in the order from the object side, a negative lens element having a strongly concave surface on the image side and another negative lens element, said third lens unit consisting of a single positive lens element, and magnification $\beta_{2T}$ of said second lens unit at the tele position satisfying the following conditions:

$$|\beta_{2T}| < 1$$

6. A zoom lens system according to claim 3 or 5 satisfying the following condition (3) over the entire zooming range:

$$0.5 < \Delta x_3/\Delta x_2 < 1.5 \quad (3)$$

wherein the reference symbols $\Delta x_2$ and $\Delta x_3$ represent distances of the shifts of said second lens unit and said third lens unit respectively caused by varying focal length of said zoom lens system as a whole by $\Delta f$ from an focal length within the vari-focal range.

7. A zoom lens system according to claim 3 or 4 satisfying the following conditions (4) and (5):

$$0.9 < \Delta x_3/\Delta x_2 < 1.5 \text{ when } f_W \leq f \leq \sqrt{f_W \cdot f_T} \quad (4)$$

$$0.5 < \Delta x_3/\Delta x_2 < 1.1 \text{ when } \sqrt{f_W \cdot f_T} \leq f \leq f_T \quad (5)$$

wherein the reference symbols $\Delta x_2$ and $\Delta x_3$ represent distances of the shifts of said second lens unit and said third lens unit caused by varying focal length of said zoom lens system as a whole by $\Delta f$ from an focal length within the vari-focal range.

8. A zoom lens system according to claim 1, 2, 3 or 5 wherein said first lens unit consists of, in the order from the object side, a negative meniscus lens element having a convex surface on the object side and a positive lens element.

9. A zoom lens system according to claim 1, 2, 3 or 5 wherein said fourth lens unit comprises, in the order from the object side, a first positive lens component, a negative lens component and a second positive lens component, said first positive lens component comprising a one or two lens elements, said negative lens component comprising one, two or three negative lens elements, and said second positive lens component comprising one, two or three positive lens elements.

10. A zoom lens system according to claim 1, 2, 3 or 5 wherein said fourth lens unit comprises a first positive lens component, a negative lens component and a second positive lens component, said first positive lens component comprising one or two positive lens element, said negative lens component comprising one, two or three negative lens elements, and said second positive lens component comprising one, two, or three positive lens elements and a negative lens element arranged on the image side of said positive lens elements.

11. A zoom lens system according to claim 10 comprising in said first lens unit a graded refractive index lens having refractive index distribution expressed by the following formula and satisfying the following conditions (11) and (13):

$$n(r) = n_0 + n_1 r^2 + n_2 r^4 + \ldots$$

$$-4.5 < f_W^2 \cdot n_1(1) < 0 \qquad (12)$$

$$0.01 < \{n_g(0) - n_d(0)\} / \{n_g(r) - n_d(r)\} < 1 \qquad (13)$$

wherein the reference symbol $f_W$ represents focal length of the zoom lens system as a whole at the wide position, the reference symbol $n_1(1)$ designates the second order coefficient $n_1$ of the graded refractive index lens arranged in said first lens unit, the reference symbols $n_g(0)$ and $n_d(0)$ denote refractive indices for the g-line and d-line respectively of the center of the graded refractive index lens arranged in said first lens unit, the reference symbols $n_g(r)$ and $n_d(r)$ represent refractive indices for the g-line and d-line respectively of the outermost peripherical portion of the graded refractive index lens arranged in said first lens unit.

12. A zoom lens system according to claim 10 wherein said fourth lens unit comprises a graded refractive index lens having refractive index distribution expressed by the following formula, said zoom lens system being so designed as to satisfy the following conditions (14);

$$n(r) = n_0 + n_1 r^2 + n_2 r^4 + \ldots$$

$$-4.5 < f_W^2 \cdot n_1(4) < 0 \qquad (14)$$

wherein the reference symbol $f_W$ represents focal length of said zoom lens system as a whole at the wide position and the reference symbol $n_1(4)$ designates constant $n_1$ of the graded refractive index lens arranged in said forth lens unit.

13. A zoom system comprising, in the order from the object side, a first lens unit having positive refractive power, a second lens unit having negative refractive power, a third lens unit having positive refractive power and a fourth lens unit having positive refractive power, adapted in such a manner that said first lens unit and said fourth lens unit are fixed at the zooming time, whereas said second lens unit and said third lens unit are shifted in the same direction along the optical axis while varying the airspace reserved therebetween for varying focal length and compensating deviation of the imaging position, and comprising a graded refractive index lens in said lens system.

* * * * *